(12) United States Patent
Gschwind

(10) Patent No.: US 9,489,229 B2
(45) Date of Patent: *Nov. 8, 2016

(54) TRANSPARENT DYNAMIC CODE OPTIMIZATION

(71) Applicant: INTERNATIONAL BUSINESS MACHINES CORPORATION, Armonk, NY (US)

(72) Inventor: Michael K. Gschwind, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/485,208

(22) Filed: Sep. 12, 2014

(65) Prior Publication Data

US 2015/0277872 A1    Oct. 1, 2015

Related U.S. Application Data

(63) Continuation of application No. 14/231,658, filed on Mar. 31, 2014.

(51) Int. Cl.
*G06F 9/44* (2006.01)
*G06F 9/45* (2006.01)
*G06F 9/455* (2006.01)

(52) U.S. Cl.
CPC ....... *G06F 9/45558* (2013.01); *G06F 9/45516* (2013.01); *G06F 9/45525* (2013.01); *G06F 2009/45583* (2013.01)

(58) Field of Classification Search
CPC ............. G06F 8/443–8/445; G06F 9/45516; G06F 2009/45583; G06F 9/45525; G06F 9/45558

See application file for complete search history.

(56) References Cited

U.S. PATENT DOCUMENTS

| 5,551,013 | A | 8/1996 | Beausoleil et al. |
| 5,574,873 | A | 11/1996 | Davidian |
| 5,682,495 | A | 10/1997 | Beavers et al. |
| 5,790,825 | A | 8/1998 | Traut |
| 6,009,261 | A | 12/1999 | Scalzi et al. |
| 6,308,255 | B1 | 10/2001 | Gorishek, IV et al. |
| 6,463,582 | B1 | 10/2002 | Lethin et al. |

(Continued)

FOREIGN PATENT DOCUMENTS

| WO | WO2013048468 A1 | 4/2013 |
| WO | WO2013101139 A1 | 7/2013 |

OTHER PUBLICATIONS

Josef Weidendorfer, Performance Optimization by Dynamic Code Transformation, 2011, pp. 1-2.*

(Continued)

*Primary Examiner* — Thuy Dao
*Assistant Examiner* — Mongbao Nguyen
(74) *Attorney, Agent, or Firm* — Steven L. Bennett, Esq.; Rachel L. Pearlman, Esq.; Heslin Rothenberg Farley & Mesiti P.C.

(57) ABSTRACT

A transparent dynamic code optimization capability natively executes code and identifies hot regions within the code or identifies code that is to otherwise be optimized; notifies an optimizer that such hot region or code has been identified enabling the optimizer to create optimized code; efficiently passes control to the newly optimized code; and transfers control back from such optimized code.

10 Claims, 33 Drawing Sheets

(56) References Cited

U.S. PATENT DOCUMENTS

| | | | |
|---|---|---|---|
| 7,146,607 B2 | 12/2006 | Nair et al. | |
| 7,159,095 B2 | 1/2007 | Dale et al. | |
| 7,251,811 B2 | 7/2007 | Rosner et al. | |
| 7,284,112 B2 | 10/2007 | Bradford et al. | |
| 7,376,807 B2 | 5/2008 | Moyer | |
| 7,487,330 B2 | 2/2009 | Altman et al. | |
| 8,255,880 B2 | 8/2012 | Dewitt, Jr. et al. | |
| 8,479,195 B2 | 7/2013 | Adams et al. | |
| 2005/0251791 A1* | 11/2005 | Hundt | G06F 11/3466 717/130 |
| 2006/0174244 A1* | 8/2006 | Woods | G06F 8/66 717/174 |
| 2007/0079294 A1 | 4/2007 | Knight et al. | |
| 2008/0133871 A1* | 6/2008 | Holt | H04L 67/1097 711/173 |
| 2008/0301417 A1* | 12/2008 | Law | G06F 9/3863 712/227 |
| 2009/0172713 A1 | 7/2009 | Kim et al. | |
| 2009/0210644 A1* | 8/2009 | Batifoulier | G06F 12/1441 711/163 |
| 2010/0153776 A1 | 6/2010 | Vick et al. | |
| 2011/0004680 A1* | 1/2011 | Ryman | G06F 9/4445 709/224 |
| 2011/0154295 A1* | 6/2011 | Aharoni | G06F 8/74 717/125 |
| 2011/0161784 A1* | 6/2011 | Selinger | G06F 11/1068 714/768 |
| 2012/0036373 A1* | 2/2012 | Kofman | G06F 21/572 713/193 |
| 2012/0144167 A1 | 6/2012 | Yates, Jr. et al. | |
| 2012/0159463 A1* | 6/2012 | Druch | G06F 8/67 717/140 |
| 2012/0174087 A1* | 7/2012 | Bentzien | G06F 8/65 717/169 |
| 2012/0198427 A1 | 8/2012 | Schmidt | |
| 2012/0255015 A1 | 10/2012 | Sahita et al. | |
| 2012/0331262 A1 | 12/2012 | Gyuris et al. | |
| 2013/0132690 A1* | 5/2013 | Epstein | G06F 12/1416 711/159 |
| 2013/0198561 A1* | 8/2013 | Fleming | G06F 9/455 714/6.3 |
| 2013/0283249 A1* | 10/2013 | Kanhere | G06F 8/40 717/139 |
| 2013/0346613 A1* | 12/2013 | Tarasuk-Levin | G06F 9/45558 709/226 |
| 2014/0007066 A1* | 1/2014 | Kanhere | G06F 9/45516 717/159 |
| 2015/0089010 A1* | 3/2015 | Tsirkin | G06F 15/17331 709/212 |
| 2015/0149687 A1* | 5/2015 | Tsirkin | G06F 12/109 711/6 |

OTHER PUBLICATIONS

Jason Ansel, Language-Independent Sandboxing of Just-In-Time Compilation and Self-Modifying Code, 2011, pp. 1-12.*

Nathan Froyd, Low-Overhead Call Path Profiling of Unmodified Optimized Code, 2005, pp. 1-10.*

"MMU/SLB/TLB/ERAT"; http://seniordesign,engr.uidaho.edu/2008-2009/hot-threads/docs/TajResearch.docx, pp. 1-7, downloaded from internet Feb. 26, 2014 (no additional date information available).

"z/Architecture—Principles of Operation," IBM Publication No. SA22-7832-09, $10^{th}$ Edition, Sep. 2012, pp. 1-1568.

Gschwind, M., E.R. Altman, "Precise Exception Semantics in Dynamic Compilation," 2002 Symposium on Compiler Construction (CC 2002), Grenoble, France, Apr. 2002, 15 pages.

Hutchinson, Luke, "Memory Address Translation," http://www.altdevblogaday.com/2011/07/24/memory-address-translation/, downloaded from internet Mar. 6, 2014, pp. 1-8.

Intel Itanium Architecture Software Developer's Manual vol. 2: System Architecture, Document No. 245318-005, Jan. 2006, pp. 1-654.

Mell, Peter and Tim Grance, "The NIST Definition of Cloud Computing," National Institute of Standards and Technology, Information Technology Laboratory, Version 15, Oct. 7, 2009, pp. 1-2.

Pagiamtzis, K. and A. Sheikholeslami, "Content-addressable memory (CAM) circuits and architectures: A tutorial and survey," IEEE Journal of Solid-State Circuits, vol. 41, No. 3, pp. 712-727, Mar. 2006.

Power ISA™ Version 2.07, May 3, 2013, pp. 1-1526.

Gschwind, Michael K., "Transparent Dynamic Code Optimization," U.S. Appl. No. 14/231,658, filed Mar. 31, 2014, 130 pages.

Final Office Action dated Feb. 12, 2016: U.S. Appl. No. 14/231,658, filed Mar. 31, 2014.

* cited by examiner

TRANSPARENT DYNAMIC CODE OPTIMIZATION

CROSS-REFERENCE TO RELATED APPLICATIONS

This application is a continuation of co-pending U.S. patent application Ser. No. 14/231,658, filed Mar. 31, 2014, entitled "TRANSPARENT DYNAMIC CODE OPTIMIZATION," which is hereby incorporated herein by reference in its entirety.

BACKGROUND

One or more aspects relate, in general, to processing within a computing environment, and in particular, to optimizing such processing.

Opportunities to improve the operation of computer systems are provided by a number of code rewriting techniques. For example, code rewriting may be used to modify binaries to avoid known hardware errors. In other examples, existing code may be modified to improve performance by re-optimizing hot regions, either from binary code, or from additional internal representation formats stored by the static compiler that allow code to be re-optimized without decompiling the binary code.

Various offline optimizers have been used to rewrite code. These optimizers modify the actual binary, making self-referential programs, including those that compute checksums of their own code to validate correctness, fail. These offline optimizers also depend on obtaining workload statistics.

Other optimization techniques, such as dynamic code optimization, also rewrite code. These techniques, however, recompile code dynamically and store the newly generated code in its entirety in locations different from the original code to preserve such self-referential behavior.

SUMMARY

Shortcomings of the prior art are overcome and advantages are provided through the provision of a method of facilitating processing in a computing environment. The method includes, for instance, executing, by a processor, an application; determining that a defined event has occurred; and based on determining that the defined event has occurred, transferring control to a component of the computing environment to perform one or more modifications to provide modified code of the application, wherein the application comprises the modified code and unmodified code, the modified code being stored in separate memory regions different from the memory regions storing the unmodified code, and wherein the transferring uses an event based branch to transfer to an address specified by the processor based on occurrence of the defined event, the address corresponding to an instruction to be performed by the component to perform the one or more modifications.

Computer program products and systems relating to one or more embodiments are also described and may be claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

Figure 1:
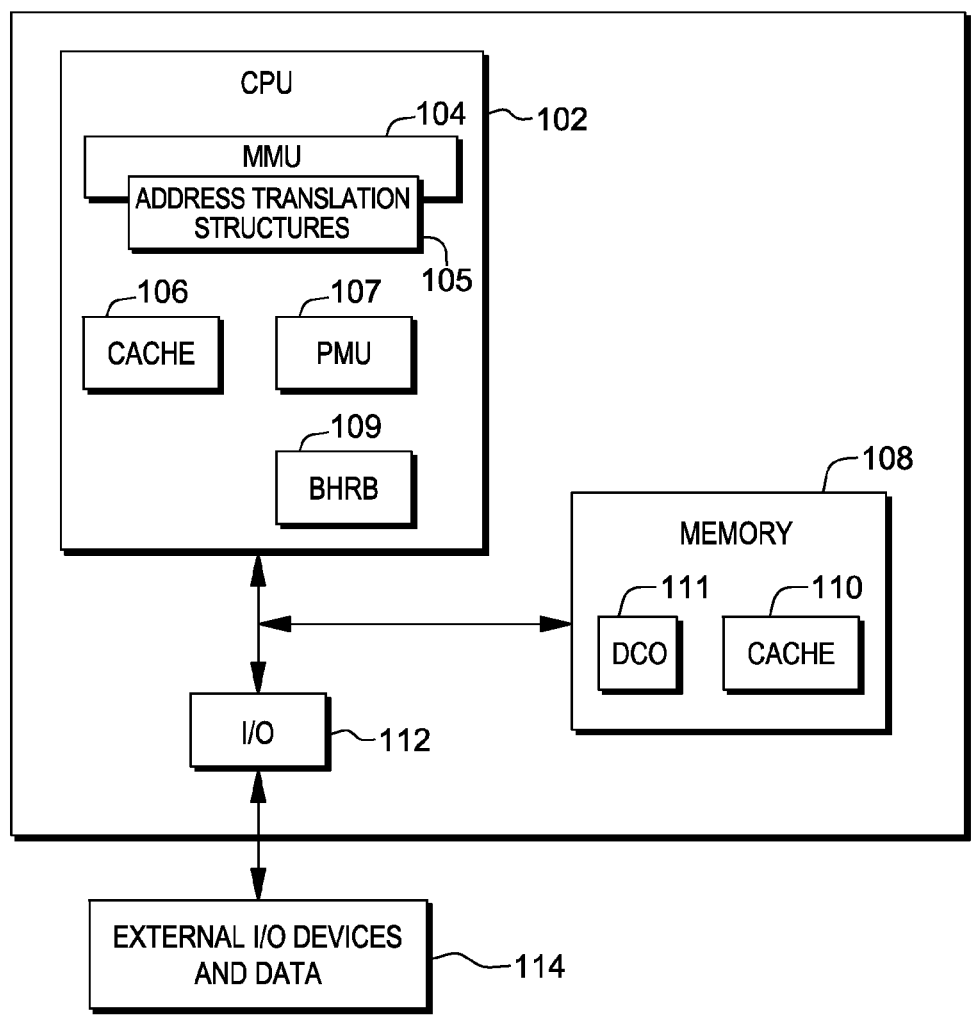
FIG. 1 depicts one example of a computing environment to incorporate and use one or more aspects of a transparent dynamic code optimization capability.

Dynamic code optimization offers significant opportunities to improve the operation of computer systems. For example, existing code can be modified to improve performance by re-optimizing hot regions, either from binary code, or from additional internal representation formats stored by the static compiler that will allow a re-optimization component to re-optimize code without decompiling the binary code. As other examples, dynamic code optimization may be used to avoid or fix errors, enhance security, provide additional features, etc.

In accordance with one or more aspects, an efficient and transparent dynamic code optimization capability is provided that natively executes code and identifies hot regions within the code or identifies code that is to otherwise be optimized; notifies an optimizer that such hot region or code has been identified enabling the optimizer to create optimized code; efficiently passes control to the newly optimized code; and transfers control back from such optimized code.

As one particular example, when hot regions are identified, patched code is provided. In one aspect, code is transparently patched while maintaining correct execution in, for instance, the presence of self-referential behavior, i.e., preserving the appearance that the code has not been modified. In one example, one or more portions of application code are modified (e.g., changed, revised, enhanced, updated, optimized, etc.), and therefore, the application code is considered patched (i.e., existing code is used along with the modifications). A portion of the code to be modified is copied, modified, and stored in one or more memory regions (e.g., pages of memory) that are separate from the memory regions storing the pre-existing or unmodified application code.

When code is patched, in accordance with one or more aspects, separate address translation is provided, which depends, for instance, on whether the translation is for an instruction fetch or a data access. For instance, data accesses (e.g., address translation for data accesses) are directed to the unmodified code (i.e., one or more first memory regions), while code translation (e.g., address translation for instruction fetches) is directed to the modified code (i.e., one or more second memory regions). Additionally, instruction fetches and data accesses for code of the application that has not been copied are directed to the same pre-existing code, which are also stored in the one or more first memory regions, in this example. This separate address translation is accomplished by, for instance, hardware support that selectively manages separate instruction and data translation within a processor, enabling only portions (e.g., modified portions) of the code to be duplicated rather than the entire code.

Computing environments of different architectures may incorporate and use one or more aspects of the transparent dynamic code optimization capability provided herein. For instance, environments based on the PowerPC architecture, also referred to as Power ISA, offered by International Business Machines Corporation (IBM®) and described in Power ISA™ Version 2.07, May 3, 2013, hereby incorporated by reference herein in its entirety, may include one or more aspects, as well as computing environments of other architectures, such as the z/Architecture, offered by International Business Machines Corporation, and described in z/Architecture—Principles of Operation, Publication No. SA22-7832-09, 10th Edition, September 2012, which is hereby incorporated by reference herein in its entirety.

POWER, POWER ARCHITECTURE, POWERPC, Z/ARCHITECTURE, IBM, AIX, POWERVM, Z/OS and Z/VM (referenced herein) are registered trademarks of International Business Machines Corporation, Armonk, N.Y. Other names used herein may be registered trademarks, trademarks or product names of International Business Machines Corporation or other companies.

One example of a computing environment to incorporate and use one or more aspects of the transparent dynamic code optimization capability is described with reference to FIG. 1. In one example, a computing environment 100 includes a processor (central processing unit—CPU) 102 that includes at least one memory management unit (MMU) 104, one or more address translation structures 105, and one or more caches 106. Further, in one embodiment, processor 102 includes a performance monitoring unit (PMU) 107 and a branch history rolling buffer (BHRB) 109, described in further detail below. Processor 102 is communicatively coupled to a memory portion 108 having one or more caches 110, and to an input/output (I/O) subsystem 112. Memory portion 108 includes, for instance, one or more caches 110, and a dynamic code optimizer (DCO) 111, which may be used to optimize applications executing within the processor. I/O subsystem 112 is communicatively coupled to external I/O devices 114 that may include, for example, data input devices, sensors and/or output devices, such as displays.

Memory management unit 104 is used in managing memory portion 108 including facilitating access to the memory by providing address translation. To improve address translation, the memory management unit utilizes one or more address translation structures 105 including, for instance, a translation lookaside buffer (TLB) and a segment lookaside buffer (SLB) which, in one embodiment, are located in the MMU. The TLB is a cache of previously translated addresses. Thus, when a request is received for a memory access that includes an address to be translated, the TLB is checked first. If the address and its translation are in the TLB, then no further translation process based on using any number of translation techniques is necessary. Otherwise, the received address is translated using one of any number of translation techniques.

Figure 2:
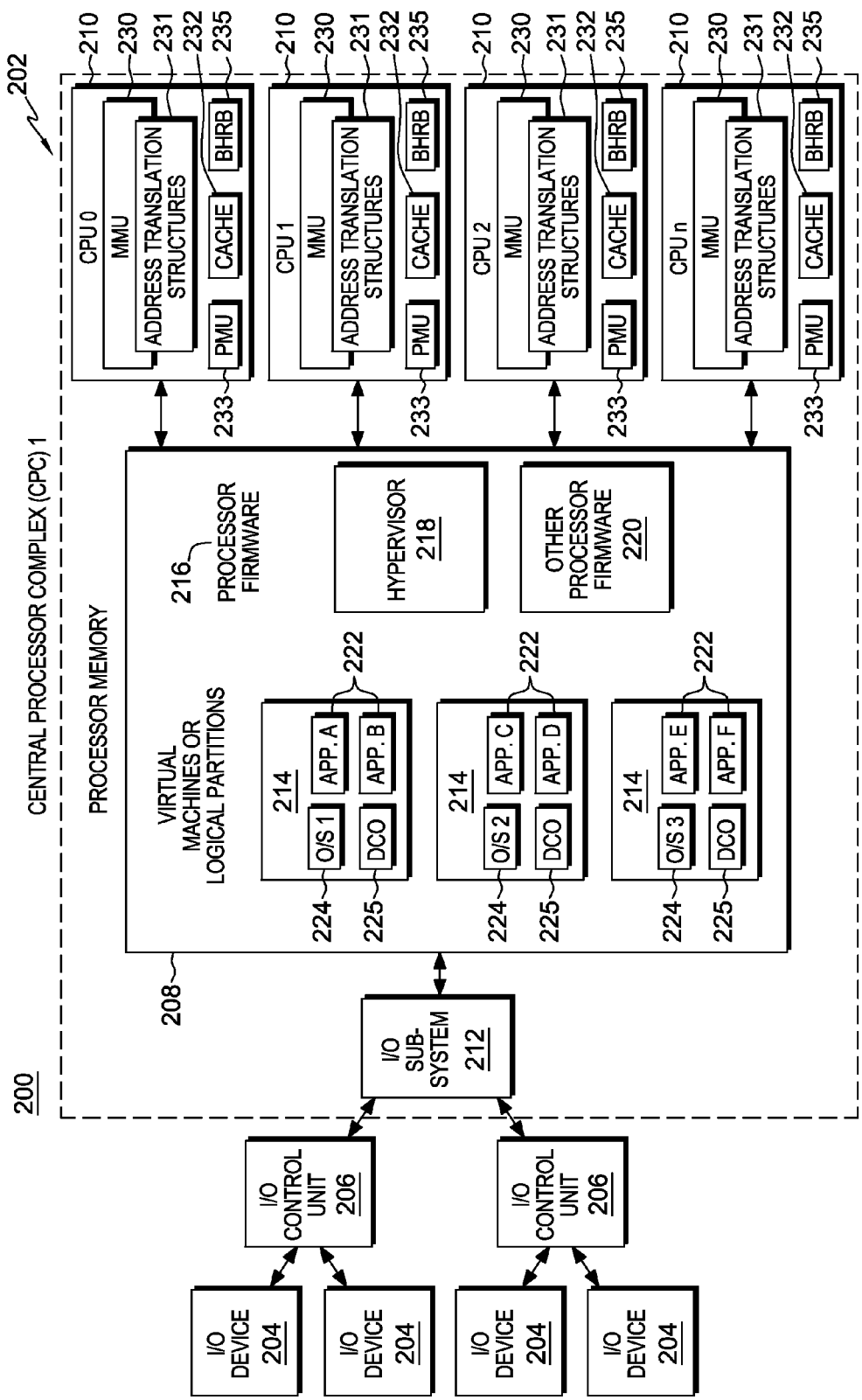
FIG. 2 depicts another example of a computing environment to incorporate and use one or more aspects of a transparent dynamic code optimization capability.

A further embodiment of a computing environment to incorporate and use one or more aspects of the transparent dynamic code optimization capability is depicted in FIG. 2. Referring to FIG. 2, in one example, a computing environment 200 includes a central processor complex (CPC) 202 coupled to one or more input/output (I/O) devices 204 via one or more control units 206. Central processor complex 202 includes processor memory 208 (a.k.a., main memory, main storage, central storage) coupled to one or more central processors (a.k.a., central processing units (CPUs)) 210 and an I/O subsystem 212, each of which is further described below.

Processor memory 208 includes one or more virtual machines 214 (for one example of the PowerPC architecture) or one or more logical partitions 214 (for one example of the z/Architecture), and processor firmware 216, which includes a hypervisor 218 and other processor firmware 220. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each virtual machine or logical partition 214 functions as a separate system and has one or more applications 222, and optionally, a resident operating system 224 therein, which may differ for each virtual machine or logical partition. In one embodiment, the operating system is the z/VM operating system, the z/OS operating system, the z/Linux operating system, the TPF operating system, the AIX operating system, the Power Linux operating system, the IBM i/OS operating system, or another operating system, offered by International Business Machines Corporation, Armonk, N.Y., or another operating system offered by another company. Further, each logical partition or virtual machine may include a dynamic code optimizer 225 or other optimizer that may execute as part of the operating system, part of one or more applications or on its own to provide optimized application code.

The virtual machines are managed by hypervisor 218, such as PowerVM, offered by International Business Machines Corporation, Armonk, N.Y.; and the logical partitions are managed by hypervisor 218, such as the Processor Resource/System Manager (PR/SM), offered by International Business Machines Corporation, Armonk, N.Y.

Central processors 210 are physical processor resources assignable to the virtual machines or allocated to the logical partitions. For instance, each virtual machine or logical partition 214 includes one or more logical processors, each of which represents all or a share of a physical processor 210 that may be dynamically allocated to the virtual machine or partition. A central processor may include a memory management unit (MMU) 230 and one or more address translation structures 231 providing address translation, as described herein, and at least one cache 232. Further, in one embodiment, central processor 210 includes a performance monitoring unit (PMU) 233, and a branch history rolling buffer (BHRB) 235, described further below.

Input/output subsystem 212 directs the flow of information between input/output devices 204 and main memory 208. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. Further, the I/O subsystem uses one or more input/output paths as communication links in managing the flow of information to or from input/output devices 204.

Figure 3A:
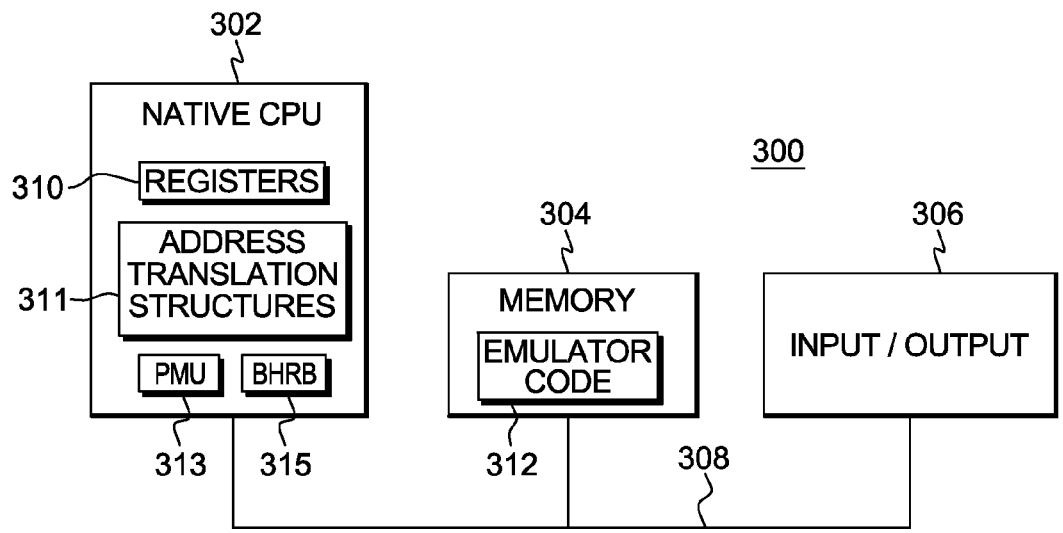
FIG. 3A depicts yet another example of a computing environment to incorporate and use one or more aspects of a transparent dynamic code optimization capability.

Another embodiment of a computing environment to incorporate and use one or more aspects of the transparent dynamic code optimization capability is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor, or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment, as well as one or more address translation structures 311. These registers include information that represents the state of the environment at any particular point in time. Further, in one embodiment, native central processing unit 302 includes a performance monitoring unit 313 and a branch history rolling buffer 315, described further below.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, Power Systems servers, HP Superdome servers or others, to emulate the z/Architecture and to execute software and instructions developed based on the z/Architecture, or allows machines based on architectures other than the Power Architecture, such as HP Superdome servers or others, to emulate the Power Architecture and to execute software and instructions developed based on the Power Architecture.

Figure 3B:
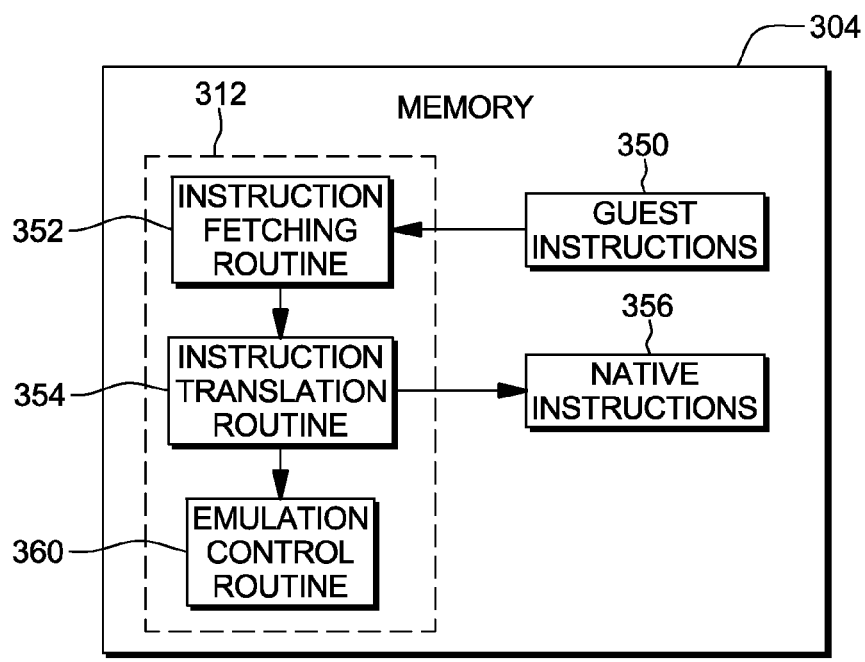
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a Power Architecture or z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Computing environments, such as those described above, are enhanced by including components that alter application programs executing within the environments to provide those application programs with additional features. For instance, a component, referred to as dynamic code optimization (DCO), may be provided that examines programs as they are executing, recognizes frequently executed code segments and optimizes those segments. Other types of optimization are also possible, as well as other types of components. Further, changes may be made to programs for other reasons, such as correcting an error, providing workarounds for known hardware errata, enhancing security, etc.

Changing a program while it is executing is complicated and issues may arise. For instance, if a program references itself, i.e., it is self-referential, it may detect the change and refuse to run or the change may cause it to run improperly due to it being self-referential. An example of a self-referential code may be a binary that validates its own correctness by computing the checksum of its program code, and comparing the computed result with an expected result to avoid tampering. Thus, in accordance with one aspect, a capability is provided that allows applications to be modified, while preserving self-referential integrity.

In one example, for dynamic code optimization, code that is not frequently used is maintained unchanged, and code that is frequently used, referred to as hot spots, are dynamically compiled into optimized code and the pre-existing code is patched to integrate the optimized code into the pre-existing code generating patched code. Then, to transfer to the optimized code, the original binary is modified (patched) by inserting a jump instruction to jump to the optimized code and when done, another jump instruction is inserted to jump back to the original code.

Figure 4:
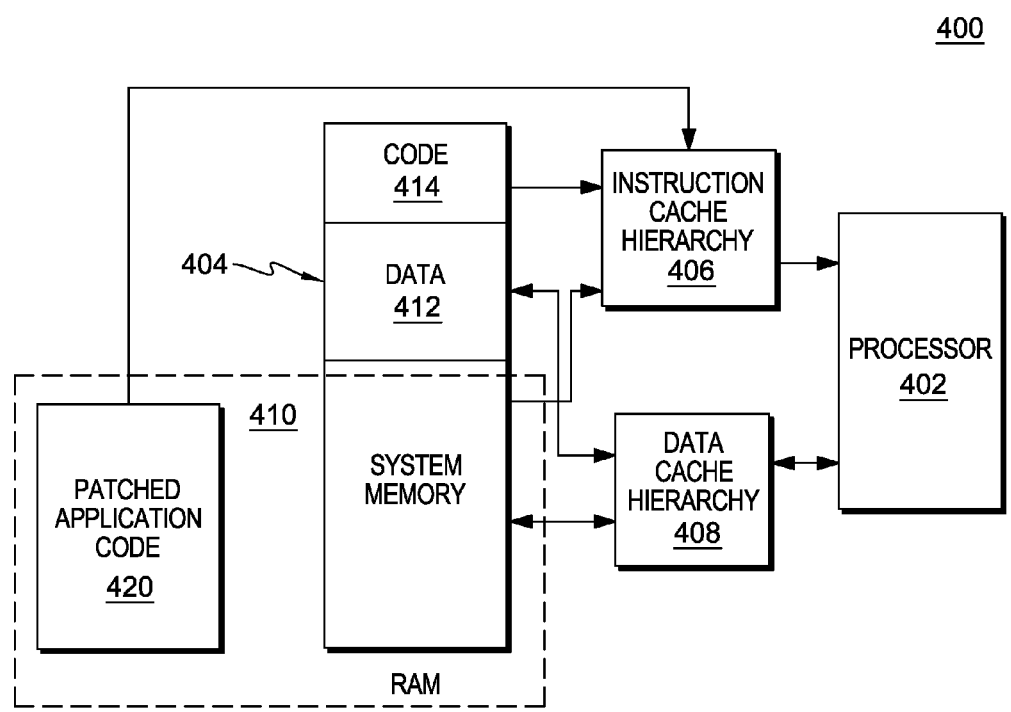
FIG. 4 depicts one example of a computing environment including patched application code.

One example of a computing environment that includes patched code is depicted in FIG. 4. This computing environment is based, for instance, on the PowerPC architecture offered by International Business Machines Corporation, however many other systems may incorporate and use one or more of the aspects described herein. As shown, a computing environment 400 includes, for instance, a processor 402 coupled to a memory 404 via one or more caches 406, 408. Memory 404 is, for instance, random access memory, having a plurality of portions, including, for example, system memory 410, which includes patched application code 420, and/or data for one or more applications; data memory 412, and code memory 414 (also referred to as instruction memory). Data memory 412 is memory used by, for instance, the optimizer; and code memory 414 is, for instance, code of the optimizer. Code memory 414 is coupled to instruction cache 406 accessed by processor 402; and data memory 412 and system memory 410 are coupled to data cache 408 accessed by processor 402. Further, system memory 410, including patched application code 420, is also coupled to instruction cache 406.

In particular, in one embodiment, system memory 410 includes, for instance, application code for one or more applications. For example, application code for a particular application is stored in one or more memory regions (e.g., pages) of system memory 410. If the particular application is modified, then it is referred to as patched application code, which includes the existing code plus the modified code. From a memory viewpoint, the portions of the patched application code that have not been modified continue to be stored in the same memory regions as the pre-existing application code, and any duplicated or modified code is stored in one or more memory regions of system memory 410 separate from the memory regions of the pre-existing or unmodified application code.

Since the patched application code includes modified code located in one or more separate memory regions and this modified code is to be hidden from data accesses, separate address translations for instruction fetches and data accesses relating to the modified code are provided, as described below. The use of separate address translations for instruction/data accesses, in conjunction with the memory mapping of FIG. 4, allows the view of memory from the instruction fetcher to be fenced off, enabling the use of patched code while maintaining referential integrity.

Figure 5:
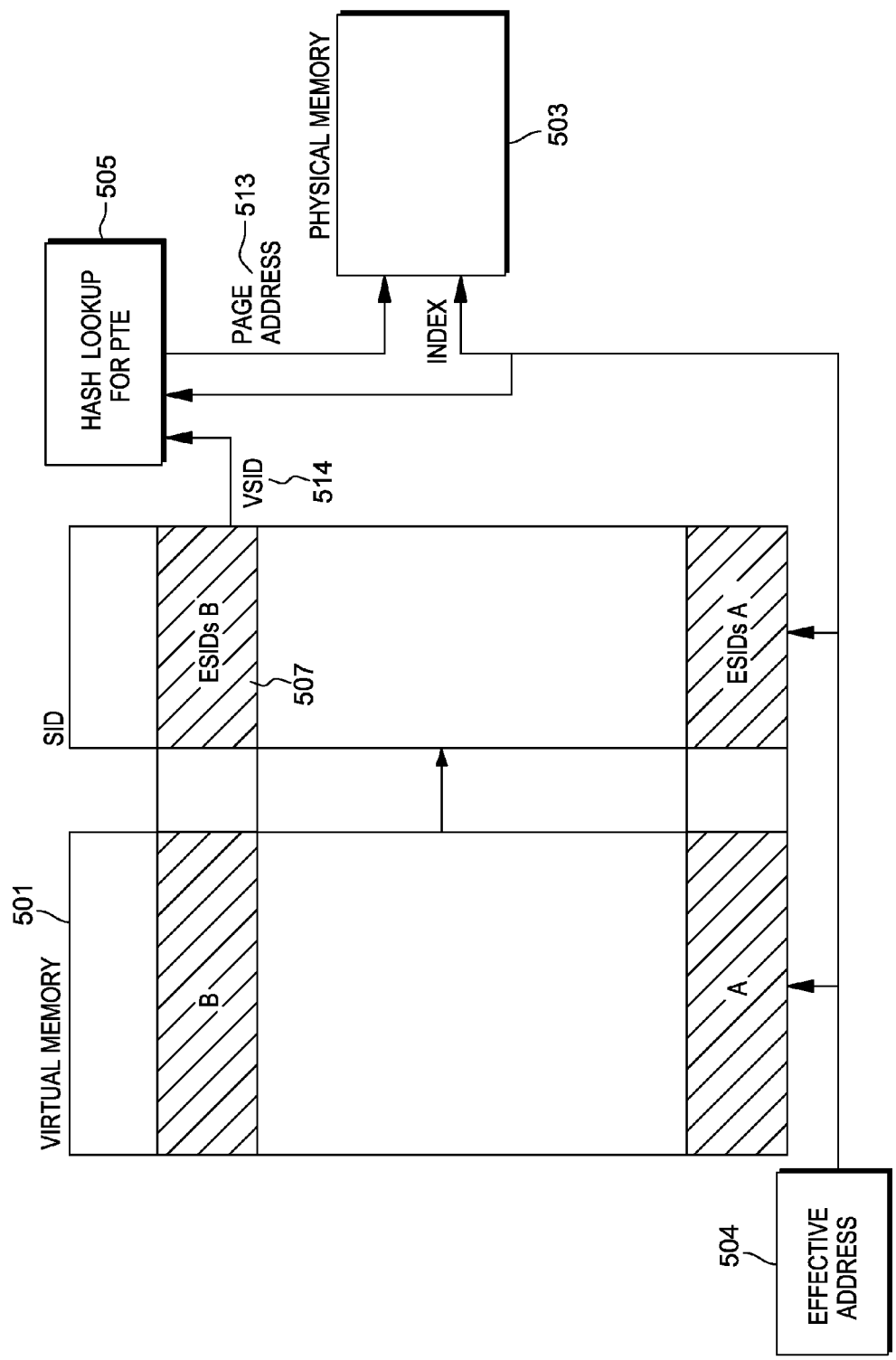
FIG. 5 illustrates an example of a high-level view of a virtual memory mapped to a physical memory using a hash page table technique.

Details regarding physical memory used by one or more of the computing environments described herein and access thereto are described with reference to FIG. 5. As is known, physical memory is of a defined size and in order to have the physical memory appear larger than it is, virtual memory is utilized. One example of a high-level view of virtual memory 501 mapped to a physical memory 503 (such as memory 108, 208, 304, 404 or a portion thereof) is depicted in FIG. 5. In this example, the mapping from virtual memory to real memory is via a hash page table (HPT) technique 505 to locate page table entries (PTEs), as used by, for example, Power ISA. In this example, programs only use sections (or segments) A and B of the virtual memory. Each segment of the virtual memory is mapped to a segment identifier (SID) entry 507 identified by an effective segment ID (ESID) (ESIDs for B and ESIDs for A included). An "effective address" 504 used by the program selects an SID entry, which includes the ESID value, as well as a virtual segment ID (VSID) 514 value. The VSID value represents the high-order bits of a virtual address to be used by hashing algorithm 505 to search the hash page table. A hashed value based on the VSID is used to locate a page table entry (PTE). The page table entry includes an address 513 of a page of physical memory 503.

Figure 6:
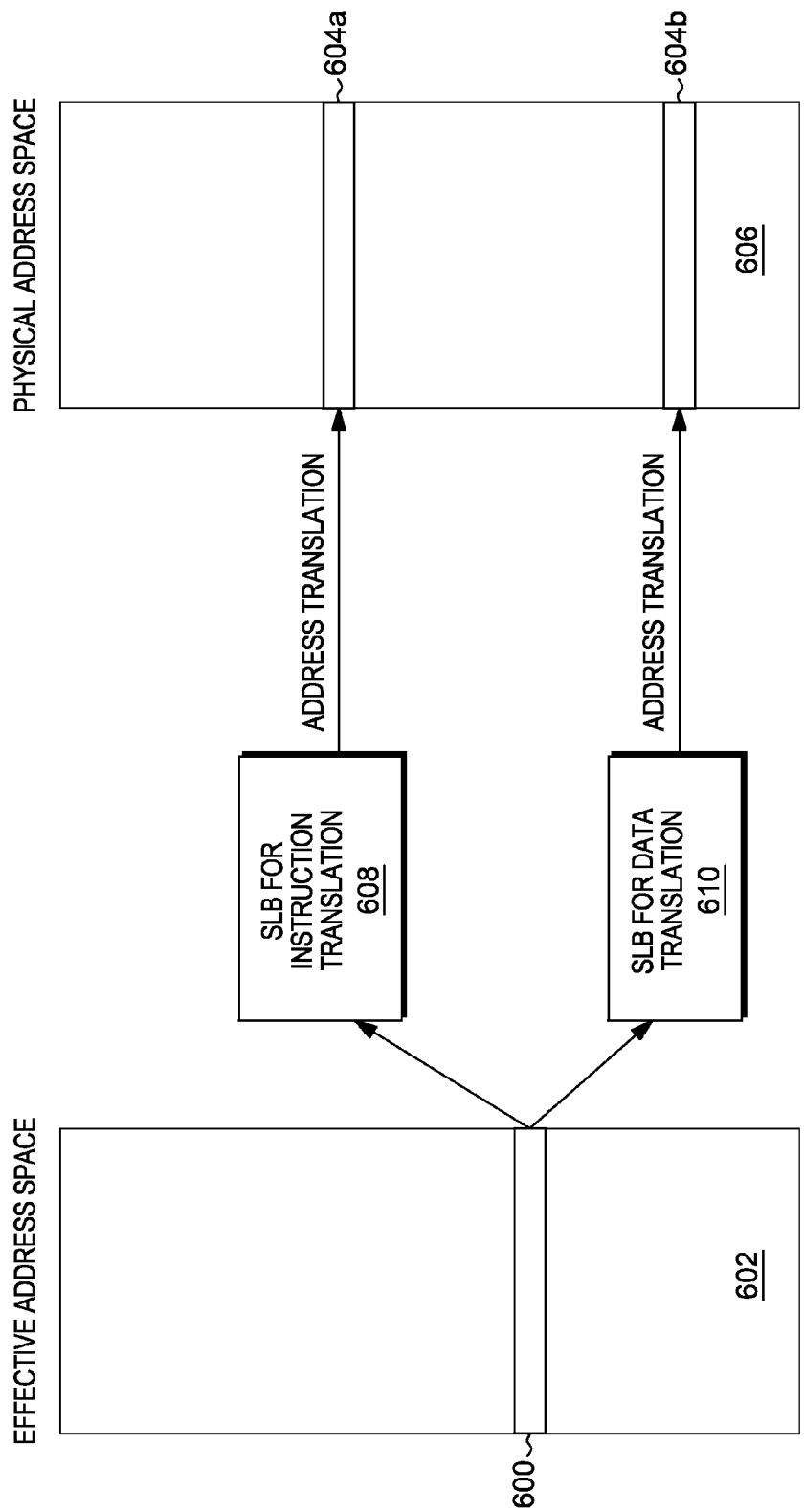
FIG. 6 depicts one example in which one effective address is able to be translated to different physical addresses.

As indicated above, an effective address is used to obtain a physical address in order to access a particular memory location. In accordance with one aspect, as depicted in FIG. 6, one effective address 600 in an effective address space 602 may translate to multiple physical addresses 604a, 604b of a physical address space 606 depending on whether the translation is for an instruction translation 608 or a data translation 610. In particular, in one embodiment, separate address translation (i.e., separate instruction and data translation) may be used in certain situations, such as for instance, when code has been modified, but the modified code is to be hidden from data accesses. In such a situation, the modified code is placed in a separate memory region at a different physical address than the unmodified code, and the physical address of the separate memory region is determined via address translation for instruction fetches. The unmodified code, however, is still accessed by data accesses, which use address translations for data accesses that point to another physical address (i.e., of the unmodified code). This allows, for instance, the view of memory the instruction fetcher sees to be fenced off from the view of the data accesses. For those situations, where the code is unchanged, address translation for instruction fetches and data accesses point to the same physical memory locations. These locations are referred to as being shared for instruction fetches and data accesses.

In accordance with one aspect, an address translation capability is described in which the address translation takes into consideration whether the memory access is for an instruction fetch or a data access. One embodiment of address translation is described with reference to FIGS. 7-10. The particular example described herein is for the PowerPC architecture; however, aspects of the address translation capability are not limited to such an architecture.

Figure 7:
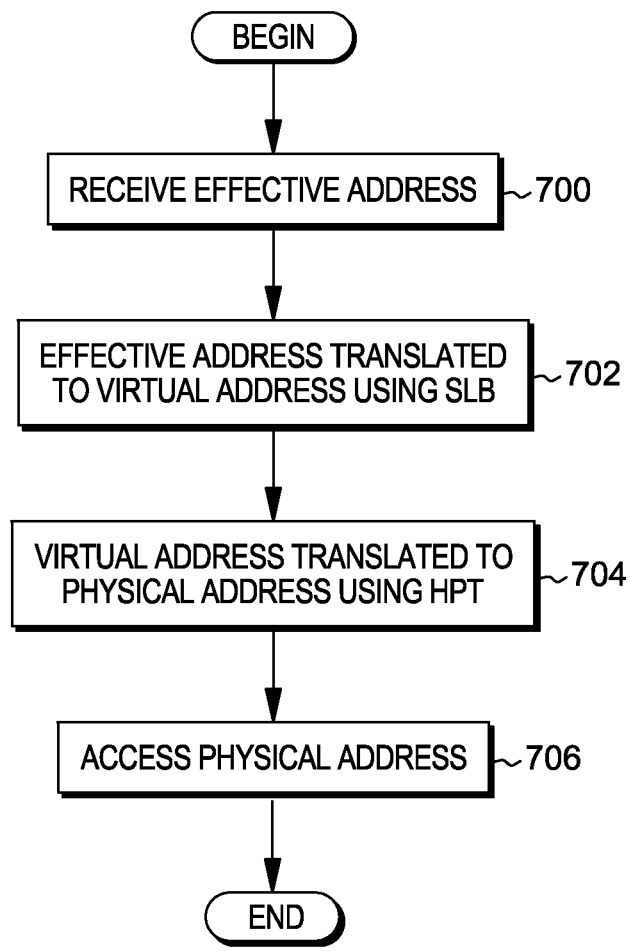
FIG. 7 depicts one embodiment of an address translation process.

Initially, referring to FIG. 7, a memory management unit (MMU) of a processor receives an effective address to be translated, STEP 700. The effective address is, for instance, a 64-bit address that may be received in an address translation request from the processor. As examples, the request may be from an instruction fetch unit of the processor, and therefore, the address to be translated is assumed to be for an instruction fetch, or the request may be from a load/store unit of the processor, and therefore, the address to be translated is assumed to be for a data access. In other embodiments, an indication in the request indicates whether the address translation is for an instruction fetch or a data access. The MMU translates the effective address to a virtual address, STEP 702. In one example, the translation from the effective address to the virtual address uses a segment lookaside buffer (SLB), as described further below. The MMU then translates the virtual address to a physical address, STEP 704. In one particular example, the translation from the virtual address to the physical address uses a hash page table, again as described further below. The MMU then uses the physical address to access the particular memory location, STEP 706.

Figure 8:
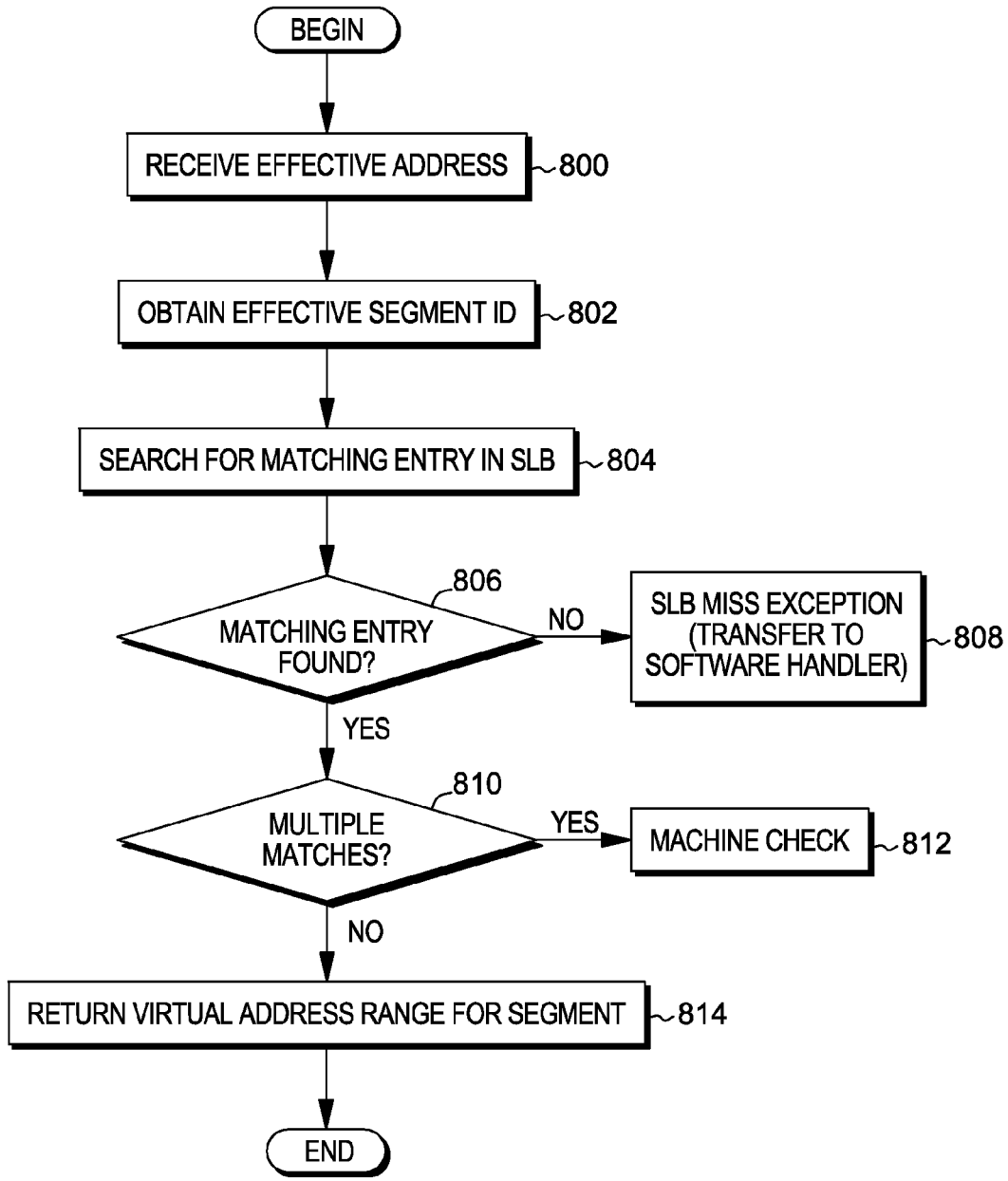
FIG. 8 depicts one embodiment of logic to translate an effective address to a virtual address.

Further details regarding translating from the effective address to the virtual address, by, for instance, the MMU are described with reference to FIGS. 8 and 9. Referring initially to FIG. 8, the MMU receives an effective address via, for instance, an address translation request sent from a particular unit (e.g., instruction fetch, load/store unit) of the CPU, STEP 800. Based on receiving the effective address, the MMU determines whether the address is for an instruction fetch or a data access. This can be determined, in one example, based on which unit (e.g., fetch unit or load/store unit of the CPU) the MMU received the address translation request or by an indicator associated with the request, as examples. For instance, if the address translation request came from the fetch unit, then it is assumed that the request is for an instruction fetch, and if it came from the load/store unit, it is assumed it is for a data access. Based on receiving the effective address, the MMU obtains an effective segment identifier from the effective address, STEP 802. The MMU then uses the effective segment identifier to search a segment lookaside buffer for a matching entry, STEP 804.

Figure 9:
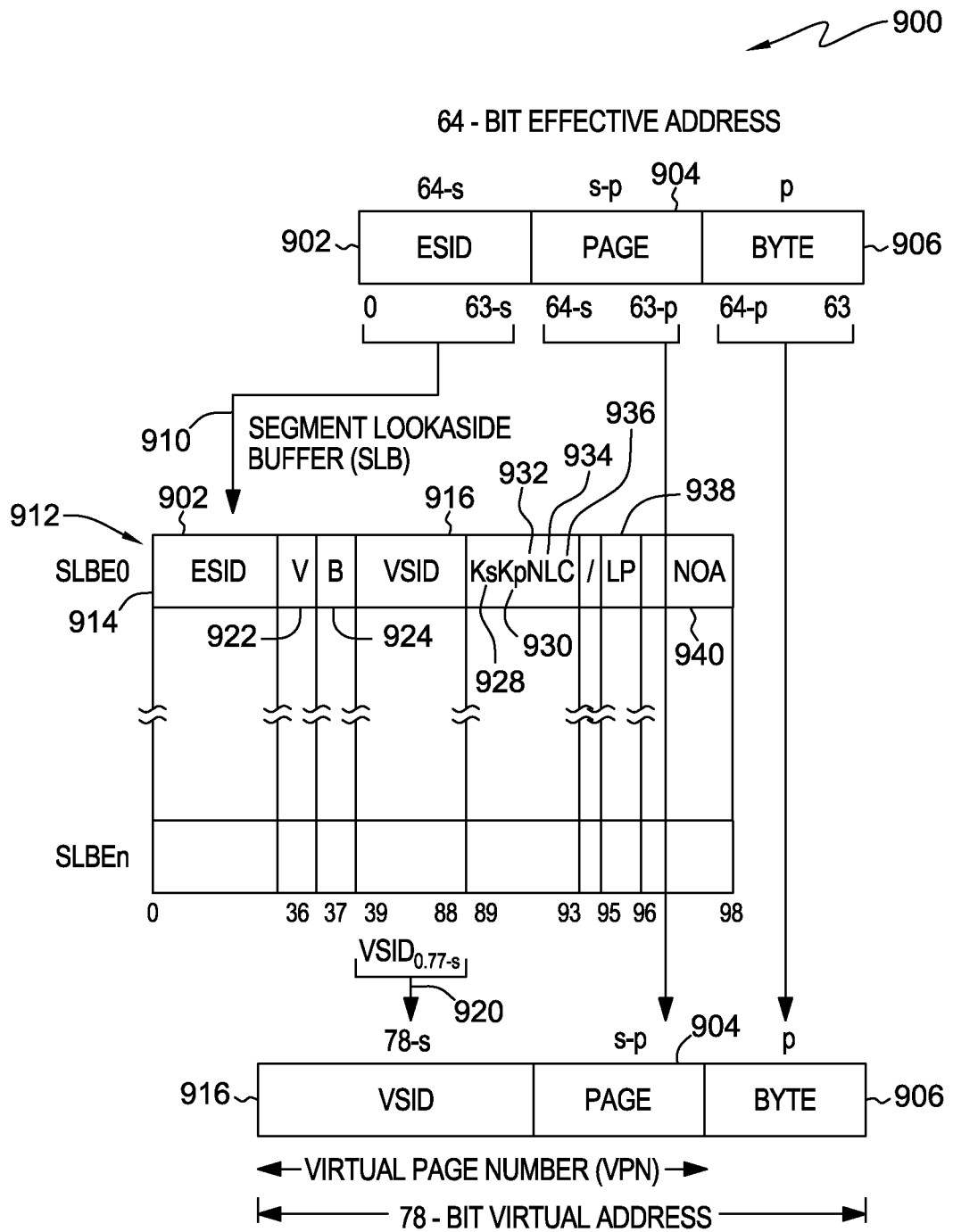
FIG. 9 pictorially depicts one embodiment of translating an effective address to a virtual address.

In particular, as shown in FIG. 9, in one embodiment, an effective address 900 is a 64-bit address including an effective segment identifier (ESID) 902, a page offset 904, and a byte offset 906. The effective segment identifier is extracted 910 from the effective address and used to search a segment lookaside buffer (SLB) 912 for a matching entry 914. A segment lookaside buffer (SLB) 912 is a cache of recently accessed segment ID entries. In one example, it is located in the MMU, but in other examples, it is located elsewhere. It specifies the mapping between effective segment IDs (ESIDs) and virtual segment IDs (VSIDs). The number of SLB entries (SLBE) in an SLB is implementation dependent, and in one example, includes at least 32 entries. In one example, segment lookaside buffer 912 includes a plurality of SLB entries 914, and each SLB entry 914 maps one ESID 902 to one VSID 916. In one example, SLBE 914 includes the following fields:

Effective segment ID (ESID) 902 (bits 0-35);

Entry valid indicator (V) 922 (bit 36) which indicates whether the entry is valid (V=1) or invalid (V=0);

Segment size selector (B) 924 (bits 37-38), which has the following meaning, in one example: 0b00-256 Megabytes (MB) (s=28); 0b01-1 Terabyte (TB) (s=40); 0b10-256 TB (s=48); and 0b11—reserved;

Virtual segment ID (VSID) 916 (bits 39-88);

Supervisor (privileged) state storage key indicator ($K_s$) 928 (bit 89);

Problem state storage key indicator ($K_r$) 930 (bit 90);

No-execute segment if N=1 indicator (N) 932 (bit 91). Instructions cannot be executed from a No-execute (N=1) segment;

Virtual page size selector bit 0 (L) 934 (bit 92);

Class indicator (C) 936 (bit 93);

The Class field of the SLBE is used in conjunction with, for instance, slbie (SLB invalidate entry) and slbia (SLB invalidate all) instructions. "Class" refers to a grouping of SLB entries and implementation-specific lookaside information so that only entries in a certain group need be invalidated and others might be preserved. The Class value assigned to an implementation-specific lookaside entry derived from the SLB entry is to match the Class value of that SLB entry. The Class value assigned to an implementation-specific lookaside entry that is not derived from an SLB entry (such as real mode address "translations") is 0.

Virtual page size selector bits 1:2 (LP) 938 (bits 95-96);

Segments may contain a mixture of page sizes. The L and LP bits specify the base virtual page size that the segment may contain. The $SLB_{L\|LP}$ encoding are those shown below, in one example. The base virtual page size (also referred to as the "base page size") is the smallest virtual page size for the segment. The base virtual page size is $2^b$ bytes. The actual virtual page size (also referred to as the "actual page size" or "virtual page size") is specified by $PTE_{L\|LP}$, where ∥ is a concatenation of the two values.

| Encoding | Page Size |
|---|---|
| 0b000 | 4 KB |
| 0b101 | 64 KB |
| additional values[1] | $2^b$ bytes, where b > 12 and b may differ among encoding values |

[1]In one embodiment, the "additional values" are implementation-dependent, as are the corresponding base virtual page sizes. Any values that are not supported by a given implementation are reserved in that implementation, in at least one embodiment.

No Access (NOA) indicator 940 (bits 97:98), which $NOA_0$=No Instruction (NOI); $NOA_1$=No Data (NOD); 0b00—SLBE can be used for both instruction fetches and data accesses; 0b01—SLBE can only be used for instruction fetches; 0b10—SLBE can only be used for data accesses; and 0b11—reserved.

For each SLB entry, software is to ensure the following requirements are satisfied.

L∥LP contains a value supported by the implementation.

The base virtual page size selected by the L and LP fields does not exceed the segment size selected by the B field.

If s=40, the following bits of the SLB entry contain 0s.
$ESID_{24:35}$
$VSID_{39:49}$ The bits in the above two items are ignored by the processor.

In accordance with one aspect, the NOA field specifies for each SLB entry whether the SLB entry is to be used to translate an effective memory address to a virtual address for instruction fetch and data access (NOA=0b00, in one encoding of allowed accesses for a segment in accordance with one aspect), for data accesses but not instruction fetch (NOA=0b10, in one encoding of allowed accesses for a segment in accordance with one aspect), and for instruction fetch but not data access (NOA=0b01, in one encoding of allowed accesses for a segment in accordance with one aspect).

It is legal to have multiple effective to virtual segment id translations, as long as only one is selected to be performed based on the NOA bits. To accomplish this, software is to ensure that the SLB contains at most one entry that translates a given instruction effective address, and that if the SLB contains an entry that translates a given instruction effective address ($NOA_0$=0), then no other entry can translate the same address for instruction fetches. In accordance with one aspect, when installing a new SLB entry for one or more access modes (e.g., instruction fetch), software is to ensure that any previously existing SLB translation entry of that effective address that may translate an address for such access mode has been invalidated. Likewise, software is to ensure that the SLB contains at most one entry that translates a given data effective address ($NOA_1$=0), and that if the SLB contains an entry that translates a given data effective address, then any previously existing translation of that effective address for data accesses has been invalidated. An attempt to create an SLB entry that violates these requirements may cause a machine check. In accordance with one embodiment, a machine check is a high priority interrupt to a firmware, hypervisor or other supervisor component to indicate that system integrity constraints have been violated.

In accordance with one embodiment, it is permissible for software to replace the contents of a valid SLB entry without invalidating the translation specified by that entry provided the specified restrictions are followed.

When the hardware searches the SLB, all entries are tested for a match with the effective address (EA). For a match to exist, the following conditions are to be satisfied for indicated fields in the SLBE.

V=1 (i.e., the valid bit is set for an entry)

$ESID_{0:63-s}=EA_{0:63-s}$, where the value of s is specified by the B field in the SLBE being tested.

The search is an instruction address search and NOI=0, or the search is a data address search and NOD=0.

In particular, in one embodiment, an entry in the SLB is matching if the entry is valid, has an effective segment identifier matching the obtained effective segment identifier from the effective address, and the No Access (NOA) SLB field is set for the type of memory access being performed, e.g., for an instruction fetch or a data access. The NOA includes, for instance, two bits, in which a value of 01 indicates an address can be used to match addresses associated with instruction access only; 10 indicates an entry can be used to match addresses associated with data access only; and 00 indicates an entry can be used to match addresses associated with both instruction fetches and data accesses. If the NOA field is set for the requested access and the effective SID is the same as the obtained effective SID, then there is a match.

Returning to FIG. 8, a determination is made as to whether a matching entry in the SLB was found, INQUIRY 806. In particular, the matching logic is performed in conjunction with the NOA field of FIG. 9 indicating the types of accesses each particular SLBE may translate. If no matching entry was found, then there is indicated an SLB miss exception, which transfers control to a software handler for handling the exception, STEP 808. In at least one embodiment, the software handler manages the SLB as a cache and reloads a new SLB entry (SLBE) from a table of SLBEs maintained in memory. If, however, a matching entry is found, INQUIRY 806, then a determination is made as to whether multiple matching entries were found, INQUIRY 810. If there are multiple matches, a machine check may be taken, STEP 812, since there should not be multiple matches, or in another embodiment, one of the entries is selected and used.

However, if there is one match (or one is selected), a virtual segment identifier (VSID) 916 (FIG. 9) in the SLB entry is extracted 920 and used as part of the virtual address. The VSID is concatenated with page offset 904 and byte offset 906 from the effective address to create the virtual address. This virtual address is then returned, STEP 814 (FIG. 8).

As described above, for the SLB search, if no match is found, the search fails. If one match is found, the search succeeds. If more than one match is found, one of the matching entries may be used as if it were the only matching entry, or a machine check occurs. If the SLB search succeeds, the virtual address (VA) is formed from the EA and the matching SLB entry fields as follows: VA= $VSID_{0:77-s}\|EA_{64-s:63}$. The Virtual Page Number (VPN) is bits 0:77-$p$ of the virtual address. The value of p is the actual virtual page size specified by the PTE used to translate the virtual address. If $SLBE_N$=1, the N (noexecute) value used for the storage access is 1.

On an instruction fetch, if $SLBE_N$=1, an Instruction Storage interrupt may occur without the page table being searched. If the SLB search fails, a segment fault occurs. This is an instruction segment exception or a data segment exception, depending on whether the effective address is for an instruction fetch or for a data access.

The virtual address created from translation of the effective address is then translated to a physical address (a.k.a., a real address) using, for instance, a hash page table. Further details regarding translation using a hash page table are described with reference to FIG. 10.

Figure 10:
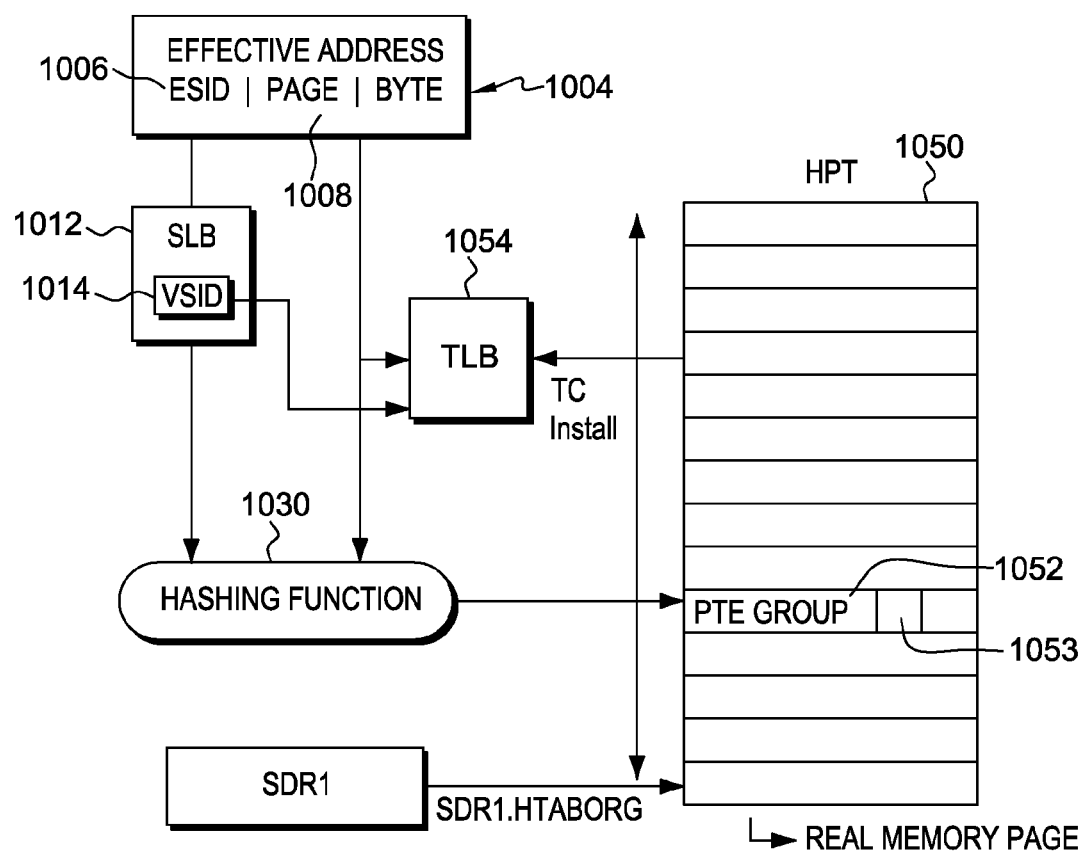
FIG. 10 depicts one example of a hash page table translation structure.

In particular, FIG. 10 illustrates one example of a hash page table (HPT) translation structure used by Power ISA. ESID portion 1006 of an effective address (EA) 1004 is used to locate an entry in SLB 1012. The entry includes a VSID field 1014. The value of VSID field 1014 and the page portion 1008 of EA 1004 are hashed 1030 to produce a hash value that is used to locate a page table entry (PTE) group 1052 in a hash page table (HPT) 1050. (In another embodiment, since the virtual address was previously created, the VSID and page portion may be extracted directly from the formed virtual address.) In at least one embodiment, the hash page table is located by a page table origin address provided by the processor. Page table entries 1053 of PTE group 1052 are searched to locate a corresponding PTE having a field matching a value of a most-significant-portion of the VSID. When a corresponding PTE is found, the address (e.g., real address) of the physical memory page in the PTE is used to access physical memory. In order to improve performance, once a PTE entry is found, the page portion 1008 of EA 1004 and the address of the physical memory page found in the PTE are stored in TLB 1054, such that further accesses to the same EA page will "hit" in TLB 1054 and avoid the PTE search.

As described above, in one example, address translation is performed based on a particular attribute, such as, for instance, the type of access: instruction fetch or data access. To enable this, a mechanism is provided that includes a field in the SLB to prevent SLBEs from being used for instruction-side or data-side accesses. This field, as indicated above, is the No Access (NOA) field. The NOA is used to indicate that a particular SLBE associated with the NOA can be used for only instruction fetches, only data accesses, or for both instruction fetches and data accesses (e.g., when the code is not modified).

In accordance with one embodiment, the NOA field is separately specified for each segment in conjunction with an SLB entry, thereby allowing some effective address segments (memory regions of the input address) to be translated to a common segment address for instruction and data accesses (memory regions of the output address), and other segments (memory regions of the input address) to be translated to separate segment addresses for instruction and data accesses (memory regions of the output address), respectively, or to provide a translation for one type of access (e.g., instruction access), but not another type of access (e.g., data access) by loading an appropriate SLB entry for one type of access, but not another. While the description has been made with respect to the presence of a NO Access field, and to a specific encoding of a NO Access field in the SLB, it is understood that other fields, other encodings for such fields, or both, may be used to identify the types of permissible access for a translation.

Figure 11:
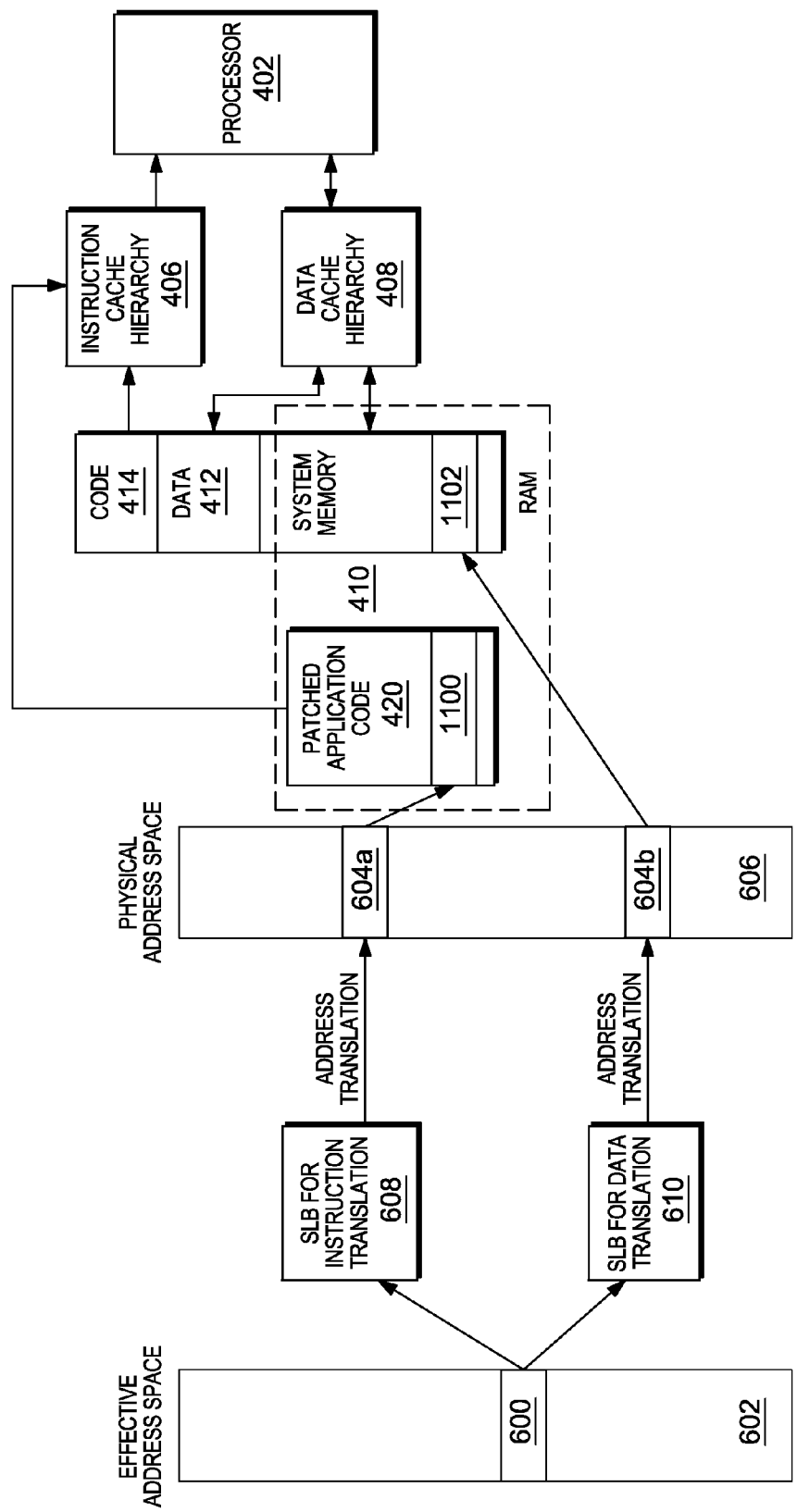
FIG. 11 depicts one example of an effective address being translated to separate physical addresses.

As described herein, in accordance with one or more aspects, the separate instruction/data address translation technique is used to redirect address translation to a particular region of memory that includes modified code for instruction fetches and another region of memory that includes the unmodified code for data accesses, as shown in FIG. 11.

Referring to FIG. 11, in one example, patched application code 420 includes a modified portion, and that modified portion is stored in one or more memory regions 1100 of system memory 410. The unmodified portion corresponding to the modified portion continues to be in other memory regions 1102 of system memory 410. In particular, the other memory regions 1102 include that application code prior to modification.

In this embodiment, an effective address 600 is used to access memory region 1100 or memory region 1102 depending on whether the address translation is for an instruction fetch 608 for a modified portion or a data access 610 for an unmodified portion. If, for instance, the translation is for an instruction fetch of a modified portion, then effective address 600 is translated to physical address 604a, which points to memory region 1100 that includes the modified code. However, if the address translation is for a data access, then effective address 600 is translated to physical address 604b, which points to memory region 1102, which includes the unmodified, pre-existing or original code corresponding to the modified code.

Figure 12:
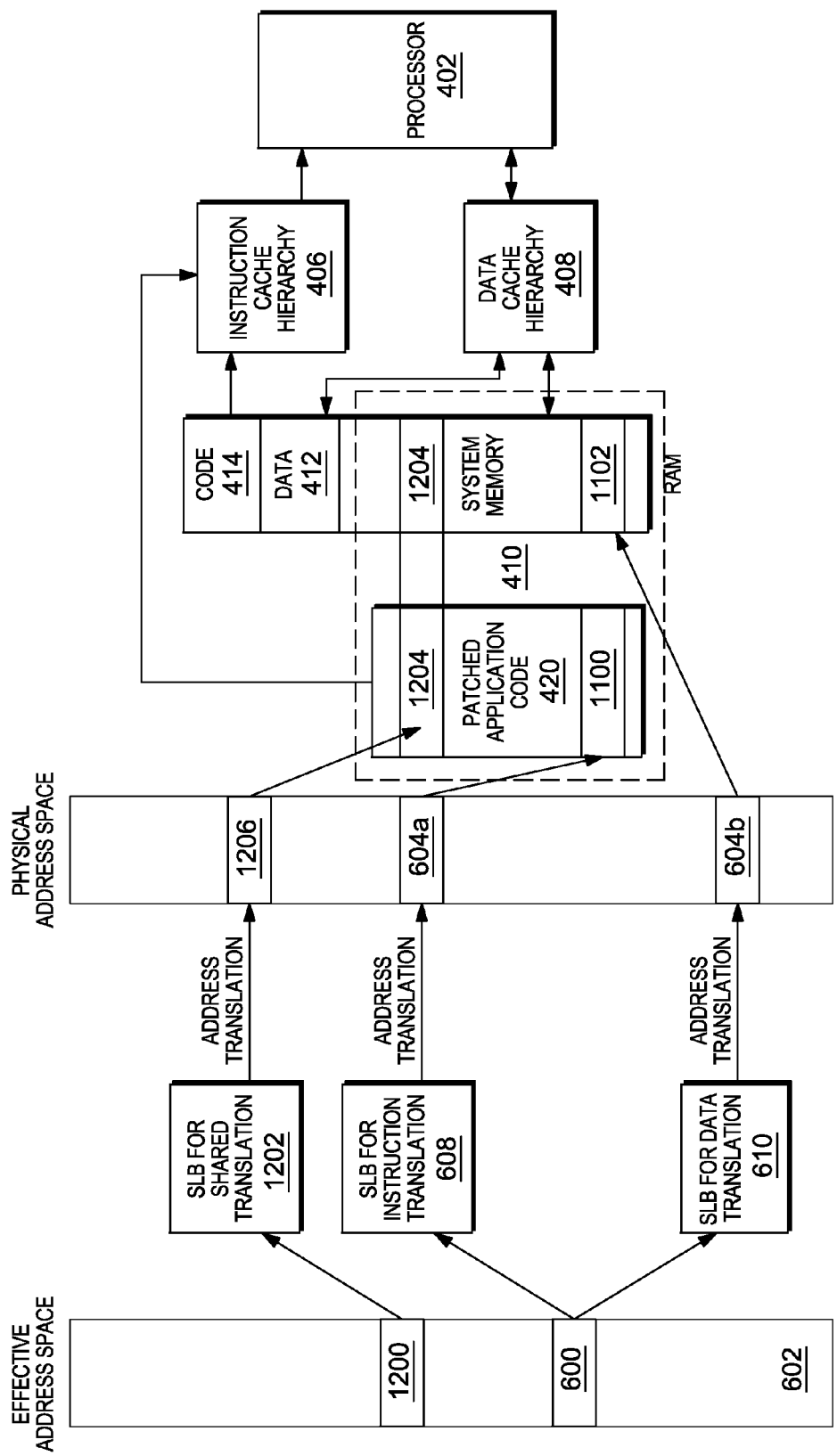
FIG. 12 depicts examples of translating effective addresses to physical addresses.

In a further embodiment, with reference to FIG. 12, an effective address 1200 may use a shared translation 1202, in which a same memory region 1204 is used for an instruction fetch and a data access (since, for instance, that code portion has not been modified). In this example, effective address 1200 is translated to a physical address 1206, which points to memory region 1204.

The address translation capability described above is used, in one or more examples, in environments that provide dynamic code optimization. Dynamic code optimization (a.k.a., dynamic compilation and optimization) offers significant opportunities to improve the operation of computer systems. For instance, existing code can be modified to improve performance by re-optimizing hot regions, avoiding errors, correcting for errors, enhancing or changing security, providing additional features, etc.

One example of dynamic code optimization is described with reference to FIG. 13. In this example, the optimization is to identify and optimize for hot regions. However, similar logic is used to optimize for other reasons.

Figure 13:
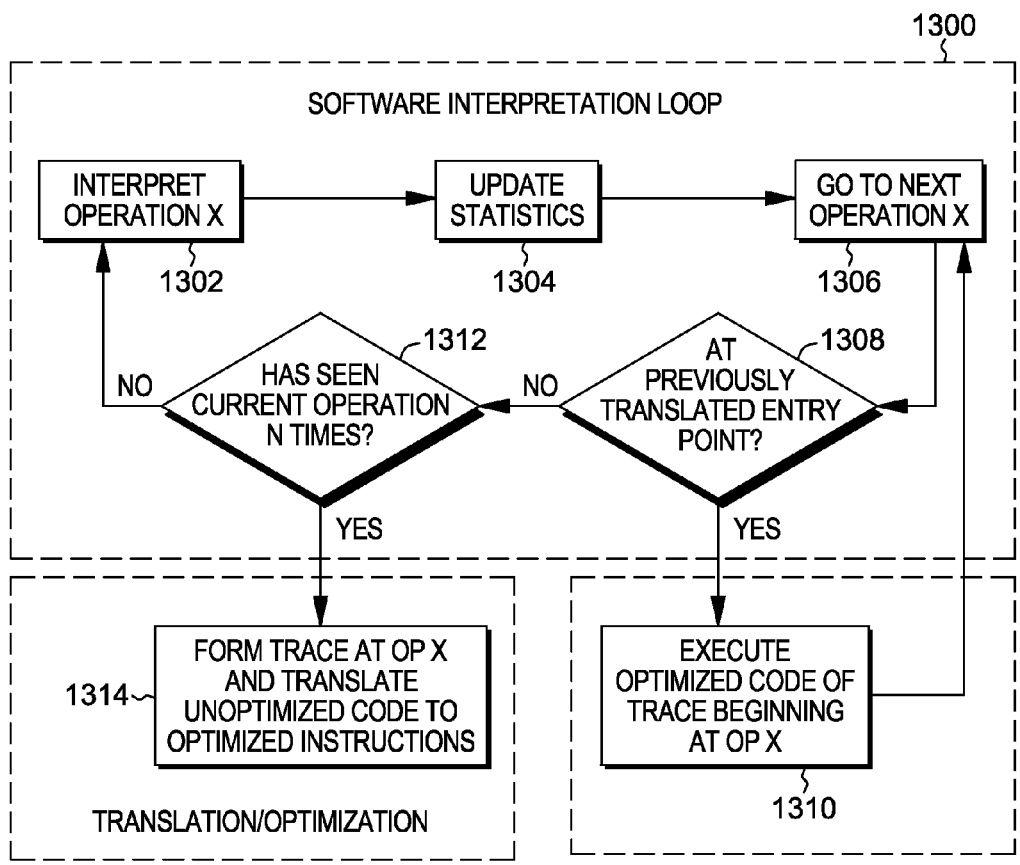
FIG. 13 depicts one example of a software interpretation loop coupled to an optimization component.

Referring to FIG. 13, a software interpretation loop 1300 is used to interpret infrequently executed code, find hot regions using runtime statistics collection, identify points to transfer to optimized code, and transfer to the optimized code. In one example, the loop starts at STEP 1302 in which an operation (e.g., Operation X) is interpreted for the native architecture (e.g., PowerPC) and executed. Based on interpretation and execution of the operation, various statistics are updated by the software, STEP 1304. Then, processing continues to the next operation (e.g., next Operation X), STEP 1306. A determination is made by the software as to whether processing has reached a previously translated entry point (i.e., optimized code), INQUIRY 1308. If so, then control is transferred by software to the optimized code and execution of the optimized code begins at Operation X, STEP 1310. Optimized code of execution traces continues until execution reaches an instruction not part of optimized code, in which case processing then continues to STEP 1306. However, if a previously translated entry point has not been reached, then a further determination is made as to whether this current operation has been seen a predefined number of times, INQUIRY 1312. If not, then processing continues with interpreting the next operation, STEP 1302. Otherwise, if the operation has been seen a predefined number of times, then control passes to the optimizer in which a trace is formed at that operation and the unoptimized code is translated into optimized instructions, STEP 1314.

Figure 14:
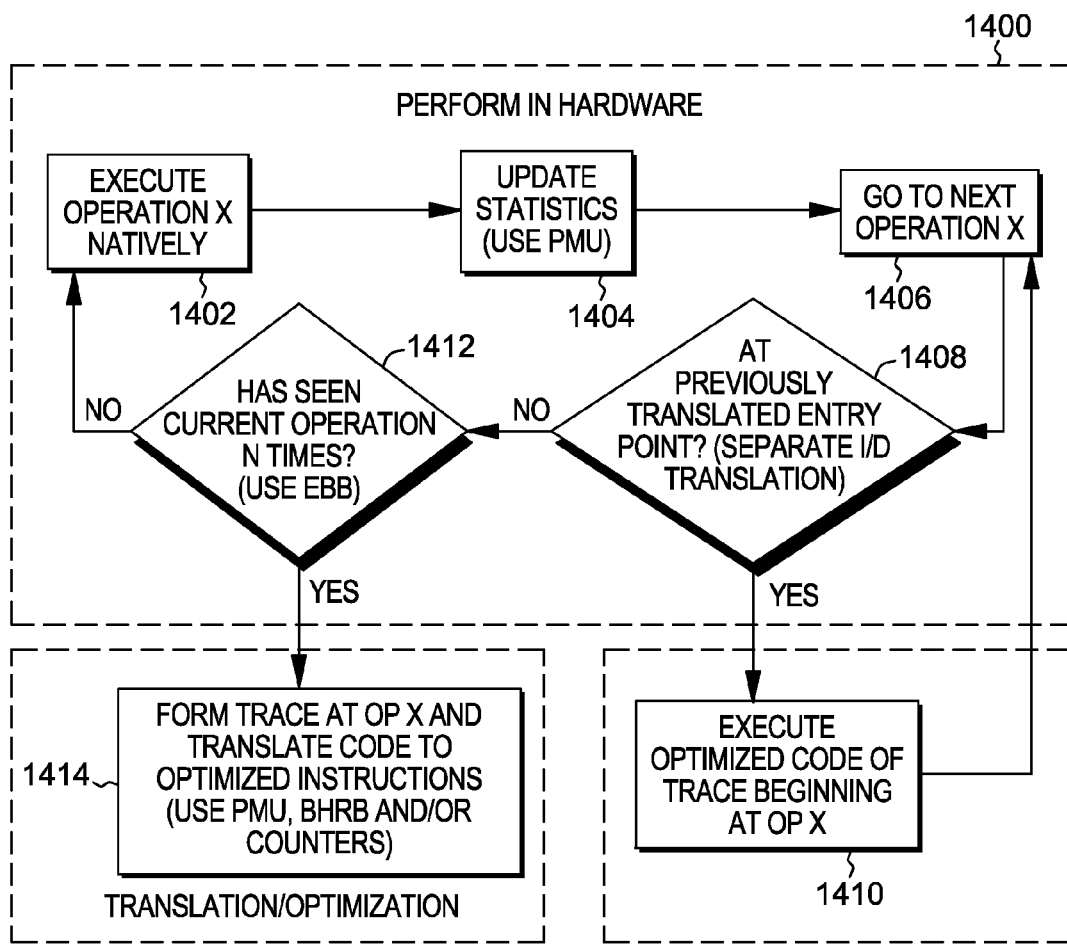
FIG. 14 depicts one example of using hardware to perform certain aspects of the software interpretation loop and optimization of FIG. 13.

Various aspects of the above-described dynamic code optimization are enhanced, in accordance with one or more aspects, by using hardware and/or various architected features instead of software, as described herein. For instance, referring to FIG. 14, instead of an interpretation loop, there is an execution loop 1400 in which the steps are performed in hardware. Starting at STEP 1402, an operation (e.g., Operation X) is executed natively in, for instance, PowerPC. Based on execution of the operation, various statistics are updated using, for instance, a hardware performance monitoring unit, as described herein, STEP 1404. The statistics to be collected are programmed based on the system. As examples, statistics are collected on branches taken, branch prediction correctness, address translation events, cache events, and/or implementation-dependent events, etc.

Processing then continues to the next operation (Operation X), STEP 1406. A determination is made as to whether processing has reached a previously translated entry point (i.e., an optimized point; e.g., at a branch into optimized code; or the instruction is in optimized code), INQUIRY 1408.

If processing has reached a previously executed translated entry point, then the optimized code is executed, STEP 1410. The separate I/D address translation described herein, as well as other architected features, enable transparent code patching to directly transfer between unmodified and optimized code. Thus, the optimized code is reached using, for instance, an instruction fetch translated using an instruction only SLBE. After the optimized code is executed, processing transfers back to the unmodified code, STEP 1406. For instance, transferring back is by way of copying portions of the code in an unmodified manner to a memory page also storing optimized code. In one embodiment, the initial optimized code contains a branch to another page containing further optimized code. In another example, a special register, referred to as a target address register (TAR), is used to transfer back to the unmodified code. In one embodiment, a TAR register is an additional resource provided in accordance with one aspect for the optimizer that does not interfere with the state of the application stored in other registers and is not available for use by unoptimized application programs. In one further embodiment, the TAR register is only available to code executing in pages reached via instruction-only translations. In yet another embodiment, the TAR register is under control of additional control registers or address translation controls, e.g., as a part of an extended mode supporting the execution of code generated by a dynamic optimizer.

Returning to INQUIRY 1408, if processing is not at a previously translated entry point, then a determination is made as to whether the processor has seen this current operation a predefined number of times, INQUIRY 1412. If not, then processing continues with STEP 1402. Otherwise, in one aspect, processing transfers to the optimizer, since, for instance, a hot region has been determined. In one example, an architected event based branch facility is used to facilitate the transfer, as described herein. In another embodiment, an exception is raised by a performance monitoring unit. In yet other embodiments, other notification mechanisms are used in conjunction with one or more aspects.

Based on the transfer, the optimizer forms a trace at the operation and optimizes the native code to translated instructions, STEP 1414. In performing the optimized code, the optimizer analyzes performance statistics gathered by the PMU, and/or the BHRB or other counters. After optimization, in one embodiment, processing continues with STEP 1410 to start executing the code corresponding to the hot spot identified by INQUIRY 1412. (In another embodiment, processing may continue at STEP 1406.)

As described above, in one or more aspects, a dynamic optimization system operates in conjunction with dedicated hardware support. The dedicated hardware support includes, for instance, the capability to transparently modify an instruction stream to transfer control to optimized code. In one example, this modification is performed by separating the instruction and data such that the modification of instructions is invisible to the application. Further, a performance monitoring infrastructure is adapted to identify hot regions or other optimizable code by way of performance monitor counters and gather additional runtime path information. Moreover, additional architected resources for the benefit of the dynamic optimizer are provided, such that an optimizer may generate optimized code using additional resources, as an example. Various of these hardware features are described below.

For instance, one of the hardware features used by the transparent dynamic code optimization capability is a performance monitor facility. The performance monitor facility provides a means of collecting information about program and system performance. In one embodiment, it is controlled by one or more of the following features:

An MSR (Machine State Register) bit
    PMM (Performance Monitor Mark), which can be used to select one or more programs for monitoring Registers
    PMC1-PMC6 (Performance Monitor Counters 1-6), which count events;
    MMCR0, MMCR1, MMCR2, and MMCRA (Monitor Mode Control Registers 0, 1, 2, and A), which control the performance monitor facility;
    SIAR, SDAR, and SIER (Sampled Instruction Address Register, Sampled Data Address Register, and Sampled Instruction Event Register), which contain the address of the sampled instruction and of the sampled data, and additional information about the sampled instruction;

The Branch History Rolling Buffer (BHRB), which is a buffer that contains the target addresses of most recent branch instructions for which the branch was taken; and The performance monitor interrupt, which can be caused by monitored conditions and events.

Many aspects of the operation of the performance monitor are summarized by the following hierarchy, provided as one example, which is described starting at the lowest level:

A counter negative condition exists when the value in a PMC is negative (i.e., when bit 0 of the PMC is 1). A Time Base transition event occurs when a selected bit of Time Base changes from 0 to 1 (the bit is selected by a field in MMCR0). The term condition or event is used as an abbreviation for counter negative condition or Time Base transition event. A condition or event can be caused implicitly by the hardware (e.g., incrementing a PMC) or explicitly by software (e.g., using a move to special purpose register (e.g., mtspr) instruction; in executing the mtspr instruction, contents of a register, RS, designated in mtspr are placed in the special purpose register also designated in mtspr).

A condition or event is enabled if the corresponding enable bit (i.e., PMC1CE, PMCjCE, or TBEE) in MMCR0 is 1. The occurrence of an enabled condition or event can have side effects within the performance monitor, such as causing the PMCs to cease counting.

An enabled condition or event causes a performance monitor alert if performance monitor alerts are enabled by the corresponding enable bit in MMCR0. A single performance monitor alert may reflect multiple enabled conditions and events.

When a performance monitor alert occurs, MMCR0$_{PMAO}$ is set to 1 and the writing of BHRB entries, if in process, is suspended.

When the contents of MMCR0$_{PMAO}$ change from 0 to 1, a performance monitor exception will come into existence within a reasonable period of time. When the contents of MMCR0$_{PMAO}$ change from 1 to 0, the existing performance monitor exception, if any, will cease to exist within a reasonable period of time, but not later than the completion of the next context synchronizing instruction or event.

A performance monitor exception causes one of the following:

If MSR$_{EE}$=1 and MMCR0$_{EBE}$=0, an interrupt occurs.

If MSR$_{PR}$=1, MMCR0$_{EBE}$=1, a performance monitor event-based exception occurs if BESCR$_{PME}$=1, provided FSCR$_{EBB}$ and HRSCR$_{EBB}$ are enabled. When a performance monitor event-based exception occurs, an event-based branch is generated if BESCR$_{GE}$=1.

The performance monitor can be effectively disabled (i.e., put into a state in which performance monitor special purpose registers (SPRs) are not altered and performance monitor exceptions do not occur) by setting MMCR0 to a defined value.

The performance monitor registers count events, control the operation of the performance monitor, and provide associated information. For instance, the six performance monitor counters, PMC1 through PMC6, are, e.g., 32-bit registers that count events.

PMC1-PMC4 are referred to as programmable counters since the events that can be counted can be specified by the program. The codes that identify the events that are counted are selected by specifying the appropriate code in PMCn selector fields in MMCR1. Some events may include operations that are performed out-of-order.

PMC5 and PMC6 are not programmable, in one example. PMC5 counts instructions completed and PMC6 counts cycles. The PMCC field in MMCR0 control whether or not PMCs 5-6 are under the control of various bits in MMCR0 and MMCR2. When PMCs 5-6 are not under the control of these bits, they do not cause performance monitor events.

Normally each PMC is incremented each hardware cycle by the number of times the corresponding event occurred in that cycle. Other modes of incrementing may also be provided.

A threshold event counter and associated controls are in MMCRA. When the performance monitor is enabled (MMCR0$_{PMAE}$=1), this counter begins incrementing from value 0 upon each occurrence of the event specified in the threshold event (TEV) field after recognizing the event specified by the threshold start (TS) field. The counter stops incrementing when the event specified in the threshold end (TE) field occurs. The counter subsequently freezes until the event specified in the TS is again recognized, at which point it increments as explained above. Incrementing stops when a performance monitor alert occurs. After the performance monitor alert occurs, the contents of STAR are not altered by the hardware until software sets MMCR0$_{PMAE}$ to 1.

The threshold counter value is represented as a base-4 floating point number. The mantissa of the floating point number is contained in MMCRA$_{TECM}$, and the exponent is contained in MMCRA$_{TECX}$. For a given counter mantissa, m, and exponent, e, the number represented is as follows: N=4$^e$*m.

This counter format allows the counter to represent a range of 0 through approximately 2 M counts with many fewer bits than would be required by a binary counter.

The value in the counter is the exact number of events that occur for values from 0 through the maximum mantissa value (127), within 4 events of the exact value for values from 128-508 (or 127*4), within 16 events of the exact value for values from 512-2032 (0r 127*4$^2$), and so on. This represents an event count accuracy of approximately 3%, which is expected to be sufficient for most situations in which a count of events between a start and end event is required.

A monitor mode control register 0 (MMCR0) is a 64-bit register, in which some bits are altered by the hardware when various events occur, and some bits may be altered by software.

One example of bits of MMCR0 include, for instance:

| Bit(s) | Description |
| --- | --- |
| 0:31 | Reserved |
| 32 | Freeze Counters (FC) |
| | 0    The PMCs are incremented (if permitted) by other MMCR bits). |
| | 1    The PMCs are not incremented. |
| | The hardware sets this bit to 1 when an enabled condition or event occurs and MMCR0$_{FCECE}$ = 1. |
| 33 | Freeze Counters and BHRB in Privileged State (FCS) |
| | 0    The PMCs are incremented (if permitted by other MMCR bits), and entries are written into the BHRB (if permitted by the BHRB instruction filtering mode field in MMCRA). |
| | 1    The PMCs are not incremented and entries are not written into the BHRB if MSR$_{HV\ PR}$ = 0b00. |
| 34 | Conditionally Freeze Counters and BHRB in Problem State (FCP) |
| | If the value of bit 51 (FCPC) is 0, this field has the following meaning, in one example: |
| | 0    The PMCs are incremented (if permitted by other MMCR bits) and entries are written into the BHRB (if permitted by the BHRB instruction filtering mode field in the MMCRA). |
| | 1    The PMCs are not incremented and entries are not written into the BHRB if MSR$_{PR}$ = 1. |
| | If the value of bit 51 (FCPC) is 1, this field has the following meaning, in one example: |
| | 0    The PMCs are not incremented and entries are not written into the BHRB if the MSR$_{HV\ PR}$ = 0b01. |
| | 1    The PMCs are not incremented and BHRB entries are not written if MSR$_{HV\ PR}$ = 0b11. |
| 35 | Freeze Counters while Mark = 1 (FCM1) |
| | 0    The PMCs are incremented (if permitted by other MMCR bits). |
| | 1    The PMCs are not incremented if MSR$_{PMM}$ = 1. |
| 36 | Freeze Counters while Mark = 0 (FCM0) |
| | 0    The PMCs are incremented (if permitted by other MMCR bits) |
| | 1    The PMCs are not incremented if MSR$_{PMM}$ = 0. |
| 37 | Performance Monitor Alert Enable (PMAE) |
| | 0    Performance Monitor alerts are disabled and BHRB entries are not written. |
| | 1    Performance monitor alerts are enabled and BHRB entries are written (if enabled by other bits) until a performance monitor alert occurs, at which time: MMCR0$_{PMAE}$ is set to 0 MMCR0$_{PMAO}$ is set to 1. |
| 38 | Freeze Counters on Enabled Condition or Event (FCECE) |
| | 0    The PMCs are incremented (if permitted by other MMCR bits) |
| | 1    The PMCs are incremented (if permitted by other MMCR bits) until an enabled condition or event occurs when MMCR0$_{TRIGGER}$ = 0, at which time: MMCR0$_{FC}$ is set to 1. |

-continued

| Bit(s) | Description |
|---|---|
| 39:40 | Time Base Selector (TBSEL) |
| | This field selects the time base bit that can cause a time base transition event (the event occurs when the selected bit changes from 0 to 1). |
| | 00 Time Base bit 63 is selected. |
| | 01 Time Base bit 55 is selected. |
| | 10 Time Base bit 51 is selected. |
| | 11 Time Base bit 47 is selected. |
| 41 | Time Base Event Enable (TBEE) |
| | 0 Time Base transition events are disabled. |
| | 1 Time Base transition events are enabled. |
| 42 | BHRB Access (BHRBA) |
| | This field controls whether the BHRB instructions are available in problem state. If an attempt is made to execute a BHRB instruction in problem state when the BHRB instructions are not available, a facility unavailable interrupt will occur. |
| | 0 mfbhrb (move from BHRB) and clrbhrb (clear BHRB sets all BHRB entries to zero) are not available in problem state. |
| | 1 mfbhrb and clrbhrb are available in problem state unless they have been made unavailable by some other register. |
| 43 | Performance Monitor Event-Based Branch Enable (EBE) |
| | This field controls whether performance monitor event-based branches are enabled. |
| | When performance monitor event-based branches are disabled, no performance monitor event-based branches occur regardless of the sate of $BESCR_{PME}$. |
| | 0 Performance monitor event-based branches are disabled. |
| | 1 Performance monitor event-based branches are enabled. |
| 44:45 | PMC Control (PMCC) |
| | This field controls whether or not PMCs 5-6 are included in the performance monitor, and the accessibility of groups A (non-privileged read/write performance monitor registers) and B (non-privileged read-only performance monitor registers) of non-privileged SPRs in problem state as described below. |
| | 00 PMCs 5-6 are included in the performance monitor. Group A is read-only in problem state. If an attempt is made to write to an SPR in group A in problem state, a hypervisor emulation assistance interrupt will occur. |
| | 01 PMCs 5-6 are included in the performance monitor. Group A is not allowed to be read or written in problem state, and group B is not allowed to be read. If an attempt is made to read or write to an SPR in group A, or to read from an SPR in group B in problem state, a facility unavailable interrupt will occur. |
| | 10 PMCs 5-6 are included in the performance monitor. Group A is allowed to be read and written in problem state, and group B except for MMCR1 (SPR 782) is allowed to be read in problem state. If an attempt is made to read MMCR1 in problem state, a facility unavailable interrupt will occur. |
| | 11 PMCs 5-6 are not included in the performance monitor. |
| 46 | Freeze Counters in Transactional State (FCTS) |
| | 0 PMCs are incremented (if permitted by other MMCR bits) |
| | 1 PMCs are not incremented when transactional memory is in transactional state. |
| 47 | Freeze Counters in Non-Transactional State (FCNTS) |
| | 0 PMCs are incremented (if permitted by other MMCR bits). |
| | 1 PMCs are not incremented when transactional memory is in non-transactional state. |
| 48 | PMC1 Condition Enable (PMC1CE) |
| | This bit controls whether counter negative conditions due to a negative value in PMC1 are enabled. |
| | 0 Counter negative conditions for PMC1 are disabled. |
| | 1 Counter negative conditions for PMC1 are enabled. |
| 49 | PMCj Condition Enable (PMCjCE) |
| | This bit controls whether counter negative conditions due to a negative value in any PMCj (i.e., in any PMC except PMC1) are enabled. |
| | 0 Counter negative conditions for all PMCjs except those enabled by PMCnCE, are disabled. |
| | 1 Counter negative conditions for all PMCjs are enabled. |
| 50 | Trigger (TRIGGER) |
| | 0 The PMCs are incremented (if permitted by other MMCR bits). |
| | 1 PMC1 is incremented (if permitted by other MMCR bits). The PMCjs are not incremented until PMC1 is negative or an enabled condition or event occurs, at which time: |
| | the PMCjs resume incrementing (if permitted by other MMCR bits) $MMCR0_{TRIGGER}$ is set to 0 |
| 51 | Freeze Counters and BHRB in Problem Condition (FCPC) |
| | This bit controls the operation of bit 34 (FCP). |
| 52:54 | Performance Monitor Alert Qualifier (PMAOQ) |
| | These bits provide additional implementation dependent information about the cause of the performance monitor alert. These bits are to be set to 0s when no additional information is set. |
| 55 | Control Counters 5 and 6 With Run Latch (CC56RUN) |
| | When $MMCR0_{PMCC}$ = b'11', the setting of this bit has no effect; otherwise it is defined as follows: |
| | 0 PMCs 5 and 6 are incremented if $CTRL_{RUN}$ = 1 if permitted by other MMCR bits. |
| | 1 PMCs 5 and 6 are incremented, regardless of the value of $CTRL_{RUN}$, if permitted by other MMCR bits. |
| 56 | Performance Monitor Alert Occurred (PMAO) |
| | 0 A performance monitor alert has not occurred since the last time software set this bit to 0. |
| | 1 A performance monitor alert has occurred since the last time software set this bit to 0. |
| | This bit is set to 1 by the hardware when a performance monitor alert occurs. This bit can be set to 0 by the mtspr instruction. |
| 57 | Freeze Counters in Suspended State (FCSS) |
| | 0 PMCs are incremented (if permitted by other MMCR bits). |
| | 1 PMCs are not incremented when transactional memory is in suspended state. |
| 58 | Freeze Counters 1-4 (FC1-4) |
| | 0 PMC1-PMC4 are incremented (if permitted by other MMCR bits). |
| | 1 PMC1-PMC4 are not incremented. |
| 59 | Freeze Counters 5-6 (FC5-6) |
| | 0 PMC5-PMC6 are incremented (if permitted by other MMCR bits). |
| | 1 PMC5-PMC6 are not incremented. |
| 60:61 | Reserved |
| 62 | Freeze Counters 1-4 in Wait State (FC14WAIT) |
| | 0 PMCs 1-4 are incremented (if permitted by other MMCR bits). |
| | 1 PMCs 1-4, except for PMCs counting events that are not controlled by this bit, are not incremented if $CTRL_{RUN}$ = 0. |
| 63 | Freeze Counters and BHRB in Hypervisor State (FCH) |
| | 0 The PMCs are incremented (if permitted by other MMCR bits) and BHRB entries are written (if permitted by the NBRB instruction filtering mode field in MMCRA). |
| | 1 The PMCs are not incremented and BHRB entries are not written if $MSR_{HV\ PR}$ = 0b10. |

Monitor mode control register 1 (MMCR1) is a 64-bit register having various bits that can be set to count various events. A description of those events may be found in Power ISA™ Version 2.07, May 3, 2013, which is hereby incorporated by reference herein in its entirety.

Monitor code control register 2 (MMCR2) is a 64-bit register that contains, e.g., 9-bit control (C) fields for controlling the operation of PMC1-PMC6. When MMCR0$_{PMCC}$=b'11', fields C1-C4 of MMCR2 control the operation of PMC1-PMC4, respectively, and fields C5 and C6 are meaningless; otherwise, fields C1-C6 of MMCR2 control the operation of PMC1-PMC6, respectively. The bit definitions of each Cn fields are as follows, where n=1, . . . 6.

When the MMCR0$_{PMCC}$ is set to 10 or 11, providing problem state programs read/write access, only the FCnP bits are to be accessed. All other bits are not changed when mtspr is executed in problem state, and all other bits return 0s when mfspr (move from special purpose register, described below) is executed.

Monitor mode control register A (MMCRA) is a 64-bit register that gives privileged programs the ability to control the sampling process and threshold events. MMCR0$_{PMCC}$ controls problem state access to this register. When MMCR0$_{PMCC}$ is set to 00 providing read only access, all fields can be read. When MMCR0$_{PMCC}$ is set to 10 or 11, the threshold event counter exponent (TECX) and threshold event counter mantissa (TECM) fields are read-only, and all other fields return 0s when mfspr is executed; all fields are not changed when mtspr is executed in problem state.

The bit definitions of MMCRA are as follows, in one example:

performance monitor alert occurs, the contents of SIAR are not altered by the hardware until software sets MMCR0$_{PMAE}$ to 1. After software sets MMCR0$_{PMAE}$ to 1, the contents of SIAR are undefined until the next performance monitor alert occurs.

The sampled data address register (SDAR) is a 64-bit register. When a performance monitor alert occurs because of an event that occurred due to a randomly sampled instruction, the SDAR contains the effective address of the data accessed by the instruction if SIER$_{SDARV}$=1 and is invalid if SIER$_{SDARV}$=0.

When a performance monitor alert occurs because of an event other than an event that occurred due to a randomly sampled instruction, the SDAR contains the effective address of the storage operand of an instruction that was being executed, possibly out-of-order, at or around the time that the performance monitor alert occurred. This storage operand may or may not be the storage operand (if any) associated with the instruction whose address is in the SIAR.

The contents of SDAR may be altered by the hardware, in one example, if and only if MMCR0$_{PMAE}$=1. Thus after the performance monitor alert occurs, the contents of SDAR are not altered by the hardware until software sets MMCR0$_{PMAE}$

| Bits(s) | Description |
|---|---|
| 0:31 | Problem state access (SPR 770) Reserved<br>Privileged access (SPR 770 or 786) Implementation dependent |
| 32:33 | BHRB Instruction Filtering Mode (IFM)<br>This field controls the filter criterion used by the hardware when recording Branch instructions in the BHRB.<br>  00    No filtering<br>  01    Do not record any Branch instructions unless the LK field is set to 1.<br>  10    Do not record I-Form instructions. For B-Form and XL-Form instructions for which the BO field indicates Branch always, do not record the instruction if it is B-form and do not record the instruction address but record only the branch target address if it is XL-Form. (Instructions have certain formats in Power ISA, some of which include I-form, B-form, and XL-form.)<br>  11    Filter and enter BHRB entries as for mode 10, but for B-Form and XL-Form instructions for which BO$_0$ = 1 or for which the "a" bit in the BO field is set to 1, do not record the instruction if it is B-Form and do not record the instruction address but record only the branch target address if it is XL-Form. |
| 34:63 | These bits include, for instance, a threshold event counter exponent (TECX, bits 34:36); threshold event counter mantissa (TECM, bits 38-44); threshold event counter event (TECE, bits 45-47); threshold start event (TS; bits 48:51); threshold end event (TE, bits 52:55); eligibility for random sampling (ES, bits 57:59); random sampling mode (SM, bits 61:62); and random sample enable (SE, bit 63), each of which is described in Power ISA™ Version 2.07, May 3, 2013, which is hereby incorporated by reference herein in its entirety. |

The sampled instruction address register (STAR) is a 64-bit register. When a performance monitor alert occurs because of an event that occurred due to a randomly sampled instruction, the STAR contains the effective address of the instruction if SIER$_{SIARV}$=1 and is invalid if SIER$_{SIARV}$=0.

When a performance monitor alert occurs because of an event other than an event that occurred due to a randomly sampled instruction, the STAR contains the effective address of an instruction that was being executed, possibly out of order, at or around the time that the performance monitor alert occurred.

The contents of STAR may be altered by the hardware, in one example, if and only if MMCR0$_{PMAE}$=1. Thus after the to 1. After software sets MMCR0$_{PMAE}$ to 1, the contents of SDAR are undefined until the next performance monitor alert occurs.

The sampled instruction event register (SIER) is a 64-bit register. When random sampling is enabled and a performance monitor alert occurs because of an event caused by execution of a randomly sampled instruction, this register contains information about the sampled instruction (i.e., the instruction whose effective address is contained in the STAR) when a performance monitor alert occurred. All fields are valid unless otherwise indicated.

When random sampling is disabled or when a performance monitor alert occurs because of an event that was not caused by execution of a randomly sampled instruction, then the contents of this register are meaningless.

The contents of SIER may be altered by the hardware, in one example, if and only if MMCR0$_{PMAE}$=1. Thus after the performance monitor alert occurs, the contents of SIER are not altered by the hardware until software sets MMCR0$_{PMAE}$ to 1. After software sets MMCR0$_{PMAE}$ to 1, the contents of SIER are undefined until the next performance monitor alert occurs. One example of bit definitions of the SIER are described in Power ISA™ Version 2.07, May 3, 2013, hereby incorporated by reference herein in its entirety.

Another hardware/architected feature used by the transparent dynamic code optimization capability described herein is a branch history rolling buffer (BHRB). The branch history rolling buffer is a buffer containing an implementation dependent number of entries, referred to as BHRB entries (BHRBEs). The BHRB entries contain information related to branches that have been taken. Entries are numbered, for instance, from 0 through n, where n is implementation dependent. Entry 0 is the most recently written entry, in one example.

The system program (e.g., the operating system, or in other embodiments, the hypervisor or other supervisory component) typically controls the availability of the BHRB as well as the number of entries that it contains. If the BHRB is accessed when it is unavailable, a facility unavailable error handler is invoked.

Various events or actions by the system program may result in the BHRB occasionally being cleared. If BHRB entries are read after this has occurred, 0s will be returned.

The BHRB is typically used in conjunction with performance monitor event-based branches. When used in conjunction with this facility, a branch event status and control register (BESCR), described below, and in particular, BESCR$_{PME}$ is set to 1 to enable performance monitor event based branches, and performance monitor alerts are enabled to enable the writing of BHRB entries. When a performance monitor alert occurs, performance monitor alerts are disabled, BHRB entries are no longer written, and an event-based branch occurs. The event-based branch handler can then access the contents of the BHRB for analysis.

When the BHRB is written by hardware, only those branch instructions that meet the filtering criterion, which is set by the system program, are written.

The following paragraphs describe the entries written into the BHRB for various types of branch instructions for which the branch was taken. In some circumstances, however, the hardware may be unable to make the entry even though the following paragraphs require it. In such cases, the hardware sets the EA field to 0, and indicates any missed entries using the T and P fields.

When an I-form or B-form branch instruction is entered into the BHRB, bits 0-61 of the effective address of the branch instruction are placed into the next available entry, except that the entry may or may not be written if the instruction following the branch instruction is not another branch instruction, and target address of the branch instruction does not exceed its effective address by more than, for instance, 8.

When an XL-form branch instruction is entered into the BHRB, bits 0:61 of the branch instruction are written into the next available entry if allowed by the filtering mode; subsequently, bits 0:61 of the effective address of the branch target is written into the following entry. The BHRB is read by means of a move from BHRB entry (mfbhrbe) instruction. With the mfbhrbe instruction, if an entry designated in the mfbhrbe instruction is within the range of BHRB entries implemented, the contents of the designated BHRB entry are placed into an RT register designated in the mfbhrbe instruction.

BHRB entries are written as described above without regard to transactional state and are not removed due to transaction failures.

Figure 15:
FIG. 15 depicts one example format of a branch history rolling buffer entry (BHRBE)

In one example, branch history rolling buffer data entries (BHRBEs) have a format, as described with reference to FIG. 15. A Branch History Rolling Buffer Data Entry 1500 includes, for instance:

| | |
|---|---|
| 0:61 | Effective Address (EA) 1502 |
| | When this field is set to a non-zero value, it contains bits 0:61 of the effective address of the instruction indicated by the T field; otherwise this field indicates that the entry is a marker with the meaning specified by the T and P fields. |

When the EA field contains a non-zero value, bits 62:63 have the following meanings

| | | |
|---|---|---|
| 62 | Target Address (T) 1504 | |
| | 0 | The EA field contains bits 0:61 of the effective address of a branch instruction for which the branch was taken. |
| | 1 | The EA field contains bits 0:61 of the branch target effective address corresponding to an XL-form branch instruction. |
| 63 | Prediction (P) 1506 | |
| | When T = 0, this field has the following meaning: | |
| | 0 | The outcome of the branch instruction was correctly predicted. |
| | 1 | The outcome of the branch instruction was mispredicted. |
| | When T = 1, this field has the following meaning: | |
| | 0 | The branch instruction was predicted to be taken and the target address was predicted correctly, or the target address was not predicted because the branch instruction was predicted to be not taken. |
| | 1 | The target address was mispredicted. |

When the EA field contains a zero value, either the entry is a marker or is an entry for a branch instruction for which the instruction address or target address is 0.

It is expected that programs will not contain branch instructions with instruction or target addresses equal to 0. If such instructions exist, however, markers become unusable because BHRB entries for various markers cannot be distinguished from entries for branch instructions with instruction or target addresses equal to 0.

For branch instructions with zero instructions or target addresses, the EA field is set to 0 and bits 62:63 are specified above. For branch instructions with non-zero effective and target addresses, the EA field is set to 0 and bits 62:63 specify the type of marker as described below.

| Value | Meaning |
|---|---|
| 00 | This entry is either not implemented or has been cleared, and there are no valid entries beyond the current entry. |
| 01 | A branch instruction for which the branch was taken was executed, but the hardware was unable to enter its effective address and, for XL-Form Branch instructions, its target effective address. |
| 10 | Reserved |
| 11 | The previous entry contains bits 0:61 of the effective address of an XL-form branch instruction for which the branch was taken, and the filtering mode required bits 0:61 of the current entry to indicate the effective address of the branch target, but the hardware was unable to enter the effective address of the branch target. |

In order to enable problem state programs to use the BHRB, MMCR0$_{BHRBA}$ is to be set to 1 to enable execution of mfbhrb and clbhrb instructions in problem state. Additionally, MMCR0$_{EBE}$ is to be set to 1 to enable performance monitor event-based branches, and MMCR0$_{PMCC}$ is to be set to 10 or 11 to allow problem state programs to access the necessary performance monitor registers.

The BHRB is written by the hardware, in one example, if and only if performance monitor alerts are enabled by setting MMCR0$_{PMAE}$ to 1. After MMCR0$_{PMAE}$ has been set to 1 and a performance monitor alert occurs, MMCR0$_{PMAE}$ is set to 0 and the BHRB is not altered by hardware until software sets MMCR0$_{PMAE}$ to 1 again.

When MMCR0$_{PMAE}$=1, mfbhrbe instructions return 0s to the target register.

When the BHRB is written by hardware, only those branch instructions that meet the filtering criterion indicated by MMCRA$_{PFM\ IFM}$ and for which the branch was taken are included.

Another hardware/architected feature that is used, in one embodiment, by the transparent dynamic code optimization capability is an event based branch facility. The event based branch facility allows application programs to enable hardware to change the effective address of the next instruction to be executed when certain events occur to an effective address specified by the program.

The operation of the event based branch facility is summarized as follows:

The event based branch facility is available when the system program has made it available.

When the event based branch facility is available, event based branches are caused by event based exceptions. Event based exceptions can be enabled to occur by setting bits in the event control field of the BESCR.

When an event based exception occurs, the bit in the BESCR control field corresponding to the event based exception is set to 0 and the bit in the event status field in the BESCR corresponding to the event based exception is set to 1.

If the global enable bit in the BESCR is set to 1 when any of the bits in the status field are set to 1 (i.e., when an event based exception exists), an event based branch occurs.

The event based branch causes the global enable bit to be set to 0, causes instruction fetch and execution to continue at the effective address contained in the EBBHR, and causes the TS field of the BESCR to indicate the transactional state of the processor when the event based branch occurred. If the processor was in transactional state when the event based branch occurred, it is put into suspended state. The EBBRR is set to the effective address of the instruction that would have attempted to execute next if no event based branch had occurred.

The event based branch handler performs the necessary processing in response to the event, and then executes an rfebb instruction in order to resume execution at the instruction that would have been executed next when the event-based branch occurred. The rfebb instruction also restores the processor to the transactional state indicated by BESCR$_{TS}$.

In one embodiment, in order to initialize the event based branch facility for performance monitor event based exceptions, software performs the following operations.

Software requests control of the event based branch facility from the system program.

Software requests the system program to initialize the performance monitor as desired.

Software sets the EBBHR to the effective address of the event based branch handler.

Software enables performance monitor event based exceptions in the BESCR control field by setting BESCR$_{PME}$ to 1. BESCR$_{PMEO}$ is also to be set to 0.

Software sets the GE bit in the BESCR to enable event based branches.

Figure 16A:
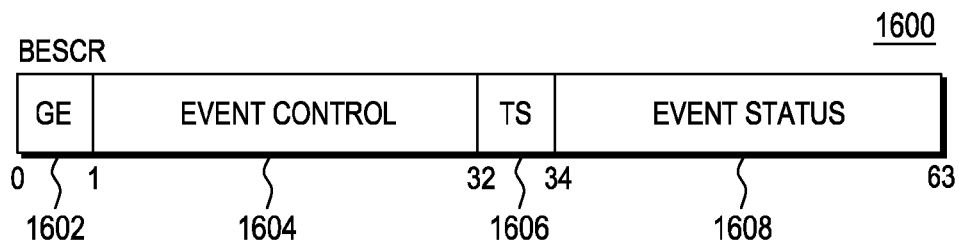
FIG. 16A depicts one example format of a branch event status and control register (BESCR)

The event based branch facility includes a branch event status and control register (BESCR), an example of which is described with reference to FIG. 16A. In one embodiment, a branch event status and control register 1600 is a 64-bit register that contains control and status information about the event based branch facility, as described below.

System software controls whether or not event based branches occur regardless of the contents of the BESCR. The entire BESCR can be read or written using a special purpose register (e.g., SPR 806). Individual bits of the BESCR can be set or reset using two sets of additional SPR numbers.

When mtspr indicates a particular SPR (e.g., SPR 800; branch event status and control set, or BESCRS), the bits in BESCR which correspond to "1" bits in the source register are set to 1; all other bits in the BESCR are unaffected. SPR 801 (e.g., a branch event status and control register upper (BESCRSU)) provides the same capability to each of the upper 32 bits of the BESCR.

When mtspr indicates a particular SPR (e.g., SPR 802; branch event status and control reset, or BESCRR), the bits in BESCR which correspond to "1" bits in the source register are set to 0; all other bits in the BESCR are unaffected. Another SPR (e.g., SPR 803; BESCRRU) provides the same capability to each of the upper 32 bits of the BESCR.

When mfspr indicates any of the above SPR numbers, the current value of the register is returned. In one example, in executing the mfspr instruction, contents of an SPR designated in the mfspr instruction are placed into a register, RT, also designated in the msfpr instruction.

Event based branch handlers typically reset event status bits upon entry, and enable event bits after processing an event. Execution of rfebb (described below) then re-enables the global enable (GE) bit so that additional event based branches can occur.

In one embodiment, BESCR 1600 includes:

0   Global Enable (GE) 1602
    0   Event based branches are disabled.
    1   Event based branches are enabled.
  When an event based branch occurs, GE is set to 0 and is not altered by hardware until rfebb is executed or software sets GE = 1 and another event based branch occurs.
1:31   Event control 1604
    1:30   Reserved
    31   Performance Monitor Event-Based Exception Enable (PME)
        0      Performance monitor event based exceptions are disabled.

|   |   |
|---|---|
| 1 | Performance monitor event based exceptions are enabled until a performance monitor event based exception occurs, at which time: PME is set to 0 PMEO is set to 1 |
| 32:33 | Transactional State (TS) [Category: TM] 1606 When an event based branch occurs, hardware sets this field to indicate the transactional state of the processor when the event based branch occurred. The values and their associated meanings are as follows: 00 Non-transactional 01 Suspended 10 Transactional 11 Reserved |
| 34:63 | Event Status 1608 34:62 Reserved 63 Performance Monitor Event-Based Exception Occurred (PMEO) 0 Performance monitor event based exception has not occurred since the last time software set this bit to 0. 1 A performance monitor event based exception has occurred since the last time software set this bit to 0. This bit is set to 1 by the hardware when a performance monitor event based exception occurs. This bit can be set to 0 only by the mtspr instruction. |

Software is to set this bit to 0 after handling an event based branch due to a performance monitor event based exception.

Figure 16B:
FIG. 16B depicts one example format of an event based branch handler register (EBBHR)

Referring to FIG. 16B, an event based branch handler register (EBBHR) 1620 is a 64-bit register that contains, for instance, the 62 most significant bits of the effective address 1622 of the instruction that is executed next after an event based branch occurs. Bits 62:32 are to be available to be read and written by software.

The EBBHR can be used by software as a scratchpad register after entry into an event based branch handler, provided that its contents are restored prior to executing rfebb 1. An example of such usage is as follows, where SPRG3 is used to contain a pointer to a storage area where context information may be saved.

| | |
|---|---|
| E:mtspr EBBHR, r1 | // Save r1 in EBBHR |
| mfspr r1, SPRG3 | // Move SPRG3 to r1 |
| std r2, r1, offset1 | //Store r2 |
| mfspr EBBHR, r2 | //Copy original contents of r1 to r2 |
| std r2, offset2(r1) | //save original r1 |
| .. | //Store rest of state |
| ... | //Process event |
| ... | //Restore all state except r1,r2 |
| r2 = &E | //Generate original value of EBBHR in r2 |
| mtspr EBBHR, r2 | //Restore EBBHR |
| ld r2 offset1 (r1) | //restore r2 |
| ld r1 offset2 (r1) | //restore r1 |
| rfebb 1 | //Return from handler |

Figure 16C:
FIG. 16C depicts one example format of an event based branch return register (EBBRR)

Referring to FIG. 16C, an event based branch return register (EBBRR) 1630 is a 64-bit register that contains the 62 most significant bits of an instruction effective address 1632. When an event based branch occurs, bits 0:61 of the EBBRR are set to the effective address of the instruction that the processor would have attempted to execute next if no event based branch had occurred. Bits 62:63 are reserved.

Figure 16D:
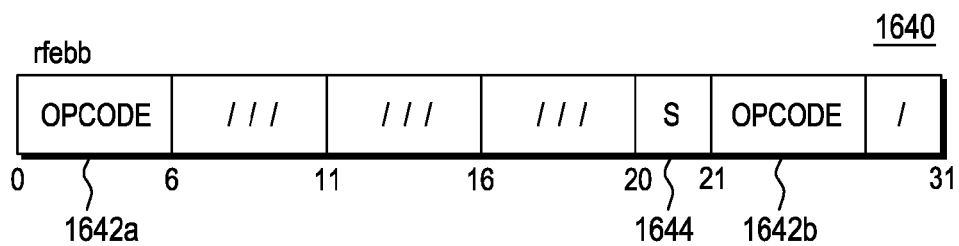
FIG. 16D depicts one example format of a return from event based branch instruction.

Referring to FIG. 16D, an event based branch instruction, referred to as a return from event based branch, rfebb 1640, is described. In one example, rfebb includes an operation code specified, for instance, in fields 1642a, 1642b, that indicates a return from event based branch operation, and an S field 1644 used as described below.

$BESCR_{GE} \leftarrow S$
$MSR_{TS} \leftarrow BESCR_{TS}$
$NIA \leftarrow_{iea} EBBRR_{0:61} \| 0b00$ $BESCR_{GE}$ is set to S. The processor is placed in the transactional state indicated by $BESC_{TS}$.

If there are no pending event based exceptions, then the next instruction is fetched from the address $EBBRR_{0:61} \| 0b00$ (when $MSR_{SF}=1$) or $^{32}0 \| EBBRR_{32:61} \| 0b00$ (when $MSR_{SF}=0$), where $\|$ is concatenation. If one or more pending event based exceptions exist, an event based branch is generated; in this case the value placed into EBBRR by the event based branch facility is the address of the instruction that would have been executed next had the event based branch not occurred.

When an event based branch occurs, the event based branch handler executes the following sequence of operations, in one example. This sequence of operations assumes that the handler has access to a stack or other area in memory in which state information from the main program can be stored. Note also that in this example, the handler entry point labeled "E", r1 is used as a scratch register, and only performance monitor events are enabled. Code to save and restore state is to be inserted where indicated in conjunction with a system-specific consideration of application state, and the state being used by the EBB handler. In one embodiment, when the EBB handler and all its service subroutines use all general purpose registers, but no other registers (such as FPRs, VRs, VSRs, etc.), the code to save and restore state saves the general purpose registers. In another embodiment, when an EBB handler only uses a subset of the general purpose registers, only that subset is saved. In another embodiment, when the EBB uses additional registers, additional registers are saved, and so forth.

E: <Code to Save state> // This is the entry pt
mfspr r1, BESCR // Check event status
Process event
r1←0x0000 0000 0000 0001
mtspr BESCRR, r1
  // Reset PMEO event status bit
  // Note: The PMAO bit of MMCR0 is also to be reset.
r1←0x0000 0001 0000 0000
mtspr BESCRS, r1

// Enable PME bit
// Note: The PMAE bit of MMCR0 is also to enabled.
<Code to Restore state>
rfebb 1 // return & global enable Use of the above-described hardware/architected features is further described with reference to FIGS. 17-22, which describe various aspects of the transparent dynamic code optimization capability.

Figure 17:
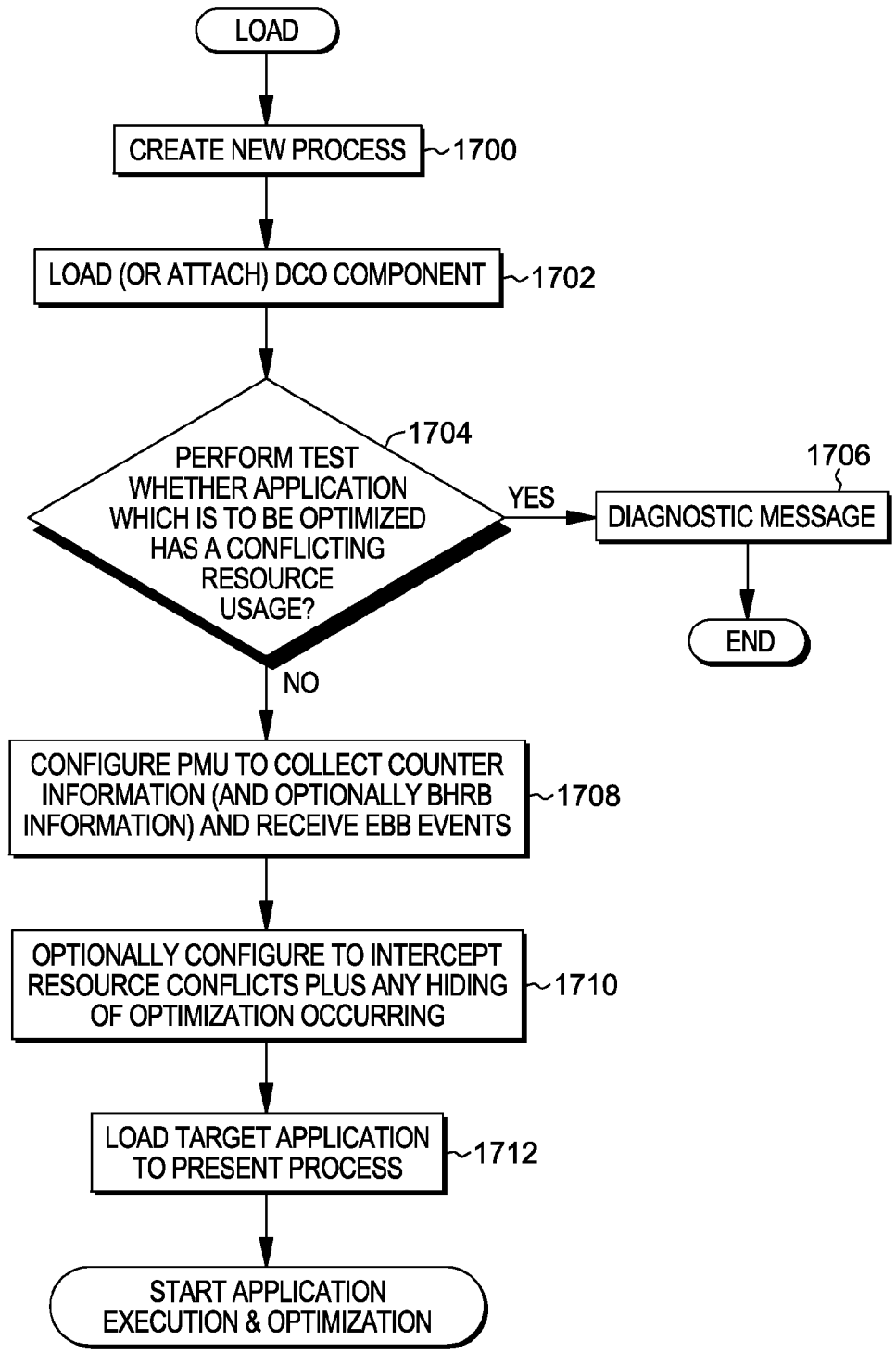
FIG. 17 depicts one example of logic to provide an optimizer.

Initially, referring to FIG. 17, a dynamic code optimizer is loaded (or attached) so that it can provide the optimization capabilities described herein. In one example, a new process (i.e., a new address space) is created, STEP 1700. This address space may be the same address space to be used for an application to be optimized or a different address space separate from the application (e.g., an address space for the optimizer itself, or as part of an operating system or hypervisor, etc.) If it is the same address space as the application, the optimizer component is loaded into the address space, STEP 1702.

However, if it is a different address space, then the optimizer is attached to that address space. When a dynamic optimizer is attached to an address space, the optimizer receives a means to access, manipulate, or query one or more values associated with the application process. It is further authorized to modify the address space of the application process, query and reconfigure address mappings, map memory used by a process into its own address space, or otherwise access such pages, e.g., via a designated operating system or other supervisor software interface, and allocate resources, such as including but not limited to, memory pages, page table entries, SLB entries, and so forth, on behalf of the process to which it is attached. In another aspect, it is also authorized to receive PMU events or notifications, or, an EBB handler is loaded into the process space to which an optimizer is attached. The EBB handler is equipped to transmit PMU information gathered by way of one or more EBBs to the DCO component in another address space. In one aspect, the dynamic optimizer component is further authorized to program the PMU of the process to which it is attached, either directly, or by way of an OS or other supervisor interface.

In a further embodiment, the address space may have been previously created for the application, and the optimizer is added to that address space and receives the privileges to perform the operations described above.

Thereafter, a determination is made as to whether the application which is to be optimized has a conflicting resource usage with the optimizer, and thus, the dynamic optimizer may not be used, INQUIRY 1704. For instance, a determination is made as to whether the PMU, which is to be used by the optimizer, is already being used by another function and, therefore, cannot be used for optimization. If it is determined that there is a conflict in resource usage, then a diagnostic message is provided, STEP 1706, and processing is complete.

However, if there is no conflict in resource usage, then the PMU is configured to collect information, STEP 1708. For instance, it is configured to collect counter information, optionally BHRB information and to receive EBB events, as described above. For instance, in one embodiment, to receive an EBB event, an address of an EBB handler (e.g., a function that performs the logic of FIG. 19) is loaded in the EBBHR, in order to be able to execute that logic when a specific performance event occurs. Further, in one embodiment, the optimizer is optionally configured to intercept resource conflicts (e.g., when an application attempts to use the PMU that is used by the optimizer, the optimizer is notified) and perform any hiding of optimization that is occurring, STEP 1710. For example, when an application attempts to use the PMU that is used by the optimizer, the optimizer is notified and may take a number of actions, including stopping using the resource by the optimizer, causing the application to receive an error, terminating the application, and so forth.

For instance, with hiding optimization that is occurring, an optimizer may cause the operating system to not report certain properties of the program in response to a program query. For example, a system trying to determine whether a page is mapped as separate I/D might—under instruction from the DCO component—be told that no separate I/D pages are in use, so that it believes it is not being optimized. Other examples are also possible.

The target application is then loaded in the address space (if it is not already there), STEP 1712, and application execution and optimization begins.

In one embodiment, the application executes and hardware gathers execution profiles. When a suitable hot region or other region to be optimized is identified, the dynamic code optimizer component is notified. In accordance with one embodiment, this notification is by way of an event based branch in accordance with the EBB facility. In accordance with another embodiment, this notification is by way of an interrupt to the operating system. The operating system then transfers the information to the DCO component executing in the application process' address space, in another address space, or as part of the supervisor. Further, the operating system transfers control to the optimizing component. In another embodiment, the optimizing component executes using a separate hardware thread, and so the operating system passes control directly back to the application process rather than to the DCO component.

In accordance with one embodiment, the notification is by way of an event based branch (EBB). The event based branch handler transfers the information to the DCO component, and then transfers control to the DCO component, e.g., by directly branching to the DCO component in the address space of the application. In a further embodiment, the DCO component executes using a separate hardware thread, and so the EBB passes control directly back to the application process rather than to the DCO component.

The dynamic optimizer generates optimized code, using the collected hardware profile information delivered with the notification event. In accordance with one embodiment, this includes, for instance, branch counts, instruction events, and a branch history rolling buffer. In another embodiment, the information is obtained from additional intermediate code (e.g., a byte code format such as the internal representation, intermediate representation used by the compiler, or a byte code format such as JVM-like code) distributed in conjunction with the application binary code. In one embodiment, the optimization occurs by decompiling the application's binary code in accordance with the processor's instruction set architecture.

The DCO component generates optimized code using, for instance, the information about application behavior and application code and performing optimizations adapted to the received execution profiles, e.g., more efficient unrolling, code straightening, inlining, constant propagation, code motion and code placement, e.g., where hot code is placed closely together to obtain better cache and TLB or ERAT (or other caching structure) performance. In one embodiment, the DCO component makes use of microarchitecture performance optimization, performing instruction selection to select instruction sequences from among the instruction set architecture that have the best performance characteristics on the present processor. In another aspect, the DCO component compiles a program prepared using an older version of the same ISA, and takes advantage of new ISA features on the present processor. In yet another embodiment, when the processor provides additional implementation specific high performance modes, instructions and resources that are not part of the published ISA, and optionally restricted to either the present processor or for use by the DCO component, e.g., for multiple processors, or just a single processor, the DCO component makes use of the high performance modes, instructions and resources.

Figure 18:
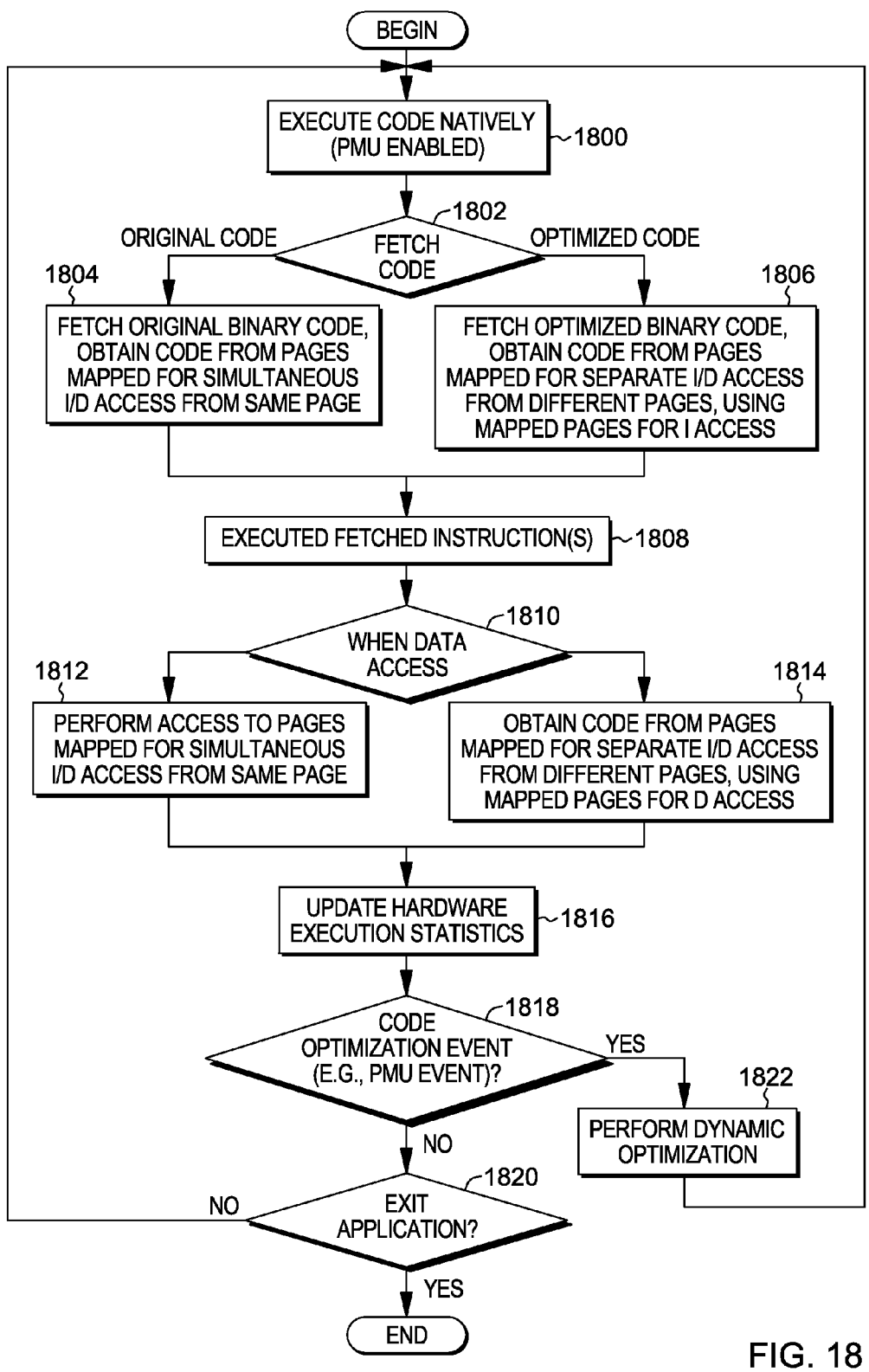
FIG. 18 depicts one example of logic to execute an application and possibly perform optimization for the application.

One embodiment of logic to execute an application and optionally perform optimization is described with reference to FIG. 18. Initially, the processor executes application code natively and enables the performance monitoring operation for the application, STEP 1800. Code that is to be fetched is either original code or optimized code, INQUIRY 1802. If the code to be fetched is original code, then the original code is fetched by obtaining code pages mapped for simultaneous instruction/data access from the same memory page (e.g., SLBE is for both instruction and data accesses), STEP 1804. If, however, the code is optimized code, then optimized binary code is fetched by obtaining code from pages mapped for separate instruction/data access from different pages using the mapped pages for instruction access, as described above (e.g., SLBE is for instruction access only), STEP 1806. The fetched instructions are then executed, STEP 1808. When there is a data access, a determination is made as to whether the access corresponds to the unmodified binary application code or data or to modified code, INQUIRY 1810. If the data access corresponds to unmodified binary application code or data, then the access is performed to pages mapped for simultaneous instruction/data access from the same page, STEP 1812. However, if the data access is for modified code or data, then the code is obtained from pages mapped for separate instruction and data access from different pages using the mapped pages for data access (e.g., SLBE is for data access only), STEP 1814.

Hardware execution statistics are updated, STEP 1816. For instance, selected counters are updated as the application executes, as well as other statistics. In one embodiment, these counters and statistics correspond to the PMU counters and statistics of the Power ISA v2.07 which are described herein. A determination is made, based on analyzing the statistics, as to whether a code optimization event has occurred, INQUIRY 1818. In one example, the code optimization event is indicated by an EBB. If not, a determination is made as to whether the application is to be exited, INQUIRY 1820. If the application is not to be exited, then processing continues to STEP 1800. Otherwise, execution of the application ends.

Returning to INQUIRY 1818, if a code optimization event has occurred, such as receipt of an EBB by the optimizer, then dynamic optimization is performed, STEP 1822, and processing continues with STEP 1800. At application exit, in one example, the optimized binary is saved.

Figure 19:
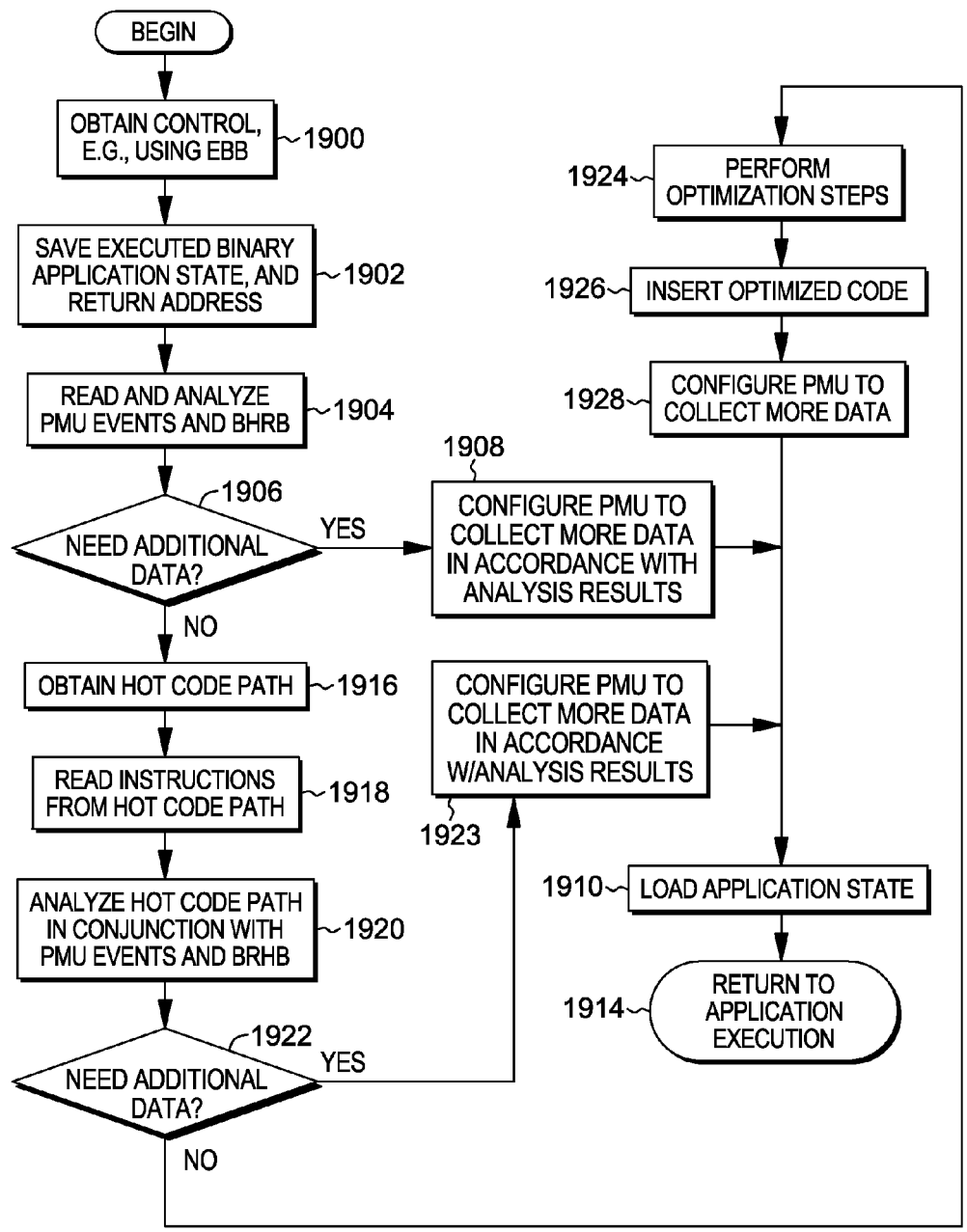
FIG. 19 depicts one example of logic to perform dynamic code optimization of an application.

One embodiment of logic to perform dynamic optimization is described with reference to FIG. 19. Initially, the optimizer obtains control via, for example, an EBB, STEP 1900. For instance, a selected performance event occurs, and an EBB handler (e.g., optimizer) is notified. In particular, in one example, execution of the application is stopped based on the performance event (or in another embodiment, it continues executing), the current address of the application is stored in the EBBRR, and the address of the first instruction of the EBB handler (which is the optimizer code in this example) is loaded in the program counter (e.g., PC=EBBHR). Execution of instructions of the handler are performed. That is, the logic of FIG. 19 is performed.

Based on obtaining control, the executed binary application state is saved in memory (e.g., any or all selected register values are saved), and an address of the last executed instruction is returned, STEP 1902 (e.g., <Code to Save State>, described above). The optimizer reads and analyzes the PMU events and/or the BHRB (one example of analyzing the BHRB is described below), as examples, STEP 1904. A determination is made by the optimizer, based on the analysis, as to whether additional data is needed before performing optimization, INQUIRY 1906. If additional data is needed, then the PMU is configured to collect more data in accordance with analysis results, STEP 1908. Processing then continues with loading application state, that was stored in STEP 1902, into the processor, STEP 1910 (e.g., <Code to Restore State>, described above). Then, processing returns to the application execution, e.g., either performing an rfebb and transferring to the address captured as the EBB return address in EBBRR, or by loading a target address in a target address register (TAR) and performing a branch to TAR, STEP 1914.

Returning to INQUIRY 1906, if additional data is not needed, then, in one example, a hot code path is obtained, STEP 1916. In particular, the information obtained from the PMU and/or BHRB is analyzed to form a hot code path. Instructions from the hot code path are read, STEP 1918, and possibly translated to an internal representation that is easier to process by the dynamic optimizer (or dynamic compiler). In one example, the hot code path is analyzed in conjunction with the PMU events and the BRHB, STEP 1920. A further determination is made as to whether additional data is needed, INQUIRY 1922. If additional data is not needed, then optimization steps are performed (e.g., unrolling, inline optimization, etc.), STEP 1924, and the optimized code is inserted into memory, STEP 1926. In one example, the original pages are retained for data access and one or more updated pages are created that provide separate instruction access. The memory regions are configured to use split instruction/data access. The PMU is then configured to collect more data, STEP 1928, and processing continues with STEP 1910.

Returning to INQUIRY 1922, if additional data is needed, then the PMU is configured to collect more data in accordance with analysis results, STEP 1923, and processing continues with STEP 1910.

While these steps have been described with reference to a particular sequence, the steps can be performed in parallel, other orders, etc. In particular, steps starting at 1904 can be performed in parallel to directly returning to an application in accordance with steps 1910-1914, and in parallel to the execution of the application being optimized, etc.

Figure 20:
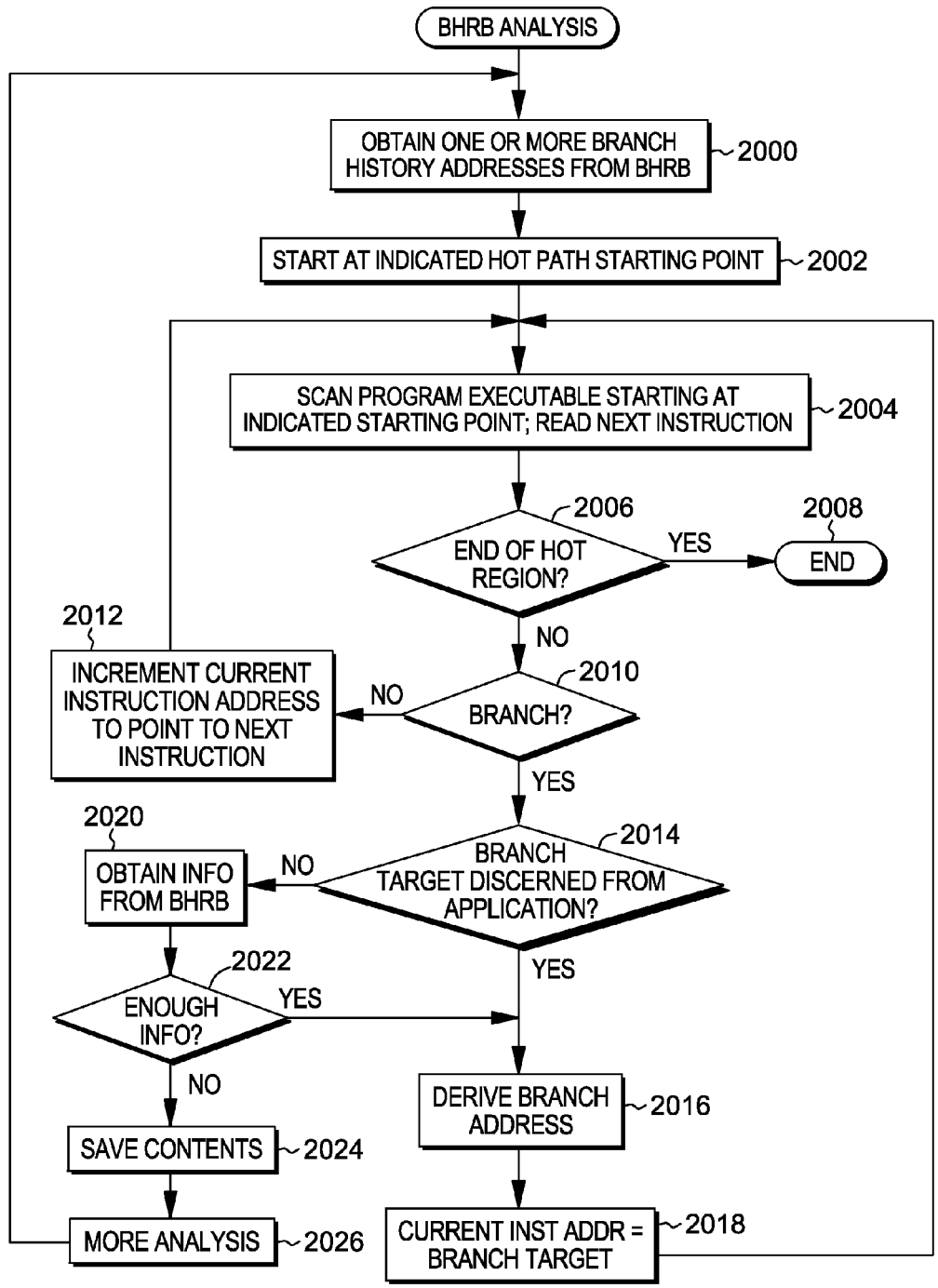
FIG. 20 depicts one example of logic to perform branch history rolling buffer analysis.
Figure 21:
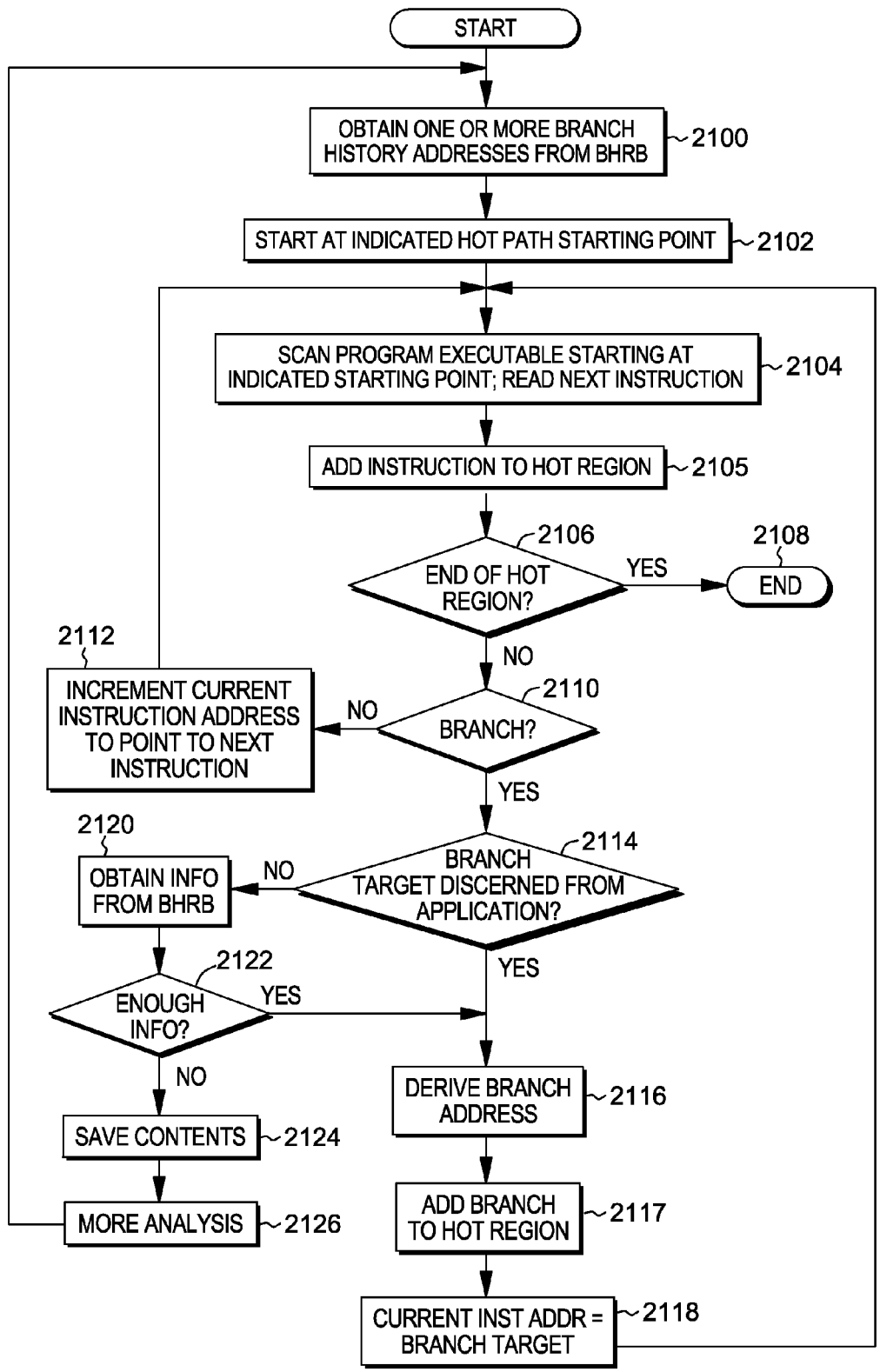
FIG. 21 depicts one example of logic used to create a hot region.

Further details regarding one embodiment of performing BHRB analysis that may be used by the optimizer are described with reference to FIG. 20. In one example, the optimizer obtains one or more branch history addresses from the BHRB, STEP 2000. The analysis then begins at the indicated hot path starting point, STEP 2002. The program executable is scanned starting at that point and the next instruction is read, STEP 2004. A determination is made as to whether it is the end of the hot region, INQUIRY 2006. If so, then the analysis is complete, STEP 2008. Otherwise, then a further determination is made as to whether there is a branch, INQUIRY 2010. If there is not a branch, then the current instruction address is incremented to point to the next instruction, STEP 2012, and processing continues with STEP 2004.

Returning to INQUIRY 2010, if there is a branch, then a further determination is made as to whether the branch target address can be discerned from the application, INQUIRY 2014. For instance, a branch target can be discerned for pc-relative branches, or absolute branches, i.e., those branches directly encoding the target address, or when an address is being loaded as a constant into a register and immediately being branched to, and so forth. If the branch target address can be discerned from the application, then it is derived, STEP 2016, and the current instruction address is set equal to the branch target address, STEP 2018. Processing continues with STEP 2004. However, returning to INQUIRY 2014, if the branch target cannot be discerned from the application, then information is obtained from the BHRB in an attempt to derive the branch address, STEP 2020. For instance, the T, P and EA fields of a BHRBE are used in an effort to derive the address. If there is enough information in the BHRB to derive the branch address, INQUIRY 2022, then the branch address is derived, STEP 2016, and the current instruction address is set equal to the branch target, STEP 2018. Processing then continues with STEP 2004.

However, returning to INQUIRY 2022, if there is not enough information in the BHRB to derive the branch target address, then the contents are optionally saved, STEP 2024, and an indication is provided that more analysis is needed, STEP 2026. Processing then continues with STEP 2000.

The above processing assumes that one path of the branch is taken, however, it is possible that both paths of a branch are equally likely. Thus, each path could be treated as separate paths or multipath processing may be used, wherein a hot region may include more than one successor to at least some branch instructions having been decoded and included in the hot path.

While this flow shows one particular sequence of processing steps, processing steps may be reordered, or performed in parallel. For example, in one embodiment, when branch decoding is complex, a first STEP 2020 and INQUIRY 2022 may be made prior to a second test 2014. Other variations are also possible.

In one example, the above analysis may be used to form a hot region that has been identified. An example of this processing is described with reference to FIG. 21. In one example, the optimizer obtains one or more branch history addresses from the BHRB, STEP 2100. The analysis then begins at the indicated hot path starting point, STEP 2102. The program executable is scanned starting at that starting point, STEP 2104. The next instruction is read and added to the hot region (optionally decoded as an internal representation), STEP 2105. A determination is made as to whether it is the end of the hot region, INQUIRY 2106. If so, then the analysis is complete, STEP 2108. Otherwise, a further determination is made as to whether there is a branch, INQUIRY 2110. If there is not a branch, then the current instruction address is incremented to point to the next instruction, STEP 2112, and processing continues with STEP 2104.

Returning to INQUIRY 2110, if there is a branch, then a further determination is made as to whether the branch target address can be discerned from the application, INQUIRY 2114. If the branch target address can be discerned from the application, then it is derived, STEP 2116, and the branch is added to the hot region, STEP 2117. In one embodiment, an exit is indicated for the non-taken branch outcome, to return to the other code. The current instruction address is set equal to the branch target address, STEP 2118, and processing continues with STEP 2104.

However, returning to INQUIRY 2114, if the branch target cannot be discerned from the application, then information is obtained from the BHRB, STEP 2120. A determination is made as to whether there is enough information in the BHRB to derive the branch address, INQUIRY 2122. If there is enough information, then the branch address is derived, STEP 2116, and the branch is added to the hot region, STEP 2117. An exit is indicated for the non-taken branch outcome, to return to other code. The current instruction address is set equal to the branch target, STEP 2118, and processing then continues with STEP 2104.

However, returning to INQUIRY 2122, if there is not enough information in the BHRB to derive the branch target address, then the contents are optionally saved, STEP 2124, and an indication is provided that more analysis is needed, STEP 2126. Processing then continues with STEP 2100.

The above processing assumes that one path of the branch is taken, however, it is possible that both paths of a branch are equally likely. Thus, each path could be treated as separate paths or multipath processing may be used, wherein a hot region may include more than one successor to at least some branch instructions having been decoded and included in the hot path.

While this flow shows one particular sequence of processing steps, processing steps may be reordered, or performed in parallel. For example, in one embodiment, when branch decoding is complex, a first STEP 2120 and INQUIRY 2122 may be made prior to a second test 2114.

Figure 22:
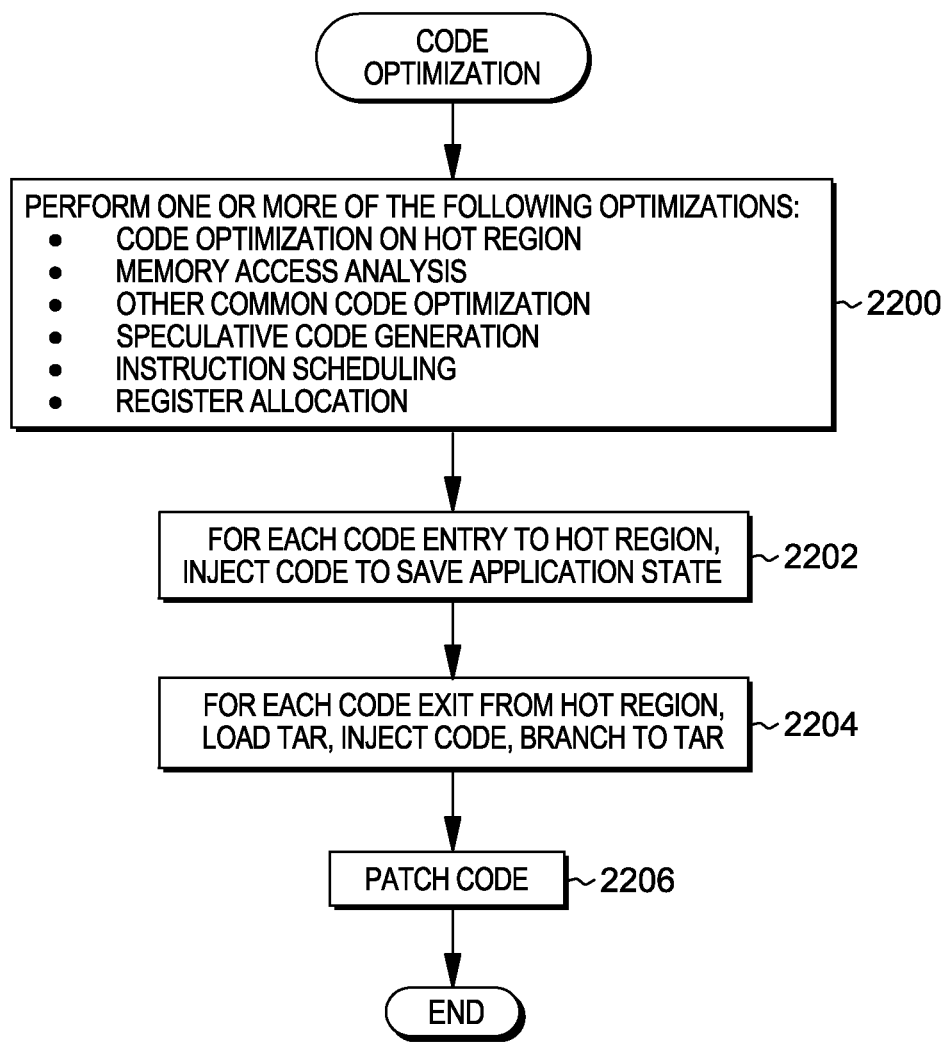
FIG. 22 depicts one example of code optimization logic.

As described herein, code optimization may include various types of optimization. Referring to FIG. 22, in one embodiment, code optimization includes performing one or more of the following optimizations: code optimization on hot regions; memory access analysis; other common code optimization; speculative code generation; instruction scheduling; and/or register allocation, each of which is described further below, STEP 2200.

For instance, code optimization on hot regions includes generating the hot region, and optionally, augmenting an internal representation of the instructions of the hot region with PMU information. For example, the internal representation may be augmented with a prefetch instruction ahead of an access, if it is determined that the program frequently has cache misses. As further examples, memory regions may be indicated or specific instructions that create cache misses may be indicated. Further, a common executed path out of multiple paths may be indicated in common execution scenarios. In at least one embodiment, code straightening is performed, so as to ensure that the most frequently executed path is executed with a minimum number of taken branches.

Optionally, the code optimization may include performing memory access analysis in which the PMU data may indicate specific cache hit/miss information for some instructions. For example, at least one of loop unrolling and software pipelining may be performed to reduce impact of cache misses or prefetched instructions may be scheduled prior to access. Other common code optimization may also be performed based on, for instance, known execution behavior or exploiting current ISA (instruction set architecture) instructions. For instance, if a more modern instruction is available, then that more modern instruction may be used, such as, for instance, a load conditional instruction, instead of a branch instruction. Other types of code optimization include speculative code generation that occurs, for instance, when one path is taken most frequently, speculative code can be generated for the most frequent path. Optionally, a speculatively executed path is embedded in a transaction to provide recovery opportunity if another path is taken. Code is generated to test whether speculation was correct, and to perform a conditional transaction abort if the speculatively executed execution sequence should not commit its result because it corresponds to a misspeculation. Further, instruction scheduling and/or register allocation are performed. For the register allocation, optionally, additional resources and/or execution modes available to the binary optimized code are used that are not available to the original application.

In one embodiment, in which the optimization is for a hot region, for each code entry to the hot region, code is injected in the application to save the application state not needed during execution of the optimized code region (e.g., to a scratch pad memory, or to another memory location set aside for the use of the dynamic optimizer, or otherwise available to the optimized code) at the beginning of the new hot code region, STEP 2202. Further, for each code exit from the hot region, in one embodiment the target address is loaded, in for instance, the TAR, which indicates the address to which to transfer (typically in an unmodified binary or another optimized code fragment); code is injected to reload the application state not needed during the optimized code region from the scratch pad memory, or other such memory to which it has been previously stored with reference to STEP 2202; and a branch is performed to the next instruction to be executed; e.g., by branching to the value loaded into the TAR, STEP 2204. Thereafter, the optimized code is patched into the original code, as described herein, STEP 2206.

In at least one embodiment, the code to store application state corresponds to code storing only registers needed to hold additional intermediate computation results by the optimized hot path are stored in STEP 2202 and the code is injected to restore the same in STEP 2204

In one embodiment, in performing the code patching, the hot region is analyzed to determine all the pages that need to be patched, and then the patching begins. This includes, for instance, copying the application code to be modified, modifying the code, as appropriate, and saving the modified code in memory regions separate from those memory regions storing the unmodified code of the application. Further, the address translation structures are updated by, for instance, replicating SLB entries and setting the appropriate NOA bits, as described above. For pages which are read/write enabled for data access, and are executable, write permissions for the data access are transparently disabled to ensure self-referential integrity, as described herein with reference to the separate I/D translation.

As described above, dynamic code optimization offers significant opportunities to improve the operation of computer systems. In particular, existing code can be modified to improve performance by re-optimizing hot regions, either from binary code or from additional internal representation formats stored by the static compiler that allows a re-optimization component to re-optimize code without decompiling the binary code. This allows optimization for a present machine, even when the binary was generated years ago for an older instruction set architecture level. Further, in one embodiment, runtime information may be used to perform the optimization. In one or more aspects, the existing code can be modified without breaking self-referential code; control can be obtained from existing code for an optimized control region; and/or hot code can be identified and optimized during native execution. In one or more embodiments, code is executed natively and hot regions are identified, an optimizer is notified that a hot region has been identified and is provided a capability to identify the hot region, the hot region is optimized and control is efficiently passed to/from the optimized code. This is performed without loading a branch address into a register and performing a branch to the register, since this is not available to dynamically optimized code since the optimized code may not modify any of the exiting application state or would corrupt the underlying execution. The cost of dynamic optimization/dynamic compilation overhead is reduced.

In one or more aspects, native hardware execution is used instead of software interpretation, and code optimization is improved by using execution profiles in order to increase the total fraction of time spent in execution and reducing time spent in interpretation and code optimization.

Native hardware execution is used by capturing statistics from a running binary instead of software instrumentation, and using, for instance, the PMU function. Control is obtained for optimization when suitable profile information is available, and an event based branch is used to provide low overhead control transfer. Region based separate I/D translation is also used.

To improve execution profiles, more detailed events using the PMU with a broad set of events are used, and the execution path to the program is captured using the branch history rolling buffer. Resources are improved by providing resources that the optimizer can use to generate better codes, such as the TAR. The TAR can be used to efficiently integrate optimized code into non-optimized code by loading a target address in the TAR to which to transfer back into the unoptimized binary. Speculative optimization is also enabled for, e.g., transactional memory.

In accordance with one aspect, a dynamic compilation system operates in conjunction with dedicated hardware support which offers: a capability to transparently modify instruction streams to transfer control to the optimized code; a performance monitoring infrastructure adapted to identify hot regions or other potential optimizations by way of performance monitoring counters and gather additional runtime path information; and additional architected resources for the benefit of the dynamic optimizer.

Figure 23:
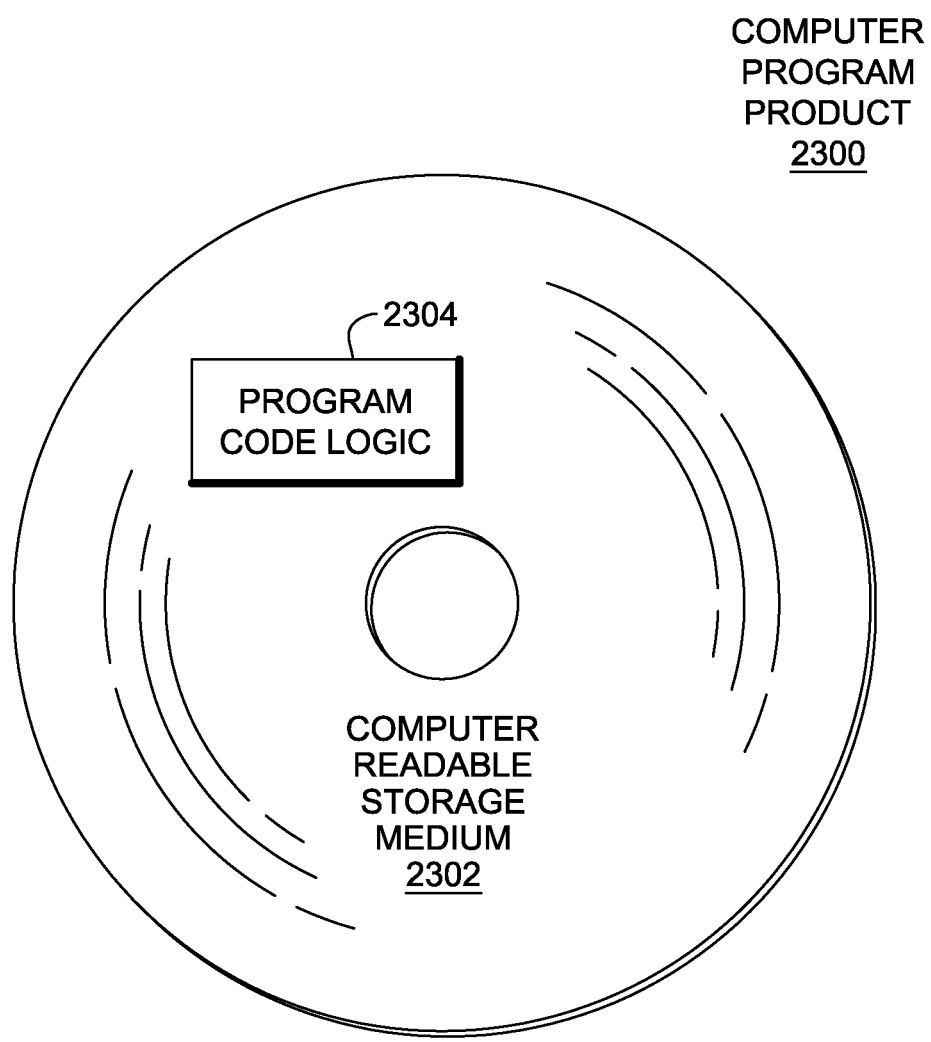
FIG. 23 depicts one embodiment of a computer program product.

Referring to FIG. 23, in one example, a computer program product 2300 includes, for instance, one or more non-transitory computer readable storage media 2302 to store computer readable program code means, logic and/or instructions 2304 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, other types of address translation may benefit from one or more aspects. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 24:
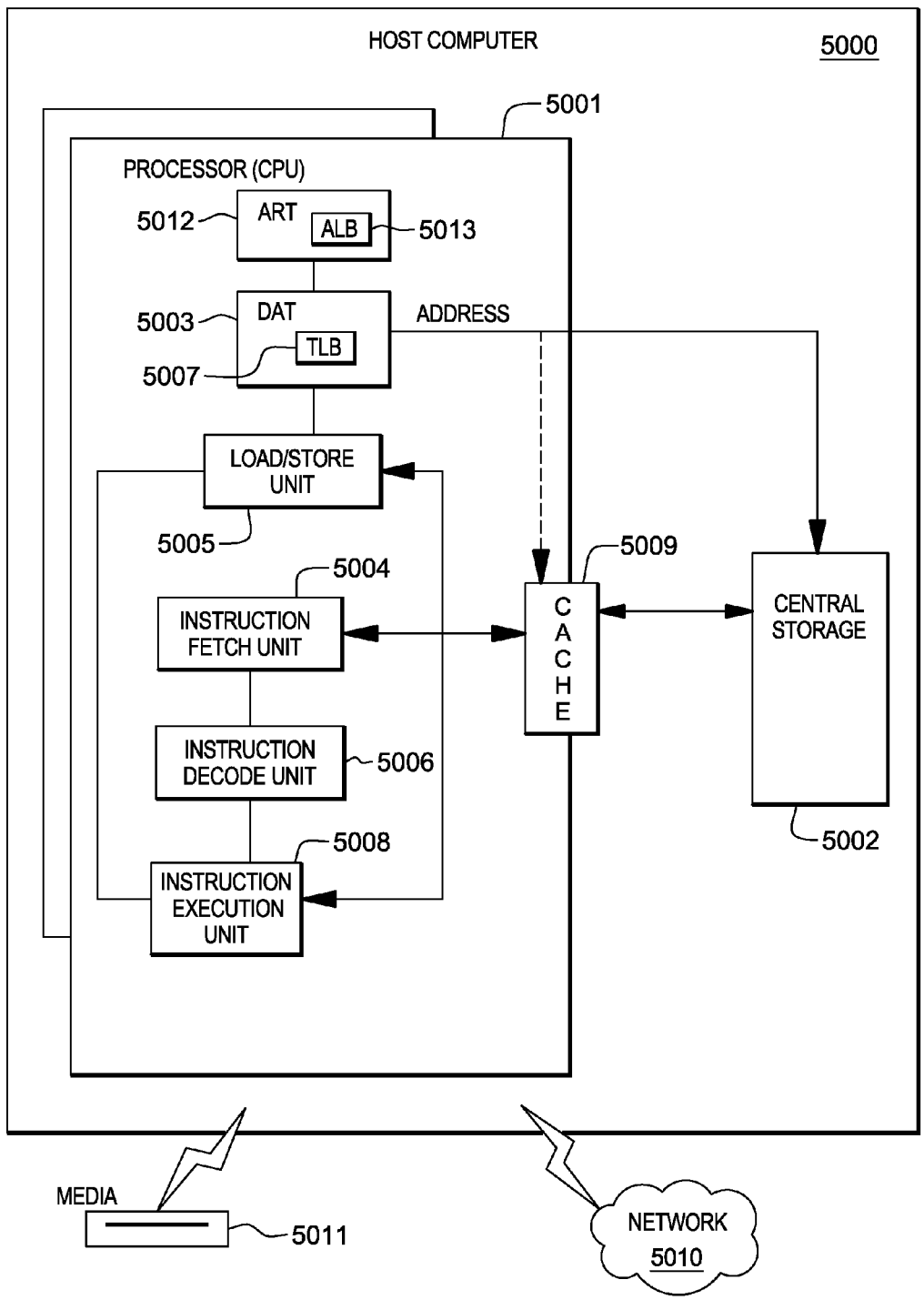
FIG. 24 depicts one embodiment of a host computer system.

Referring to FIG. 24, representative components of a Host Computer system 5000 to implement one or more embodiments are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have access register translation (ART) 5012, which includes an ART lookaside buffer (ALB) 5013, for selecting an address space to be used by dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses.

In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. In another embodiment, this information may be obtained from firmware, e.g., in accordance with interfaces specified by the Power Architecture Platform Reference specification. A model may also provide one or more of data cache block touch (dcbt), PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the POWER ISA and z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the POWER ISA and z/Architecture, bits are numbered in a left-to-right sequence. In the POWER ISA and z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. In one example, bits 8-31 and 1-31 apply to addresses that are in a location (e.g., register) that is 32 bits wide, whereas bits 40-63 and 33-63 apply to addresses that are in a 64-bit wide location. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, 16, and 32 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. An octoword is a group of 32 consecutive bytes on a 32-byte boundary. When storage addresses designate halfwords, words, doublewords, quadwords, and octowords, the binary representation of the address contains one, two, three, four, or five rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one example, the embodiment may be practiced by software (sometimes referred to licensed internal code, firmware, micro-code, milli-code, pico-code and the like, any of which would be consistent with one or more embodiments). Referring to FIG. 24, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 25:
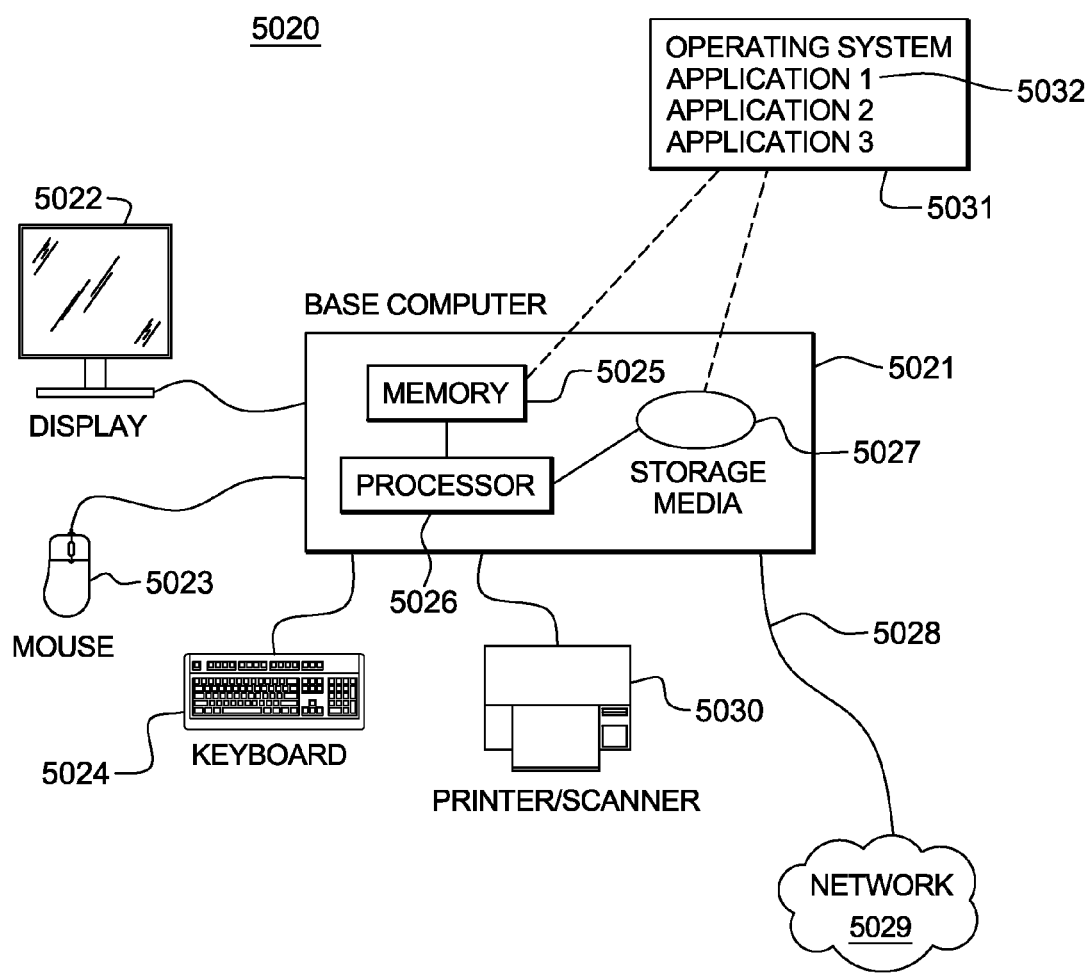
FIG. 25 depicts a further example of a computer system.

FIG. 25 illustrates a representative workstation or server hardware system in which one or more embodiments may be practiced. The system 5020 of FIG. 25 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 26:
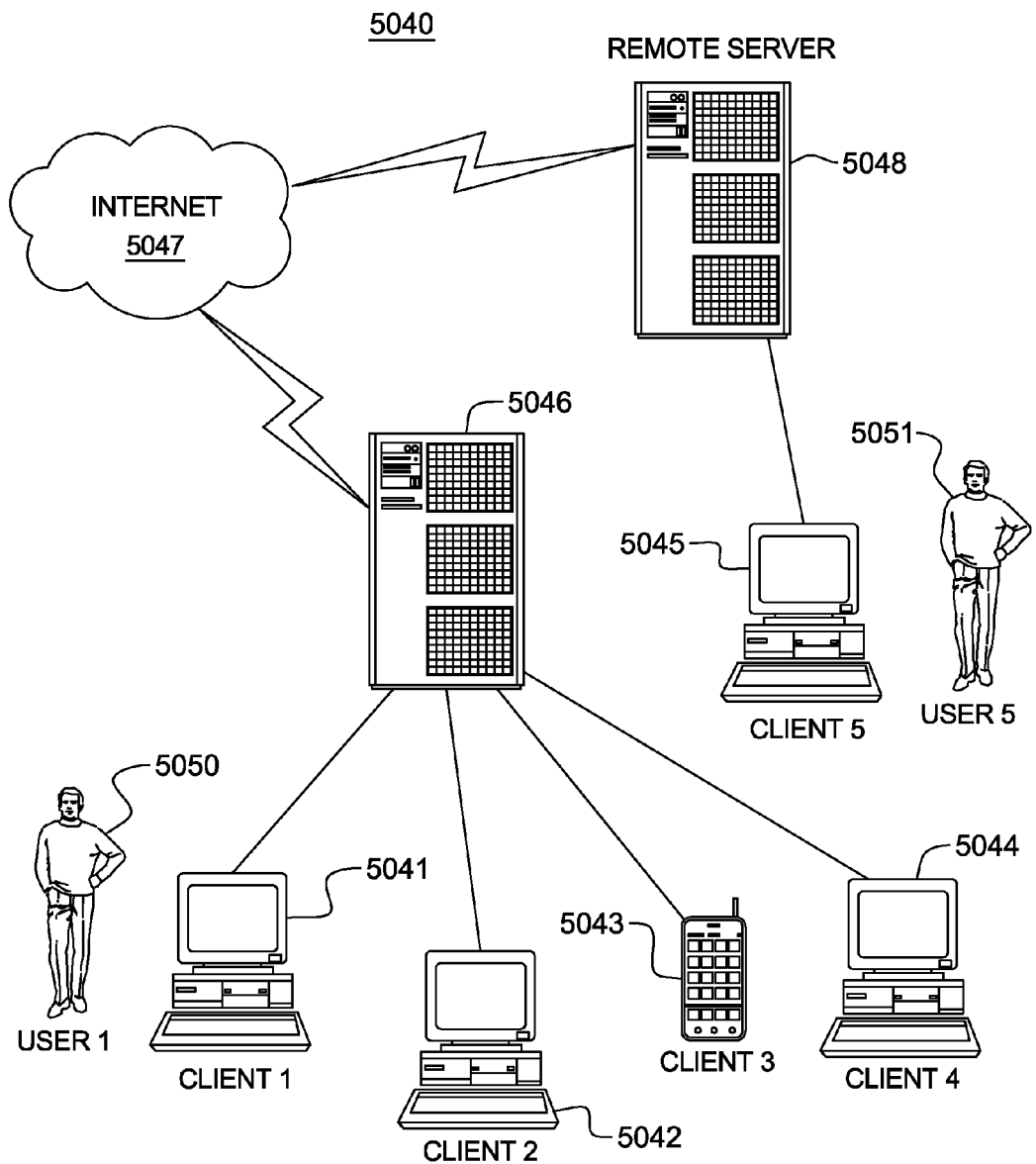
FIG. 26 depicts another example of a computer system comprising a computer network.

FIG. 26 illustrates a data processing network 5040 in which one or more embodiments may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 26, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing one of an IBM Power Systems server and an IBM System z server available from International Business Machines Corporation.

Referring concurrently to FIG. 25 and FIG. 26, software programming code 5031 which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 27:
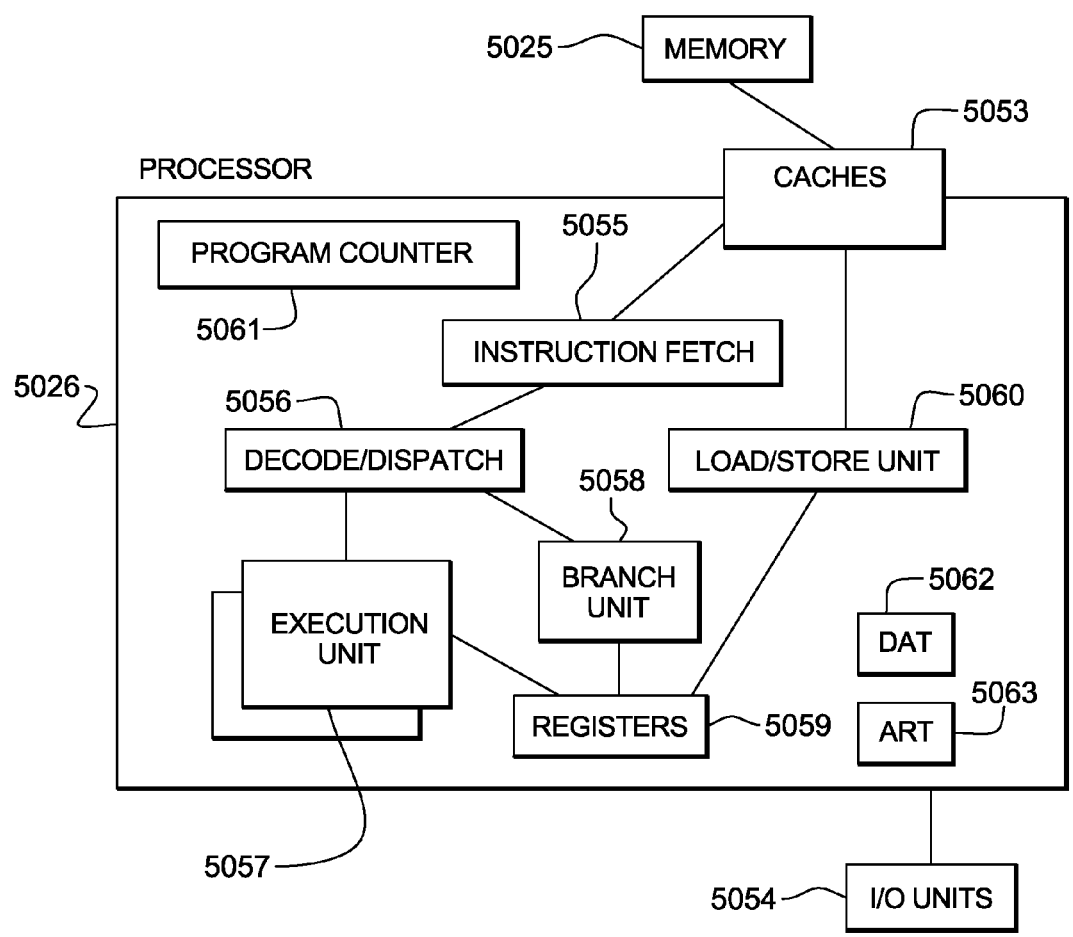
FIG. 27 depicts one embodiment of various elements of a computer system.

Referring to FIG. 27, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter in a Power Architecture processor is 64 bits and can be truncated to 32 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. Instructions of the IBM Power ISA are RISC instructions having a length of 4 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Virtual addresses are transformed into real addresses using dynamic address translation 5062 and, optionally, using access register translation 5063.

Figure 28A:
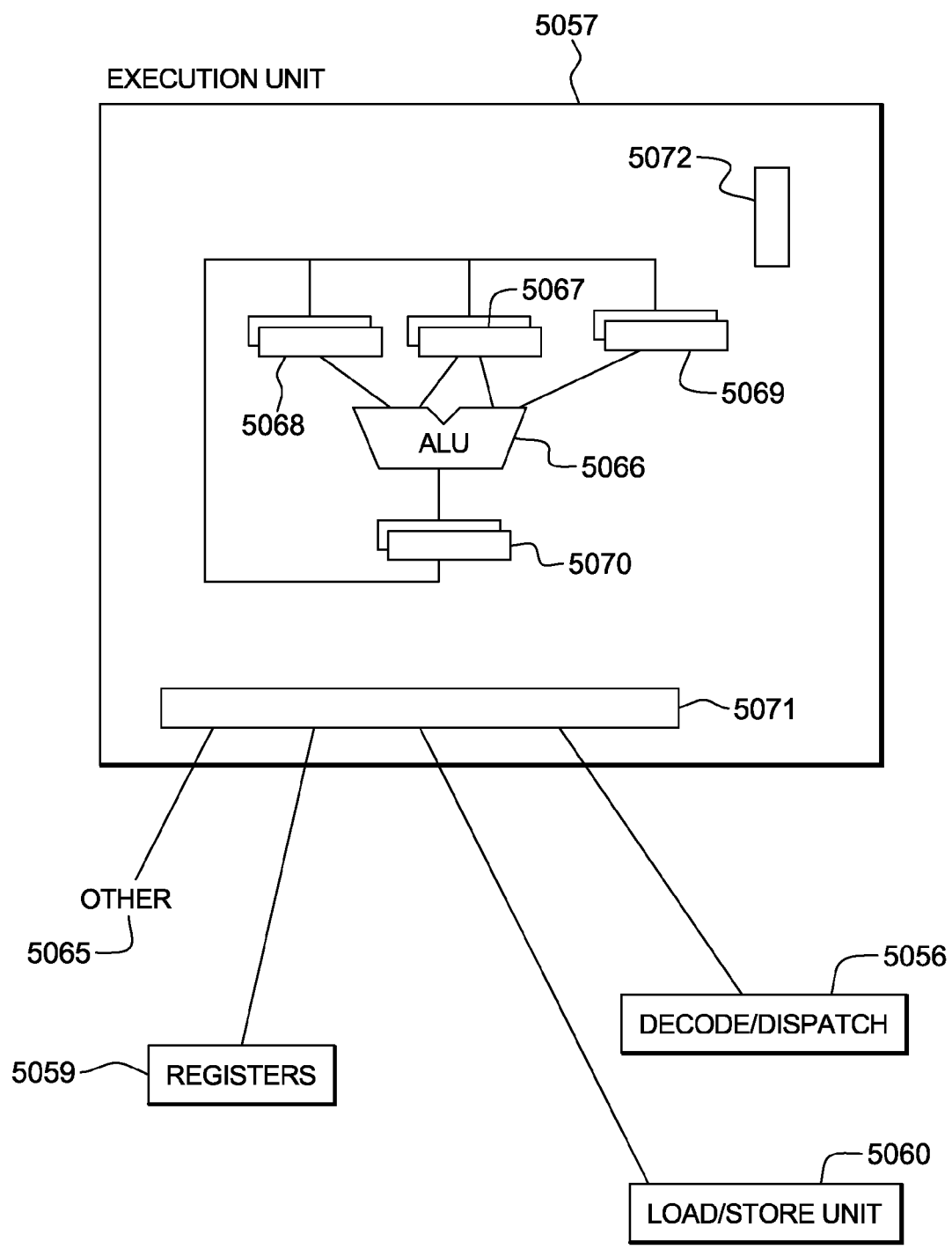
FIG. 28A depicts one embodiment of the execution unit of the computer system of FIG. 27.

A processor 5026 typically has one or more units 5057, 5058, 5060 for executing the function of the instruction. Referring to FIG. 28A, an execution unit 5057 may communicate 5071 with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. The IBM Power ISA supports both Big Endian and Little Endian execution modes. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 28B:
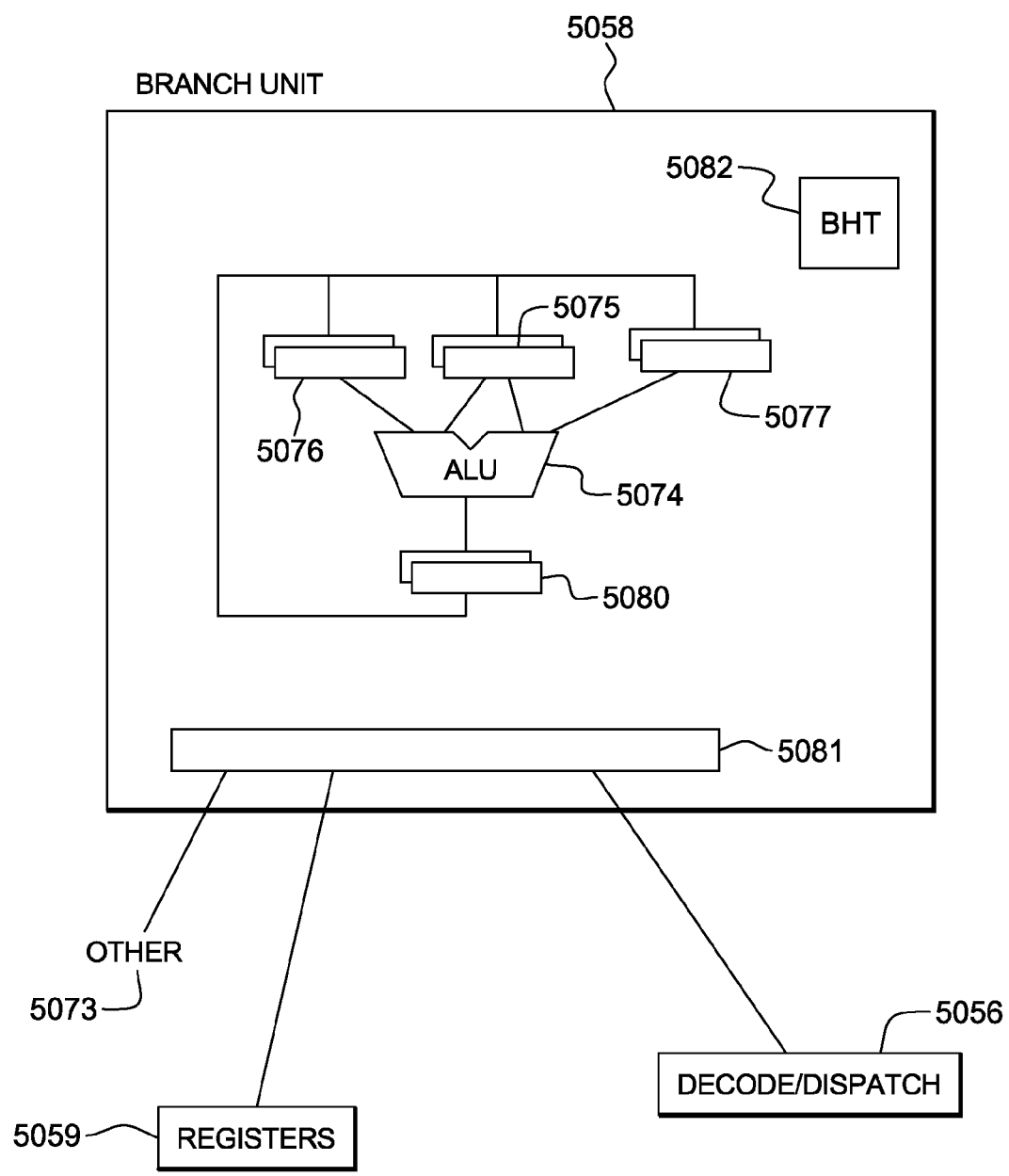
FIG. 28B depicts one embodiment of the branch unit of the computer system of FIG. 27.

Referring to FIG. 28B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080.

The branch unit 5058 may communicate 5081 with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example; or the Power ISA addressing modes wherein D-Form addresses define a base register and an immediate field (displacement field) that are added together to provide the address of the operand in memory; and wherein X-Form addresses define a base register and an index register that are added together to provide the address of the operand in memory. Location herein typically implies a location in main memory (main storage) unless otherwise indicated.

Figure 28C:
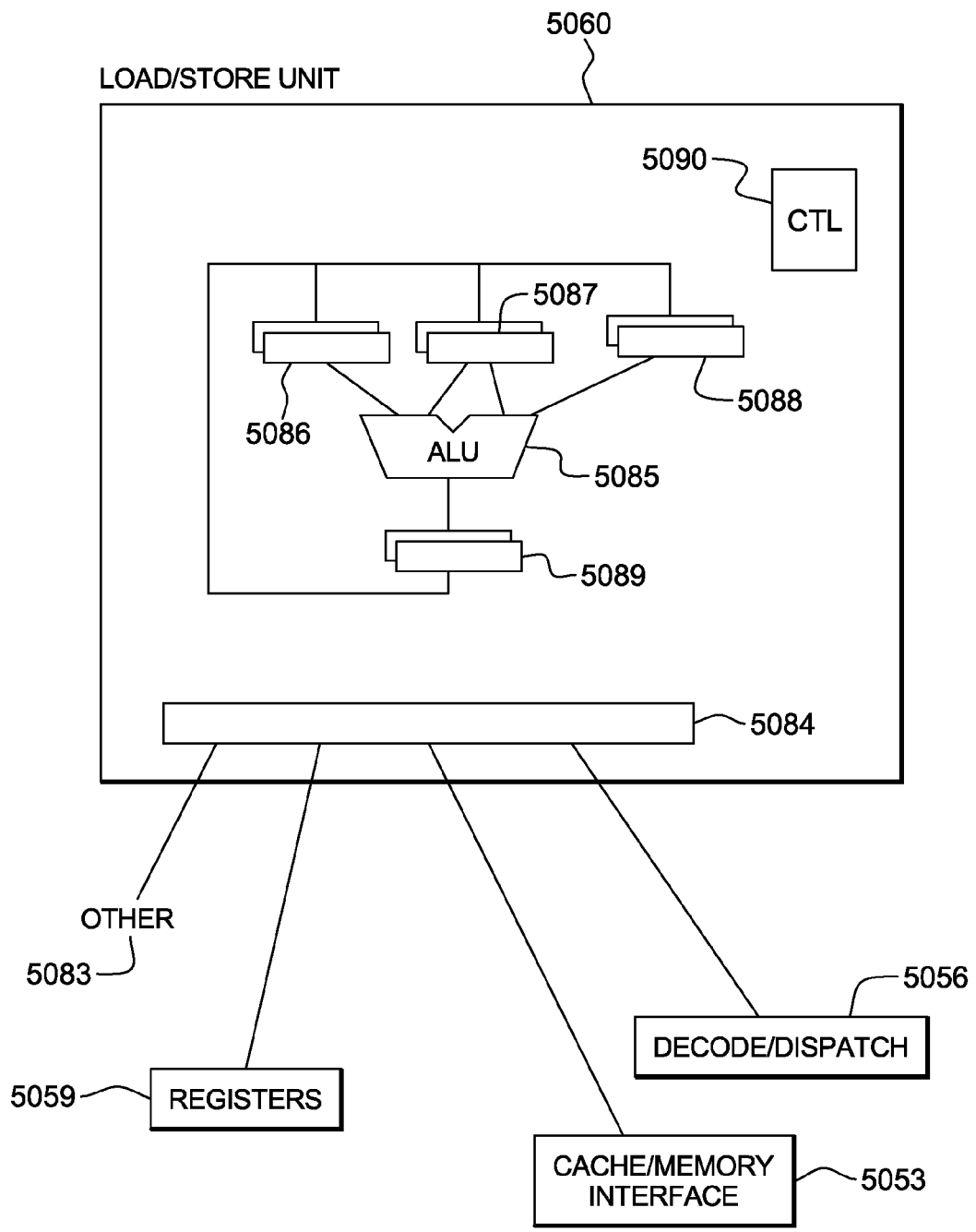
FIG. 28C depicts one embodiment of the load/store unit of the computer system of FIG. 27.

Referring to FIG. 28C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate 5084 with general registers 5059, decode/dispatch unit 5056, cache/memory interface 5053 or other elements 5083 and comprises various register circuits 5086, 5087, 5088 and 5089, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 27) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices. In RISC servers, such as Power Systems from IBM®, proprietary adapters and open system adapters are I/O units that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a Power Systems or a z/Architecture IBM® Server, or alternatively in machines executing other architectures. They can be emulated in the existing and in future IBM® mainframe servers, Power Systems servers and on other machines of IBM® (e.g., System x Servers). They can be executed in machines running Linux on a wide variety of machines using hardware manufactured by IBM®, Intel®, AMD, and others. Besides execution on that hardware under a Power Architecture or z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 29:
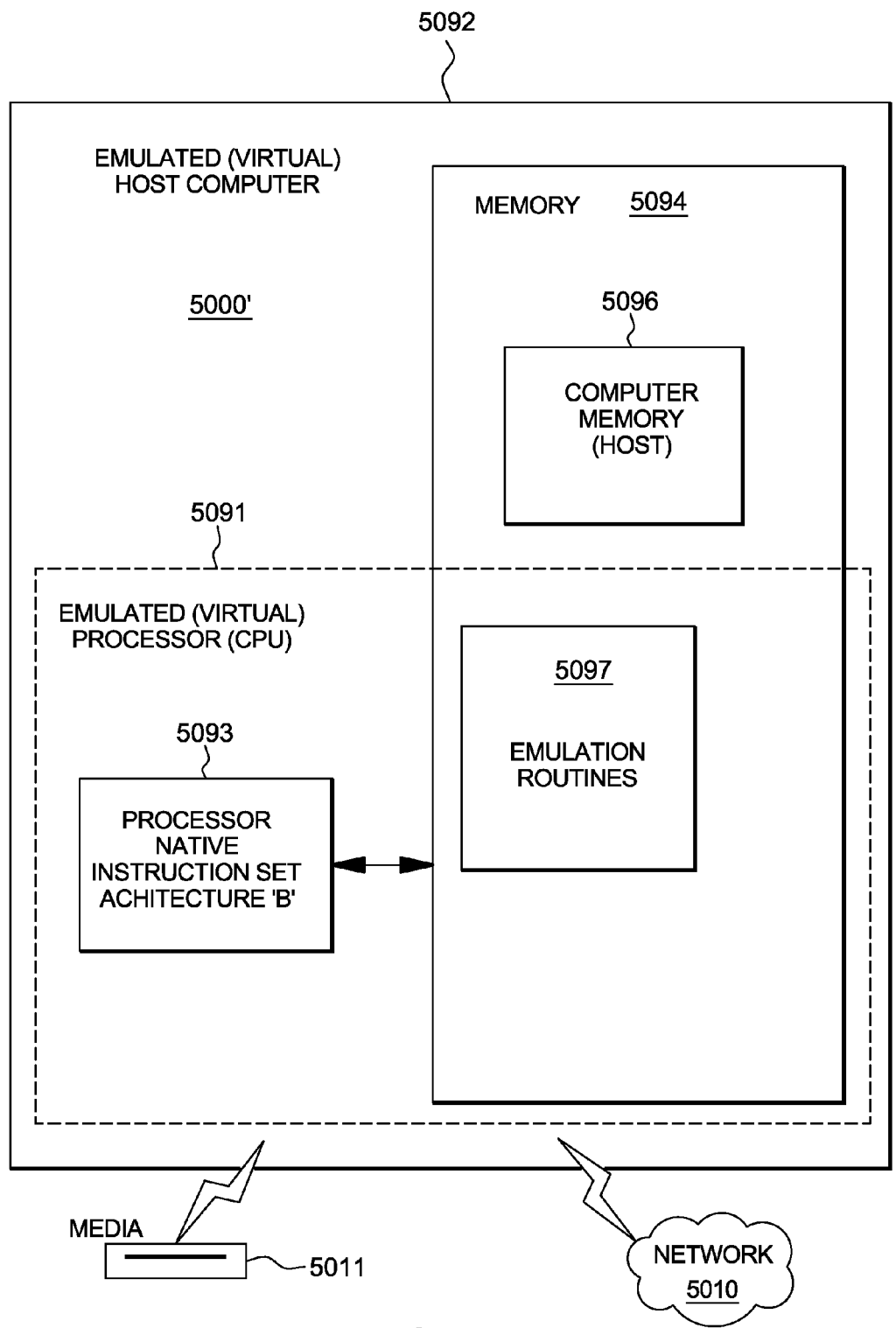
FIG. 29 depicts one embodiment of an emulated host computer system.

In FIG. 29, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 30:
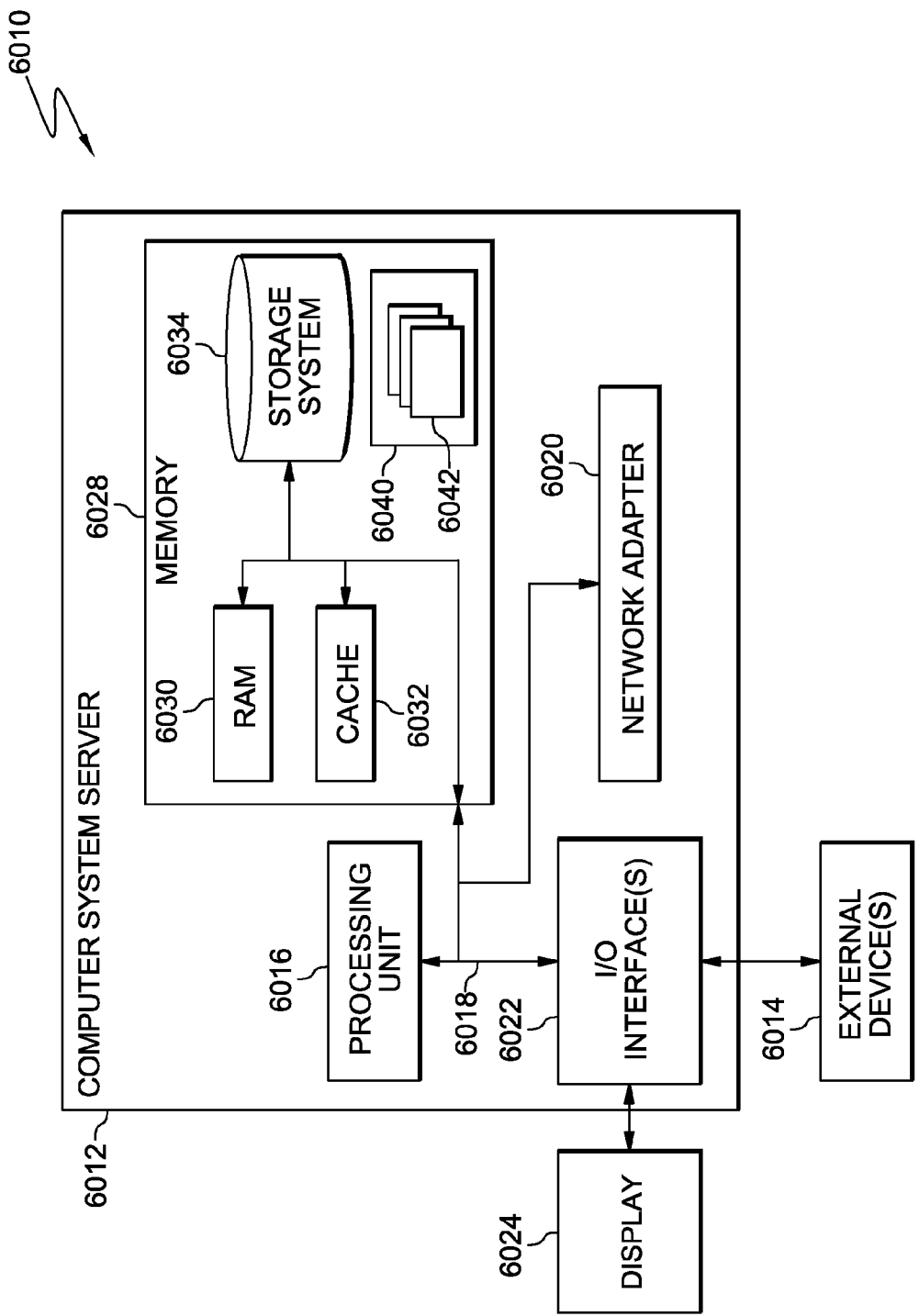
FIG. 30 depicts one embodiment of a cloud computing node.

Referring now to FIG. 30, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 30, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 31:
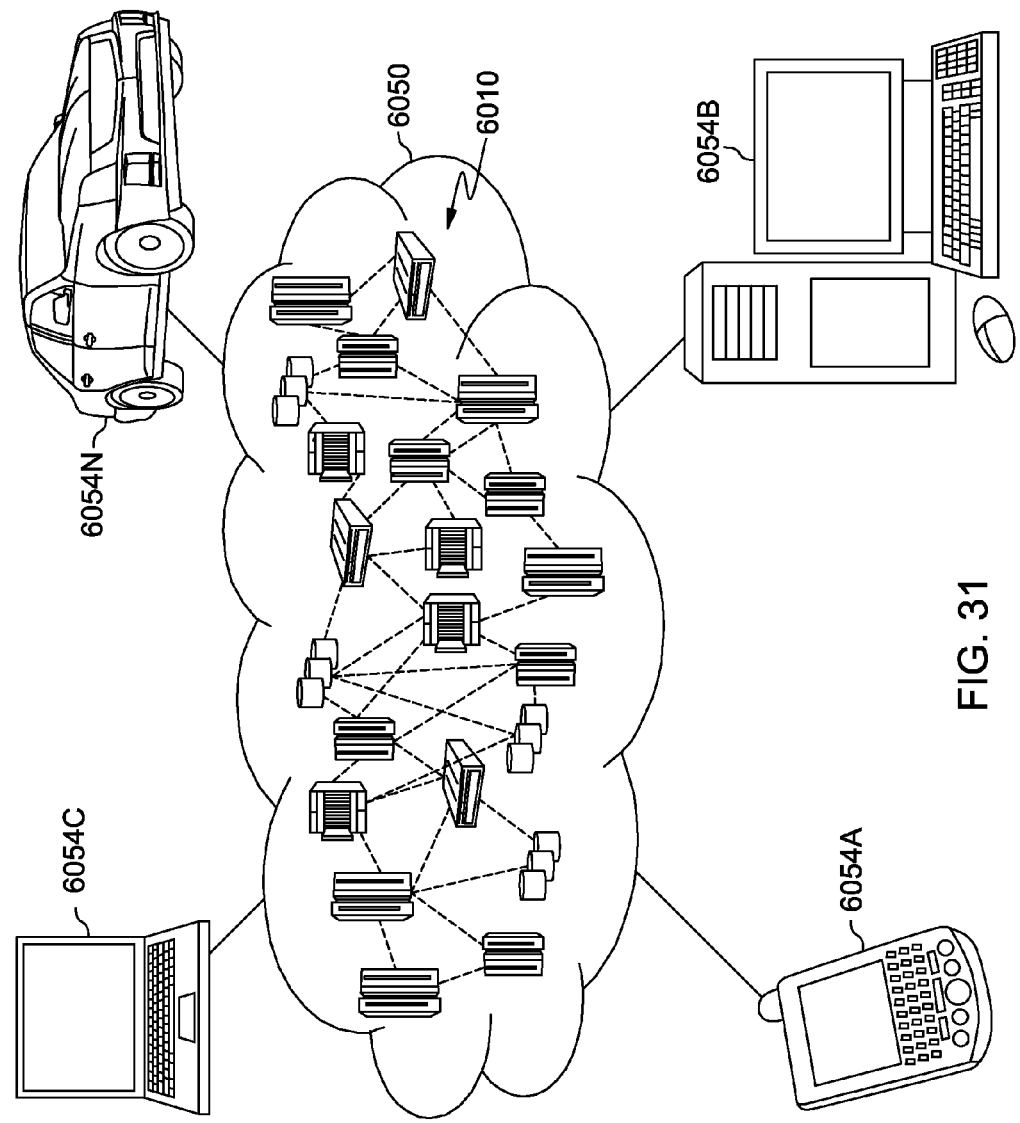
FIG. 31 depicts on embodiment of a cloud computing environment.

Referring now to FIG. 31, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 31 are intended to be illustrative only and that computing nodes 6010 and cloud computing environment 6050 can communicate with any type of computerized device over any type of network and/or network addressable connection (e.g., using a web browser).

Figure 32:
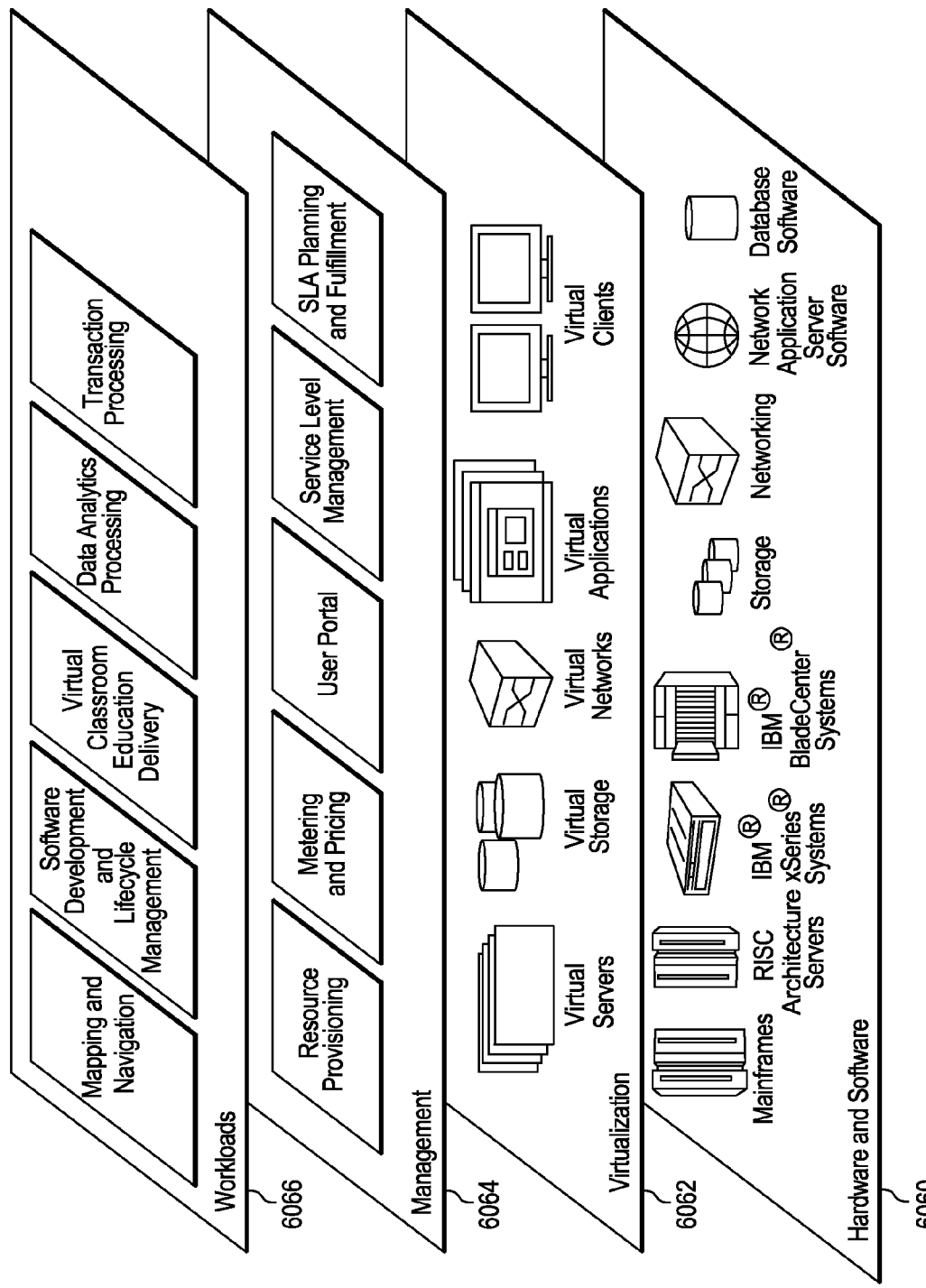
FIG. 32 depicts one example of abstraction model layers.

Referring now to FIG. 32, a set of functional abstraction layers provided by cloud computing environment 6050 (FIG. 31) is shown. It should be understood in advance that the components, layers, and functions shown in FIG. 32 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of facilitating processing in a computing environment, said method comprising:
   executing, by a processor, an application;
   determining that a defined event has occurred;
   based on determining that the defined event has occurred, transferring control to a component of the computing environment to perform one or more modifications to provide modified code of the application, wherein the application comprises the modified code and unmodified code, the modified code being stored in separate memory regions different from the memory regions storing the unmodified code, wherein the unmodified code comprises original code corresponding to the modified code, and wherein the transferring control comprises using an event based branch to transfer to an address specified by the processor based on occurrence of the defined event, the address corresponding to an instruction to be performed by the component to perform the one or more modifications;
   receiving control back at the processor from the component based on providing the modified code to continue executing the application;
   continuing to execute the application, wherein the continuing comprises executing the modified code;
   based on executing the modified code, gaining access to a target address register that specifies an address to which control is to be transferred; and
   based on branching to the address, receiving control back at the unmodified code and continuing to execute the application by executing the unmodified code.

2. The method of claim 1, wherein the continuing to execute the application comprises:
   determining at a point in the application that modified code is to be executed;
   based on determining that modified code is to be executed, fetching the modified code from memory using an address translation entry for instruction fetches, wherein a different address translation entry is used for data accesses; and executing the modified code.

3. The method of claim 1, wherein the target address register is a register separate from registers used for application state.

4. The method of claim 1, further comprising creating, by the component, the modified code, the creating comprising:
   analyzing one or more statistics provided by a hardware performance monitor executing within the computing environment;
   determining, based on the analyzing, that the application is to be modified; and
   creating the modified code, based on the determining.

5. The method of claim 4, wherein the analyzing comprises obtaining information from the hardware performance monitor to determine a hot region in the application and creating the modified code based on the obtained information.

6. The method of claim 4, wherein the analyzing further comprises obtaining and analyzing information from a branch history rolling buffer related to one or more branches that have been taken in the application.

7. The method of claim 4, further comprising storing the modified code, wherein the modified code is stored in the separate memory regions, the separate memory regions being accessible via an instruction fetch, and wherein data accesses access the memory regions storing the unmodified code.

8. The method of claim 1, wherein based on the transferring, execution of the application is stopped until execution is resumed based on completion of the modifications.

9. The method of claim 1, wherein based on the transferring, execution of the application continues.

10. The method of claim 1, wherein the one or more modifications are based at least in part on obtaining and analyzing information from a branch history rolling buffer related to one or more branches that have been taken or from a hot region in the application.

* * * * *